(12) United States Patent
Sørum

(10) Patent No.: US 12,458,042 B2
(45) Date of Patent: Nov. 4, 2025

(54) PROBIOTIC BACTERIA FOR FISH

(71) Applicant: PREVIWO AS, Kjeller (NO)

(72) Inventor: Henning Sørum, Oslo (NO)

(73) Assignee: PREVIWO AS, Kjeller (NO)

( * ) Notice: Subject to any disclaimer, the term of this patent is extended or adjusted under 35 U.S.C. 154(b) by 374 days.

(21) Appl. No.: 16/960,318

(22) PCT Filed: Jan. 8, 2019

(86) PCT No.: PCT/EP2019/050336
§ 371 (c)(1),
(2) Date: Jul. 7, 2020

(87) PCT Pub. No.: WO2019/135009
PCT Pub. Date: Jul. 11, 2019

(65) Prior Publication Data
US 2022/0174982 A1    Jun. 9, 2022

(30) Foreign Application Priority Data

Jan. 8, 2018 (SE) .................................... 1850021-5

(51) Int. Cl.
*A23K 10/18*   (2016.01)
*A23K 50/80*   (2016.01)
*A61K 35/741*   (2015.01)

(52) U.S. Cl.
CPC .............. *A23K 10/18* (2016.05); *A23K 50/80* (2016.05); *A61K 35/741* (2013.01)

(58) Field of Classification Search
None
See application file for complete search history.

(56) References Cited

U.S. PATENT DOCUMENTS

| 10,022,433 B2 | 7/2018 | Sørum |
| 2016/0082053 A1 | 3/2016 | Terhune et al. |

FOREIGN PATENT DOCUMENTS

| CN | 107299067 A | 10/2017 |
| DK | 199800590 A | 10/1998 |
| EP | 1472933 A1 | 11/2004 |
| WO | 2013/171236 A1 | 11/2013 |
| WO | 2015/074943 A1 | 5/2015 |
| WO | 2015/074946 A1 | 5/2015 |
| WO | 2018/007632 A1 | 1/2018 |

OTHER PUBLICATIONS

Godoy et al. "High variability of levels of Aliivibrio and lactic acid bacteria in the intestinal microbiota of farmed Atlantic salmon *Salmo salar* L.", Annals of Microbiology, vol. 65, pp. 2343-2353. (Year: 2015).*

Makled, S.O., et al., "Evaluation of marine psychrophile, Psychrobacter namhaensis SO89, as a probiotic in Nile tilapia (*Oreochromis niloticus*) diets", Fish and Shellfish Immunology, vol. 61, pp. 194-200. (Year: 2017).*

Allamah, S.K., et al., "Effects of Probiotic Bacteria on Fish Performance", Advanced Techniques in Clinical Microbiology, vol. 1, No. 2:11, pp. 1-5. (Year: 2017).*

International Search Report and Written Opinion mailed on Mar. 26, 2019 for PCT/EP2019/050336 filed on Jan. 8, 2019, 9 pages.

Search Report issued on Jul. 1, 2021, in corresponding Danish patent Application No. PA 2020 70450, 9 pages.

Daniel L. Merrifield, et al., "The current status and future focus of probiotic and prebiotic applications for salmonids", Aquaculture, vol. 302, No. 1-2, Apr. 1, 2010, 18 pages.

Toranzo, A. E., Magariños, B., Romalde, J. L. 2005. "A review of the main bacterial fish diseases in mariculture systems." Aquaculture 246 (2005) 37-61.

Karlsen, C., Sørum, H., Willassen, N. P., Åsbakk, K. 2012. "Moritella viscosa bypasses Atlantic salmon epidermal keratocyte clearing activity and might use skin surfaces as a port of infection." Vet Microbiol, 154(3-4):353-62. Epub Jul. 30, 2011.

Lunder, T., Evensen, Ø., Holstad, G., and Håstein, T. 1995. ""Winter ulcer" in the Atlantic salmon *Salmo salar*." Pathological and bacteriological investigations and transmission experiments. Dis. Aquat. Org. 23: 39-49.

Løvoll, M., Wiik-Nielsen, C. R., Tunsjø, H. S., Colquhoun, D., Lunder, T., Sørum, H., Grove, S. 2009. "Atlantic salmon bath challenged with Moritella viscosa—Pathogen invasion and host response." Fish Shellfish Immunol, 26: 877-884.

Cipriano, R.C. and R.A. Holt. 2005. "Flavobacterium psychrophilum, cause of Bacterial Cold-Water Disease and Rainbow Trout Fry Syndrome." Fish Disease Leaflet No. 86. United States Dept, of the Interior. U.S. Geological Service, National Fish Health Research Laboratory, Kearneysville, WV.

Nematollahi A, Decostere A, Pasmans F, Haesebrouck F. 2003. "Flavobacterium psychrophilum infections in salmonid fish." J Fish Dis.; 26(10):563-74.

Verschuere, L, Rombaut, G, Sorgeloos, P., Verstraete, W. 2000. "Probiotic bacteria as biological control agents in aquaculture." Microbiol. Mol. Biol. Rev. 64: 655-671.

Kashulin A. & Sørum H. 2014. "A novel in vivo model for rapid evaluation of Aliivibrio salmonicida infectivity in Atlantic salmon." Aquaculture 420, 112-118.

Skjermo, J., et al. "Microbially matured water: a technique for selection of a non-opportunistic bacterial flora in water that may improve performance of marine larvae." Aquaculture International 5 (1997): 13-28.

Vadstein, O., et al. "A strategy to obtain microbial control during larval development of marine fish." Fish farming technology. CRC Press, 1993. 69-75.

Bentzon-Tilia et al. "Monitoring and managing microbes in aquaculture—Towards a sustainable industry." Microbial biotechnology 9.5 (2016): 576-584.

(Continued)

*Primary Examiner* — Michelle F. Paguio Frising
*Assistant Examiner* — Grant C Currens
(74) *Attorney, Agent, or Firm* — XSENSUS LLP

(57) ABSTRACT

The present document is directed to probiotic bacteria and their use in fish farming for increasing the weight of fish and for treating and/or preventing a microbial infection of the fish. The bacteria are species within the *Aliivibrio, Psychrobacter* and *Pseudomonas* genera.

10 Claims, 28 Drawing Sheets

(56) References Cited

OTHER PUBLICATIONS

Martínez Cruz et al. "Use of Probiotics in Aquaculture." International Scholarly Research Network Microbiology, vol. 2012, Article ID 916845, 13 pages, doi:10.5402/2012/916845.
Bregnballe, J. "A guide to recirculation aquaculture." 2015 Edition, FAO; Eurofish International Organisation. Rome, Italy. CID: 20.500. 12592/dw1k96.

* cited by examiner

PROBIOTIC BACTERIA FOR FISH

CROSS-REFERENCE TO RELATED APPLICATIONS

The present application is based on PCT filing PCT/EP2019/050336, filed Jan. 8, 2019, which claims priority to SE 1850021-5, filed Jan. 8, 2018, the entire contents of each are incorporated herein by reference.

The present document is directed to fish farming. More particularly, the present document is directed to means and methods for increasing the growth of fish by using probiotic bacteria. The present document also discloses means and methods for treating and/or preventing microbial infections, such as bacterial infections, in fish by the use of probiotic bacteria.

BACKGROUND OF THE INVENTION

Fish farming involves raising fish in tanks or enclosures. In aquaculture, freshwater and saltwater populations, such as fish, crustaceans and shellfish, are raised under controlled conditions. Mariculture is a sub-branch of aquaculture where marine organisms are cultivated in the open ocean or an enclosed section of the ocean, or alternatively in ponds, tanks and the like filled with seawater.

The growth and health of fish raised by intensive aquaculture is dependent on that sufficient oxygen and clean water with optimal levels of carbon dioxide, ammonia and with feasible pH can be provided. Also, a sufficient amount of feed with a high content of protein and a well-balanced supply of amino acids is crucial to obtain a commercially durable result. Attempts to increase the growth of farmed fish have generally focused on changing the contents of the feed used.

Farmed fish are often contained at high concentrations which increase the risk for infections by e.g. parasites such as fish lice, intestinal worms, fungi, virus and bacteria. In order to control such infections, the fish farming industry often relies on the use of antibiotics and chemical control agents, which is undesirable e.g. due to the spread of these toxic agents to the environment and the fear for antibiotic resistance development in the society.

A particular problem with farmed fish is bacteria which cause wounds and ulcers in the skin of the fish which reduce the quality of the slaughtered fish even if it survives the infection because of scar tissue and which causes suffering to the fish. The ulcer bacteria also cause septicemia that increases the percentage of fish that die because of the infection. Examples of bacteria which have been associated with such disease are *M. viscosa, Bizionia piscinecroseptica, Aliivibrio friggiae, Tenacibaculum dicentrarchi, Aliivibrio wodanis*. The creation of wounds on the skin of the fish is also expected to present a route for entry for other pathogenic organisms. Acute bacterial infections in farmed fish that causes outbreaks with high loss in the population in a limited time creates a high concentration of bacterial pathogens that causes effective spread of the infection between the individuals in the population. Some of the fish pathogens causing epidemic outbreaks are *Aliivibrio salmonicida, Aeromonas salmonicida, Vibrio anguillarum, Edwardsiella piscicida*, and *Aeromonas hydrophila*. The ports of infection for bacterial pathogens are not well studied but both the gills, the intestine and the skin are considered important.

The early freshwater phase in the life cycle of anadromic salmonid fish is managed artificially in the salmonid farming industry. From the hatching of eggs, through the yolk sack stage, start feeding, fry, fingerling and parr stages the juvenile salmonid fish is facing several infectious agents that may cause acute mortality, fin rot and or ulcers. The most severe bacterial infections are furunculosis caused by *Aeromonas salmonicida* subspecies *salmonicida*, and enteric redmouth disease or yersiniosis caused by *Yersinia ruckeri*. Furuncolosis can be devastating to the freshwater stages of salmonid farming and during the 1980's the furunculosis disease established in marine water and developed a situation in the salmonid farming industry that made furunculosis as a major threat to the industry.

Since 2016 yersiniosis has entered the marine water stage of Atlantic salmon farming in Mid-Norway probably through infected smolt transferred from infected smolt plants in the same way as furunculosis developed into a severe disease for marine salmon farming in the 1980's.

*Pseudomonas fluorescens* is a common bacterium in most freshwater sources in temperate or cold areas. Smolt production plants may be populated by *P. fluorescens* often through established biofilms in all parts of the aquatic tubing and tank infrastructure. *P. fluorescens* may also become a part of the microbiota of the biofilters in aquatic recirculation systems (RAS) that are becoming common in the larger smolt facilities that are established. There are a few reasons for the increasing use of RAS in salmon smolt production of which the lack of enough clean water in the natural lake and river systems to have a classical flow-through freshwater supply is the most common.

Vaccination has been used or proposed as a means for treating and preventing these kinds of bacterial infections. Antibiotic treatment of outbreaks of acute bacterial infections is often used in many countries. Routinely use of antibiotics often causes antibiotic resistant bacterial fish pathogens.

Development of vaccines for the Atlantic salmon industry was focused in the 1980's and 1990's to protect the posts-molt and on-growing salmon against vibriosis caused by *Vibrio anguillarum*, furunculosis caused by *A. salmonicida* subspecies *salmonicida*, cold-water vibriosis caused by *Aliivibrio salmonicida* and winter ulcer of which *Moritella viscosa* is one of the important causative pathogens. A few years ago a need to vaccinate against yersiniosis in the smolt plants resulted in development of bath or dip vaccines that is being used at an early fingerling stage to reduce the impact of *Yersinia ruckeri* in the infected smolt plants. When yersiniosis started to develop as a disease in the marine net pens intraperitoneal injection vaccines against *Y. ruckeri* were introduced as part of the vaccination protocol for the hatcheries affected by yersiniosis.

In general vaccination of larvae and fry of fish is demanding because of the small size and fragile stage and if performed it is by dip or bath into a solution of killed bacteria without adjuvant. The effect of bath and dip vaccination can vary depending on many host and antigen preparation factors that can vary between different batches of larvae/fry and vaccines.

Use of probiotic bacteria in the larval stages of fish is increasingly reported and can be applied as dip or bath or added to the feed. The intention is to reduce mortality, increase growth and improve the environment in the rearing tanks.

Due to the above discussed problems among others, fish farming industries often face a high loss of the farmed fish with negative economic consequences for the fish farmer. Thus, increasing the survival of the fish and increasing the net output in relation to the amount of feed used is highly desirable.

The object of the present invention is to overcome or at least mitigate some of the problems associated with the prior art.

SUMMARY

The above problems have now been mitigated or overcome by the isolation and characterization of three novel species of the *Aliivibrio* genus, namely *Aliivibrio njordis*, *Aliivibrio balderis* and *Aliivibrio nannie*, three novel species of the *Psychrobacter* genus, namely *Psychrobacter piscimesodermis*, *Psychrobacter piscimesenchymalis* and *Psychrobacter piscisubcutanea*, and three novel species of the *Pseudomonas* genus, namely *Pseudomonas salmosubcutaneae*, *Pseudomonas salmosubpectoralis* and *Pseudomonas salmointermuscularis*, which have been shown to have a probiotic effect on fish, such as fish of the family Salmonidae and marine cleaner fish as wrasses and lump suckers. The bacteria of the species *Aliivibrio njordis*, *Aliivibrio balderis*, *Aliivibrio nannie*, *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis* and *Pseudomonas salmointermuscularis* may in the context of the present document be referred to as "the probiotic bacteria", "the probiotic bacterium" and the like.

The present document is thus directed to a method for increasing the growth rate and/or weight of fish by administering the probiotic bacteria to the fish, such as by topical administration (i.e. administration by dipping, bathing or similar immersion techniques), administration via the gills, via the intestine, by anal intubation, via spawned eggs, orally. and/or via injection.

The present document is thus also directed to a method for increasing the weight of fish, said method comprising the steps of
  a) adding one or more species of probiotic bacteria to water, wherein the species of bacteria comprises or consists of *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis* and/or *Pseudomonas salmointermuscularis*; and
  b) exposing the fish to the water containing the one or more species of probiotic bacteria.

The present document is thus also directed to a method for increasing the growth rate of fish, said method comprising the steps of
  a) adding one or more species of probiotic bacteria to water, wherein the species of bacteria comprises or consists of *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis* and/or *Pseudomonas salmointermuscularis*; and
  b) exposing the fish to the water containing the one or more species of probiotic bacteria.

The present document is also directed to a method for increasing the rate of growth rate and/or weight of fish, said method comprising administrating one or more species of probiotic bacteria, wherein the species of probiotic bacteria comprises or consists of one or more of *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, *Pseudomonas salmointermuscularis*, *Aliivibrio njordis*, *Aliivibrio balderis* and/or *Aliivibrio nannie*, wherein said administration takes place via injection, anal intubation, spawned eggs, and/or orally.

The present document is thus further also directed to a method for treating and/or preventing a microbial infection in fish, said method comprising the steps of
  a) adding one or more species of probiotic bacteria to water, wherein the species of probiotic bacteria comprises or consists of one or more of a bacterium of the species of *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis* and/or *Pseudomonas salmointermuscularis* and any combination thereof; and
  b) exposing the fish to the water containing the one or more species of probiotic bacteria.

The present document is further directed to a method for treating and/or preventing a microbial infection in fish by administering the probiotic bacteria to the fish by e.g. topical administration (i.e. administration by dipping, bathing or similar immersion techniques), administration via the gills, via the intestine, by anal intubation, via spawned eggs, orally. and/or via injection.

The present document is further directed to a method for treating and/or preventing a microbial infection in fish, said method comprising administrating a pharmaceutically effective amount of one or more species of probiotic bacteria, wherein the species of probiotic bacteria comprises or consists of one or more of *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, *Pseudomonas salmointermuscularis*, *Aliivibrio njordis*, *Aliivibrio balderis* and/or *Aliivibrio nannie*, wherein said administration takes place via injection, anal intubation, spawned eggs, and/or orally.

The present document is also directed to a probiotic bacterium of the species *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, and/or *Pseudomonas salmointermuscularis* for medical use.

The present document is further directed to a probiotic bacterium of the species *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, and/or *Pseudomonas salmointermuscularis* for use in the treatment and/or prevention of a microbial infection in fish.

The present document is additionally directed to the use of a probiotic bacterium of the species *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, and/or *Pseudomonas salmointermuscularis* for the manufacture of a medicament for the treatment and/or prevention of a microbial infection.

The present document is also directed to a probiotic bacterium of the species *Psychrobacter piscimesodermis*, *Psychrobacter piscimesenchymalis*, *Psychrobacter piscisubcutanea*, *Pseudomonas salmosubcutaneae*, *Pseudomonas salmosubpectoralis*, and/or *Pseudomonas salmointermuscularis* for use in the treatment and/or prevention of a microbial infection in fish and for the simultaneous use in increasing the growth rate and/or weight of said fish.

The present document is also directed to the use of a probiotic bacterium of the species *Psychrobacter piscimesodermis*, *Psychrobacter piscimesenchymalis*, *Psychrobacter piscisubcutanea*, *Pseudomonas salmosubcutaneae*,

*Pseudomonas salmosubpectoralis*, and/or *Pseudomonas salmointermuscularis* for the manufacture of a medicament for the treatment and/or prevention of a microbial infection in fish and simultaneously increasing the growth rate and/or weight of said fish.

The present document is also directed to a method for the treatment and/or prevention of a microbial infection in fish and simultaneously increasing the growth rate and/or weight of fish, said method comprising the steps of
  a) adding one or more species of probiotic bacteria to water, wherein the species of bacteria comprises or consists of *Psychrobacter piscimesodermis, Psychrobacter piscimesenchymalis, Psychrobacter piscisubcutanea, Pseudomonas salmosubcutaneae, Pseudomonas salmosubpectoralis*, and/or *Pseudomonas salmointermuscularis*; and
  b) exposing the fish to the water containing the one or more species of probiotic bacteria.

The microbial infection which may be treated and/or prevented by the probiotic bacteria of the present document may be a bacterial infection. The bacterial infection may be an infection causing wounds, ulcers and/or lesions on the skin of the fish, and/or septicaemia. Examples of bacteria which infection may be treated and/or prevented by the probiotic bacteria of the present document include, but are not limited to bacteria selected from the group comprising of *M. viscosa, Bizionia piscinecroseptica, Aliivibrio friggiae, Tenacibaculum dicentrarchi, Aliivibrio wodanis, Aliivibrio salmonicida, Aeromonas salmonicida, Vibio anguillarum, Edwardsiella piscicida, Aeromonas hydrophila, Flavobacterum psychrophilum*, and *Aliivibrio salmonicida*.

The probiotic bacteria may be administered to the fish by
  a) adding one or more species of a probiotic bacterium to water; and
  b) exposing the fish to the water containing the one or more species of a probiotic bacterium.

Alternatively, the probiotic bacteria may be administered via injection, anal intubation, via spawned eggs, and/or orally.

The bacterial species may be used alone or in any combination. Also, more than one strain of each species may be used. Further, if more than one species and/or strain is used, any ratio between the different species and/or strains may be used. Typically the different bacterial species and/or strains are used in a ratio of 1:10 to 10:1 or in equal amounts.

When the probiotic bacteria of the present document are administered to fish by exposing the fish to water containing the probiotic bacteria, the water may have a salt concentration from 0 to about 4% by weight, such as about 0.5 to about 4%, such as about 2 to about 4% by weight. The water may e.g. be natural sea water. As an example freshwater can be added with a culture with probiotic bacteria in high enough concentration to keep the salt concentration above zero from the higher salt concentration in the culturing media.

The fish may be exposed to the probiotic bacteria for a time period of 1 second to 5 hours, such as 1 second to 2 hours, such as 1 second to 1 hour, such as 30 seconds to 1 hour or 1 minute to 30 minutes when exposed via bathing in water containing the probiotic bacteria. The bathing may be repeated one or more times, such as 1-20 times. The fish may e.g. be exposed to the bacteria 1-20 times, 1-10 times, 1-5 times, 1-4 times, 1-3 times or 1-2 times.

The fish that may be administered with the probiotic bacteria are fish of the family Salmonidae, such as salmon, trout, chars, freshwater whitefishes or graylings. The fish may also be freshwater fish as northern pike (*Esox lucius*) perch (*Perca fluviatilis*), zander (*Sander lucioperca*) and carp (*Cyprinus carpio*). The fish may be farmed fish.

The present document is also directed to a probiotic composition comprising one or more of a probiotic bacterium selected from the group consisting of *Psychrobacter piscimesodermis, Psychrobacter piscimesenchymalis, Psychrobacter piscisubcutanea, Pseudomonas salmosubcutaneae, Pseudomonas salmosubpectoralis*, and *Pseudomonas salmointermuscularis*.

The present document is also directed to an isolated and biologically pure exemplary strain of the novel species *Psychrobacter piscimesodermis* which strain is *Psychrobacter piscimesodermis* Fisk 1, 41, 6/3-2014 Atl. Salm, which has been deposited at National Collection of Industrial and Marine Bacteria and has been assigned accession number NCIMB 42947.

The present document is also directed to an isolated and biologically pure exemplary strain of the novel species *Psychrobacter piscimesenchymalis* which strain is *Psychrobacter piscimesenchymalis* Fisk 2, 42, 6/3-2014 Atl. salm, which has been deposited at National Collection of Industrial and Marine Bacteria and has been assigned accession number NCIMB 42948.

The present document is also directed to an isolated and biologically pure exemplary strain of the novel species *Psychrobacter piscisubcutanea* which strain is *Psychrobacter piscisubcutanea* Fisk 3, 43, 6/3-2014 Atl. Salm, which has been deposited at National Collection of Industrial and Marine Bacteria and has been assigned accession number NCIMB 42949.

The present document is also directed to an isolated and biologically pure exemplary strain of the novel species *Pseudomonas salmosubcutaneae*, which strain is *Pseudomonas salmosubcutaneae* Fisk 3, 13/5-2014, hb, Atl. Salm, which has been deposited at National Collection of Industrial and Marine Bacteria and has been assigned accession number 43330.

The present document is also directed to an isolated and biologically pure exemplary strain of the novel species *Pseudomonas salmosubpectoralis*, which strain is *Pseudomonas salmosubpectoralis* Fisk 3, 13/5-2014, ba, Atl. salm., which has been deposited at National Collection of Industrial and Marine Bacteria and has been assigned accession number 43331.

The present document is also directed to an isolated and biologically pure exemplary strain of the novel species *Pseudomonas salmointermuscularis*, which strain is *Pseudomonas salmointermuscularis* Fisk 4, 13/5-2014, ha, Atl. salm., which has been deposited at National Collection of Industrial and Marine Bacteria and has been assigned accession number 43332.

When the present document refers to a bacterium of the species *Aliivibrio njordis, Aliivibrio balderis, Aliivibrio nannie, Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* it is understood that said bacterium has a biological activity comparable to the respective deposited exemplary strains of said *Aliivibrio njordis, Aliivibrio balderis, Aliivibrio nannie, Psychrobacter piscimesodermis, Psychrobacter piscimesenchymalis, Psychrobacter piscisubcutanea, Pseudomonas salmosubcutaneae, Pseudomonas salmosubpectoralis*, or *Pseudomonas salmointermuscularis* bacteria that are disclosed herein.

Other features and advantages of the invention will be apparent from the following detailed description, drawings, examples, and from the claims.

Definitions

"Salmonidae" is a family of ray-finned fish, which is the only living family currently placed in the order Salmoniformes. These are also referred to herein as salmonids. Salmonidae includes salmon, trout, chars, freshwater whitefishes and graylings.

A "culture" includes all forms of culture, both in broth, on agar and in any other media like eukaryotic cell cultures, eukaryotic/animal/fish tissue within research animals or any other physical measure. A "single culture" refers to a culture containing only one bacterial strain, i.e. a pure culture. A "mixed culture" refers to a culture wherein two or more bacterial strains, species and/or general are grown together. The temperature and the salt concentration (e.g. NaCl) conditions for each culture can be determined separately, depending on the circumstances and the materials used.

"Winter ulcer" is a disease which is characterized by skin ulcers that develop from skin swellings into open ulcers and later into larger ulcerated skin areas where the underlying muscle tissue is exposed and often destroyed by necrosis. Winter ulcer is mainly occurring at sea water temperatures from <6 to 15° C., such as from <6 to 8° C. At these temperatures *M. viscosa* is most clinically active and aggressively attacks the skin of the fish directly creating small ulcers, as well as infect the fish septicemically mainly through the gill epithelium (Lunder et al. 1995, Løvoll et al. 2009, Karlsen et al. 2012).

By the terms wound, ulcer, lesion and the like is in the context of the present document intended damages to the skin tissue. Such injuries may be caused by either trauma and/or by microbial infection, such as bacterial infection.

By the term "skin" and the like is intended the outer covering of a body. The skin of a fish generally comprises an outer covering of scales under which the epidermis and dermis are placed. A wound, ulcer or lesion may affect all three of these layers or only one or two of the outer layers.

"Fish farming", "farmed fish" and the like expressions refer to the commercial raising of fish. Often such fish farming takes place in enclosed spaces, such as cages, tanks or ponds.

"Bizioniosis" is a disease characterized by tail- and fin rot, infection on the tip of the mandibular, in particular, but also on the tip if the maxilla which may spread along the mandibula caudally, eye infection, ulcers behind the pectoral fins and alongside the body, and/or septicaemia (see WO 2015/074943). In particular, bizioniosis is characterized by these symptoms being caused by bacteria of the genus *Bizionia*, such as *Bizionia piscinecroseptica*, such as *Bizionia piscinecroseptica* 130524K2F7.

"Friggiosis" is a disease characterized by septicemia (in particular with a high number of bacteria in head kidney and liver), mottled bleedings in a fatty degenerated liver, ascites in the abdomen, ulcers on the skin (such as behind the pectoral fins or spread out on the body) but often no or fewer ulcers on the body than compared to ulcers in winter ulcer and wodanosis, eye infection (which may lead to puncture of the eye), an infection of the tip of the mandibula and/or the tip of the maxilla (see WO 2015/074946). Friggiosis may be characterized by being caused by bacteria of the novel species *Aliivibrio friggiae*, such as *Aliivibrio friggiae* 130206K7F2 506.

Flexibacteriosis (marine) is caused by *Tenacibaculum maritimum* (formerly, *Cytophaga marina, Flexibacter marinus* and *F. maritimus*) and for Atlantic salmon *Tenacibaculum dicentrarchi* is the most common cause of fin rot and ulcers among bacteria in genus *Tenacibaculum*. Several other names as gliding bacterial diseases of sea fish, eroded mouth syndrome and black patch necrosis has been used to designate the disease caused by this bacterium. Marine flexibacteriosis is widely distributed in cultured and wild fish in Europe, Japan, North America and Australia. The disease has been reported among the cultured fish as turbot, sole, gilthead seabream, seabass, red seabream, black seabream (*Acanthopagrus schlegeli*), flounder and salmonids. Although both adults and juveniles may be affected by marine flexibacteriosis, younger fish suffer a more severe form of the disease. Increased prevalence and severity of the disease is observed at higher temperatures (above 15° C.). The disease is influenced by many environmental (stress) and host-related factors (skin condition). In general, the affected fish have eroded and haemorrhagic mouth, ulcerative skin lesions, frayed fins and tail rot. A systemic disease can occur involving different internal organs. The loss of the epithelial fish surface, a typical change of the disease, is probably portal of entry for other bacterial or parasitic pathogens (Toranzo et al. 2005).

Bacterial cold water disease (BCWD) (Cipriano and Holt 2005) Fish infected with typical BCWD have lesions on the skin and fins. Fins may appear, split, torn, ragged, frayed and may even be eroded totally. Affected fish are often lethargic and stop feeding. Infection may spread septicemically. Salmonid fish can develop a chronic form of BCWD-following recovery from typical BCWD. It is characterised by "corkscrew" swimming, blackened tails and spinal deformities. *Flavobacterum psychrophilum* is considered to be the causative agent of both BCWD and Rainbow trout fry syndrome.

Rainbow trout fry syndrome is an acute disease with high mortality rates. Infected fish may show signs of lethargy, inappetance and exopthalmos before death (Nematollahi et al. 2003). The clinical signs of *F. psychrophilum* infections as well as the mortality rate depend on the size of the affected fish. In coho salmon, which are highly susceptible, the mortalities can be as high as 50%. In fingerlings, a dark pigmentation on one side of the body and erosion of the peduncle area with concomitant exposure of the spinal cord and tail loss are common findings.

Wodanosis is characterized by septicemic infection resulting in ascites, mottled liver, swollen spleen, skin ulcers, and/or fin rot typically on the bases of the tail fin and back fin. Wodanosis may be caused by *Aliivibrio wodanis*. Wodanosis is further described in WO2013/171236.

Cold-water vibriosis in Atlantic salmon may be caused by the gram-negative bacterium *Aliivibrio salmonicida*.

*Vaccine or placebo. **Probiotica or placebo.

Figure 14:
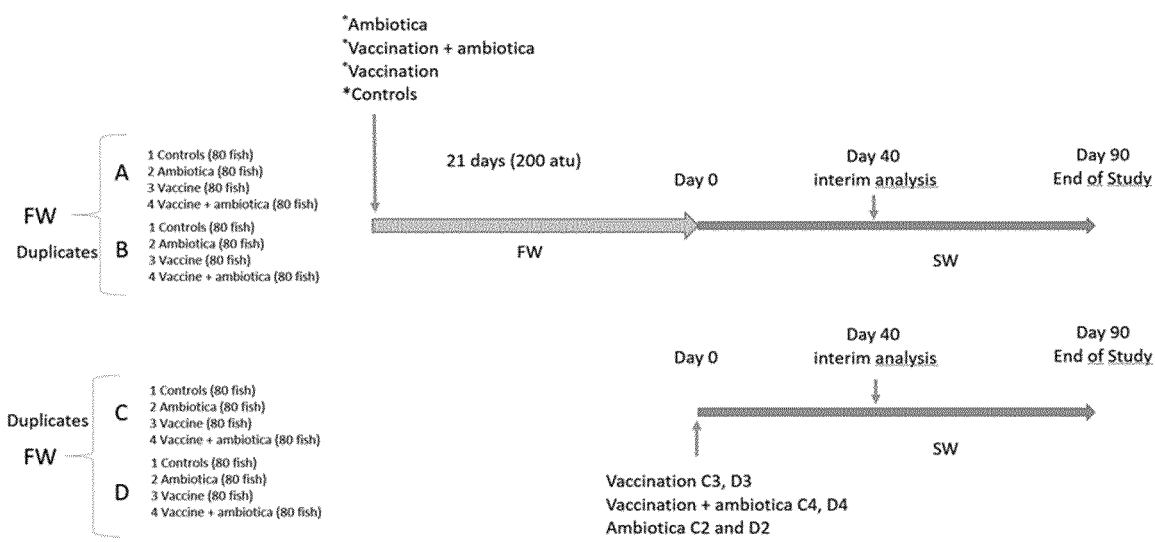

FIG. 14: Detailed sketch of the experimental protocol in Example 7.

Figure 15:
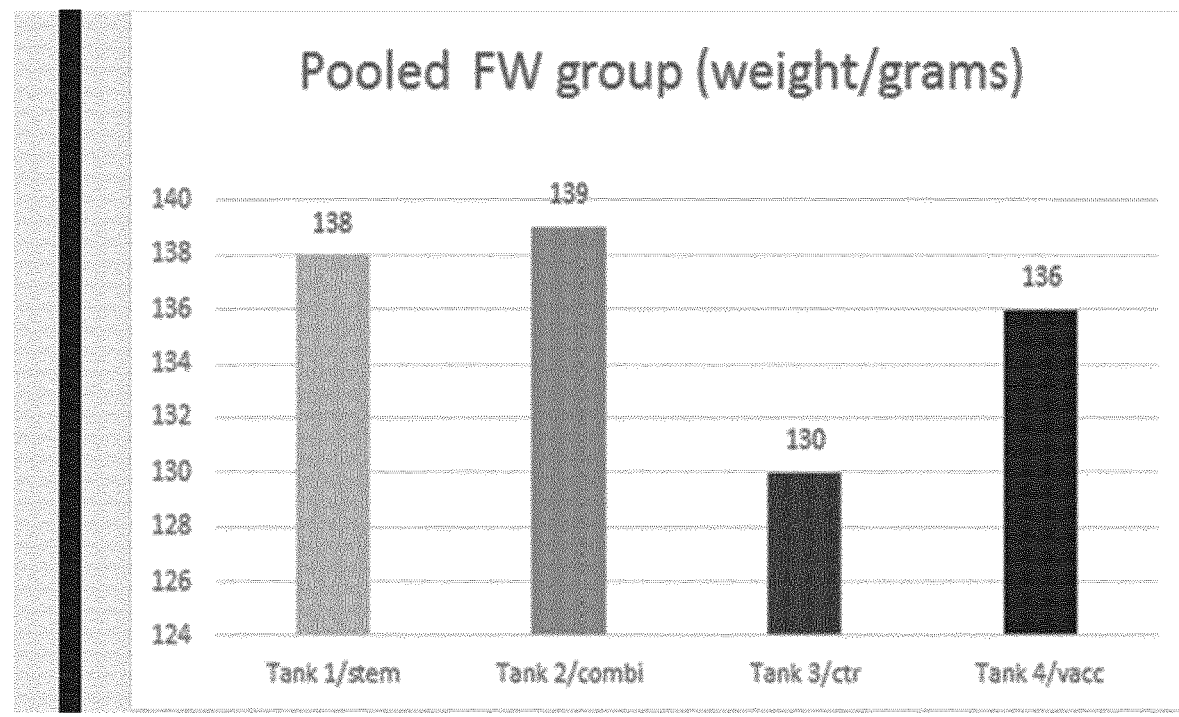

FIG. 15: Weights in average in the freshwater (FW) part of Example 7.

Figure 16:
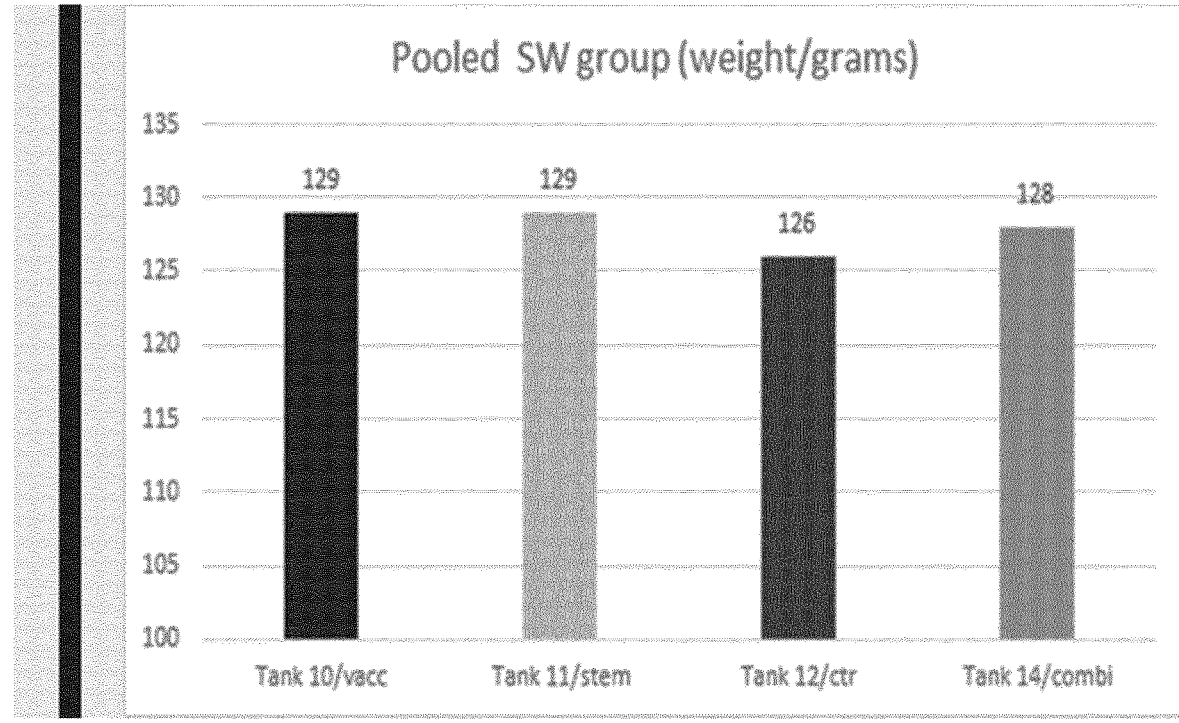

FIG. 16: Weights in average in the saltwater (SW) part of Example 7.

Figure 17:
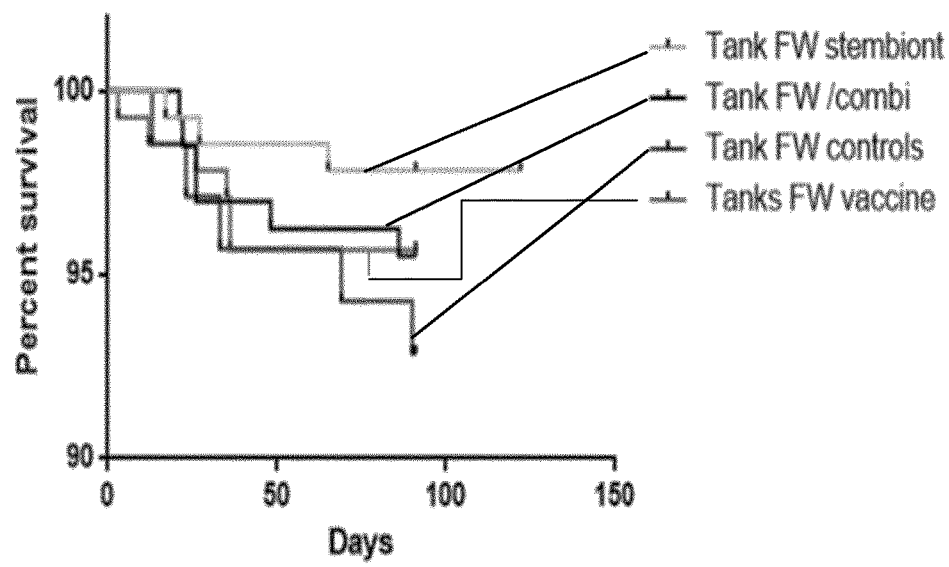

FIG. 17: Survival curves of the various groups of the freshwater (FW) part of Example 7.

Figure 18:
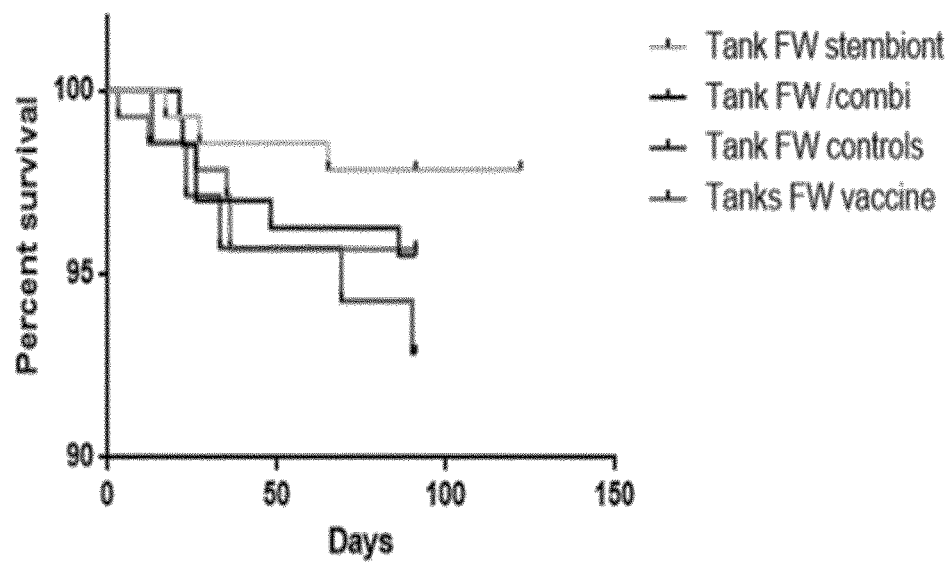

FIG. 18: Survival curves of the various groups of the freshwater (SW) part of Example 7.

Figure 19:
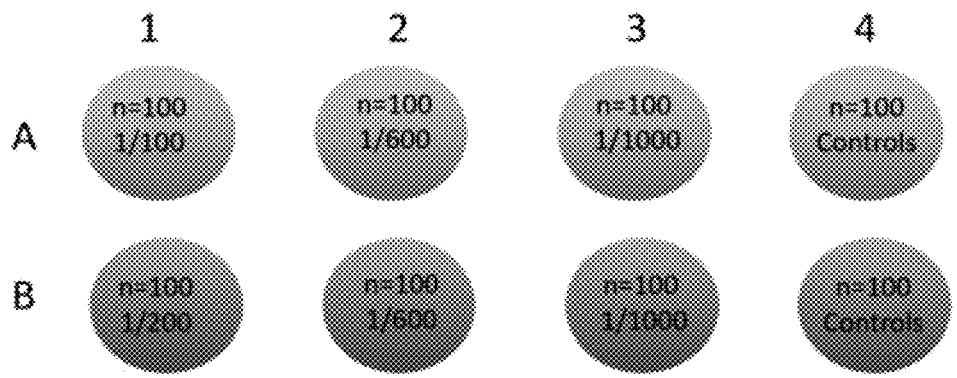

FIG. 19: Overview of the experimental design in Example 8.

Figure 20:
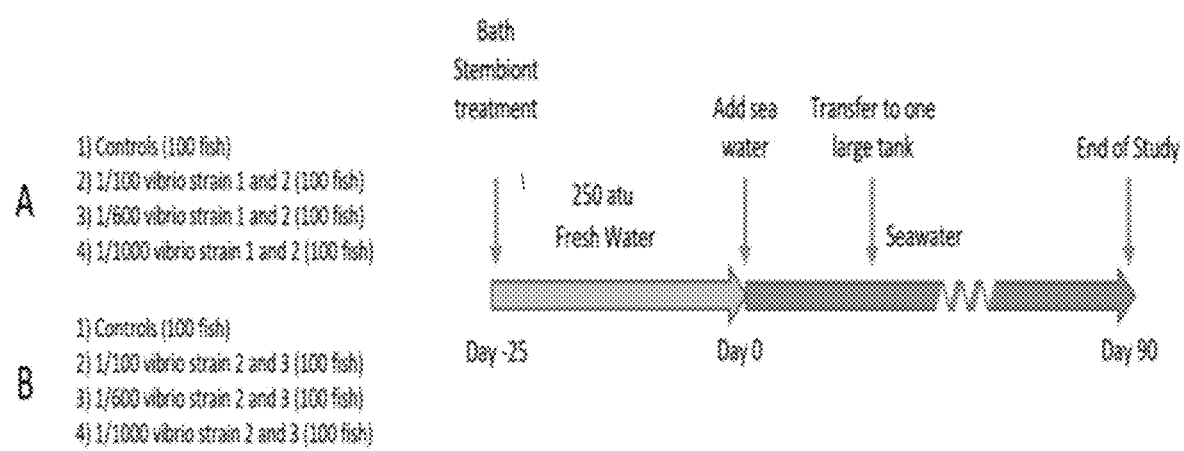

FIG. 20: Detailed sketch of the experimental protocol in Example 8.

Figure 21:
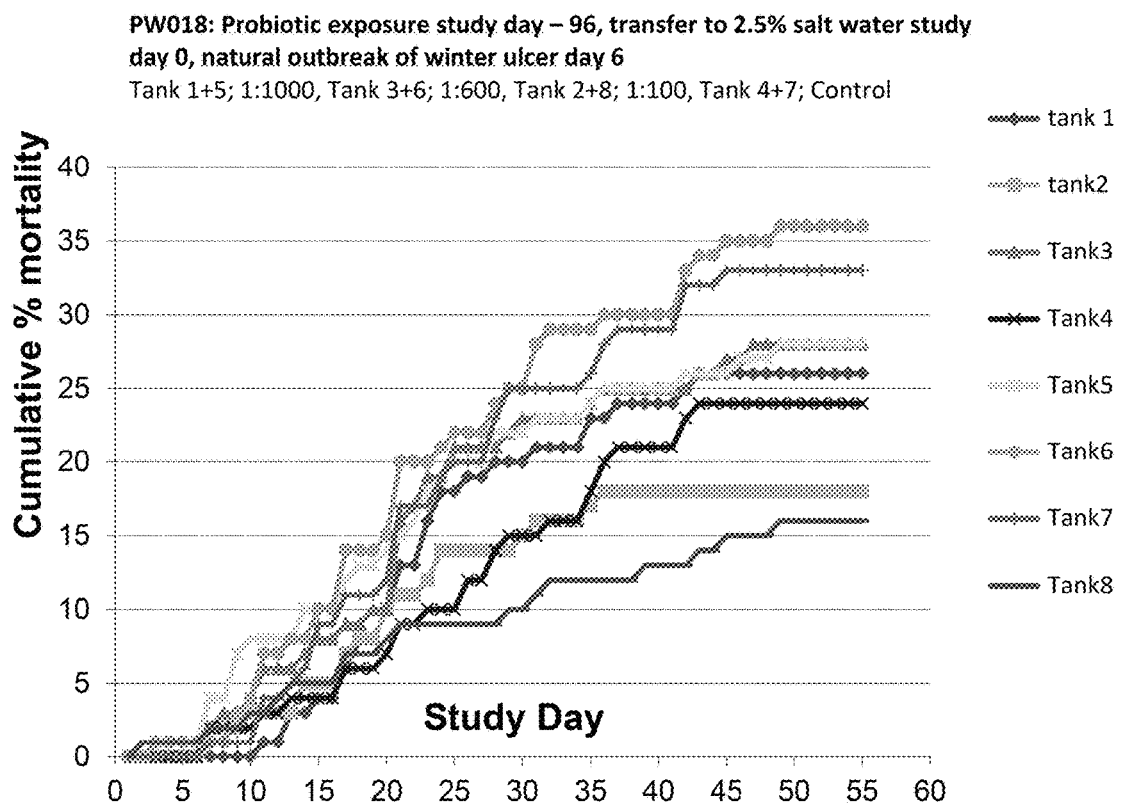

FIG. 21: Cumulative mortality curves of the various trial groups in Example 8.

Figure 22:
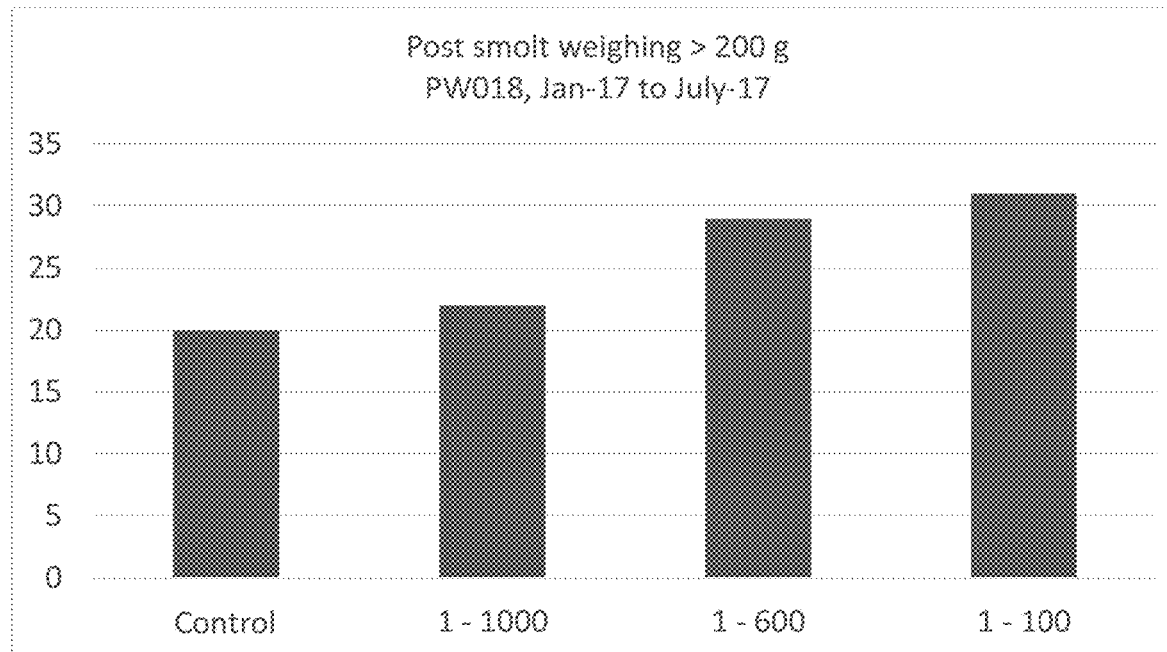

FIG. 22: Number of post smolts above 200 grams in the various trial groups in Example 8.

Figure 23:
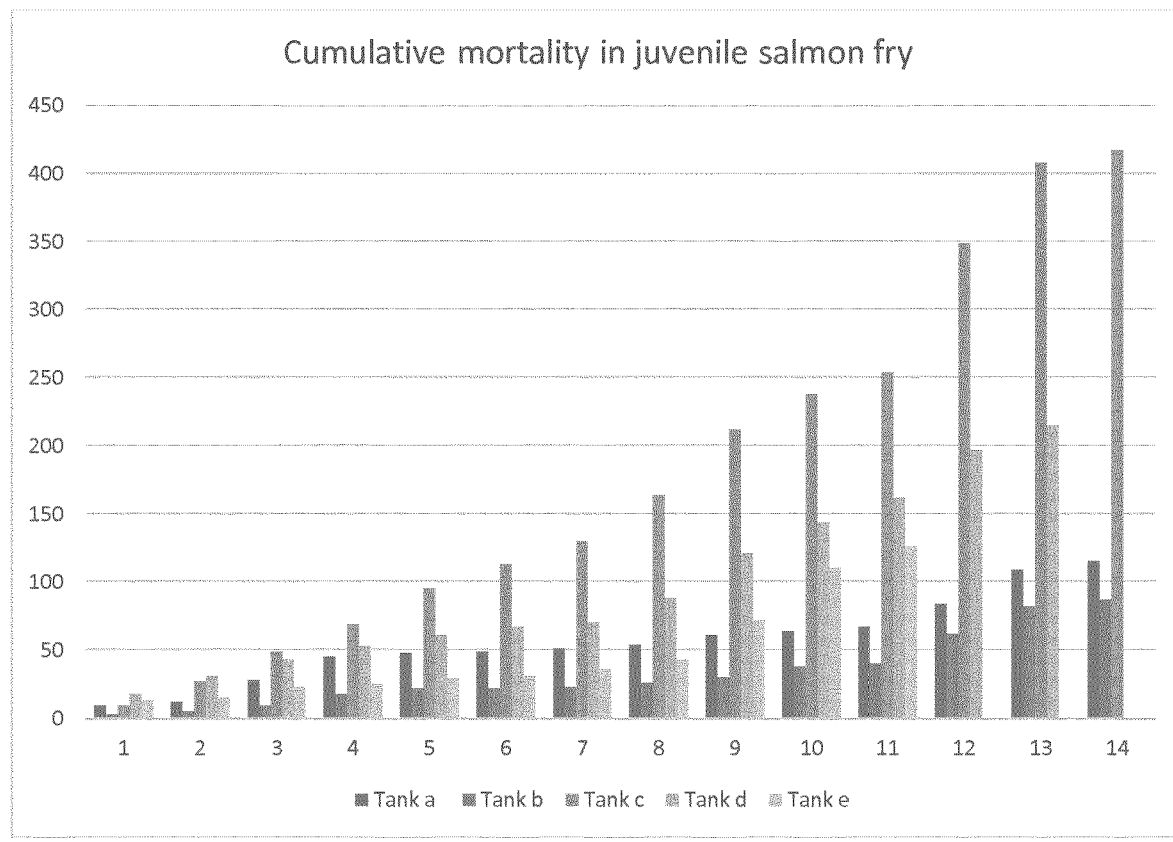

FIG. 23: Cumulative mortality curves of the various trial groups in Example 10.

Figure 24:
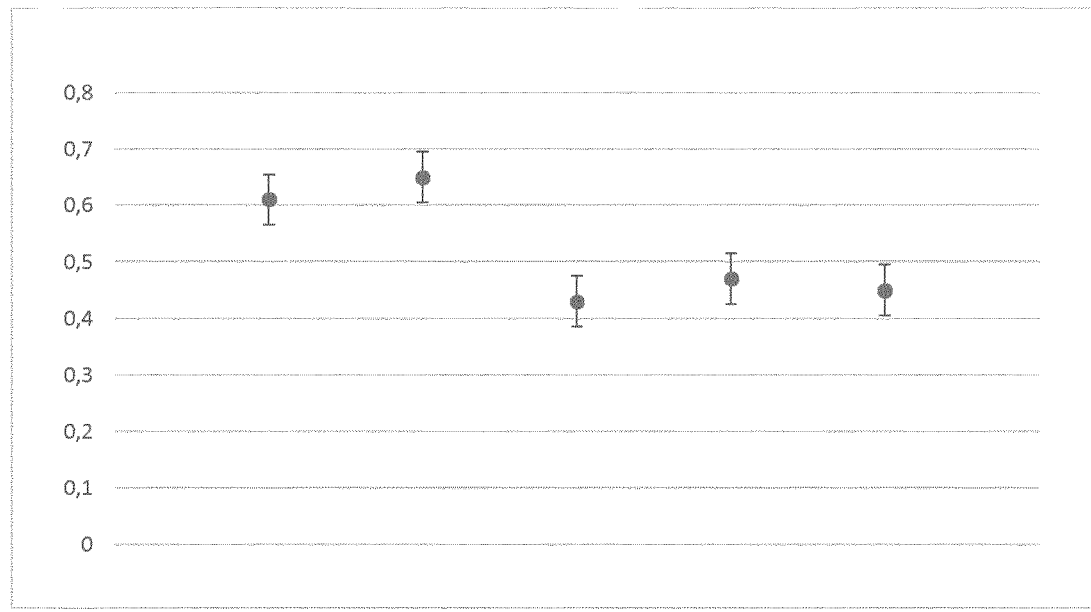

FIG. 24: Average weight in grams of 20 randomly selected live fry measured 14 weeks after start of the trial of Example 10. Tank a from left to Tank e on the right side.

Figure 25:
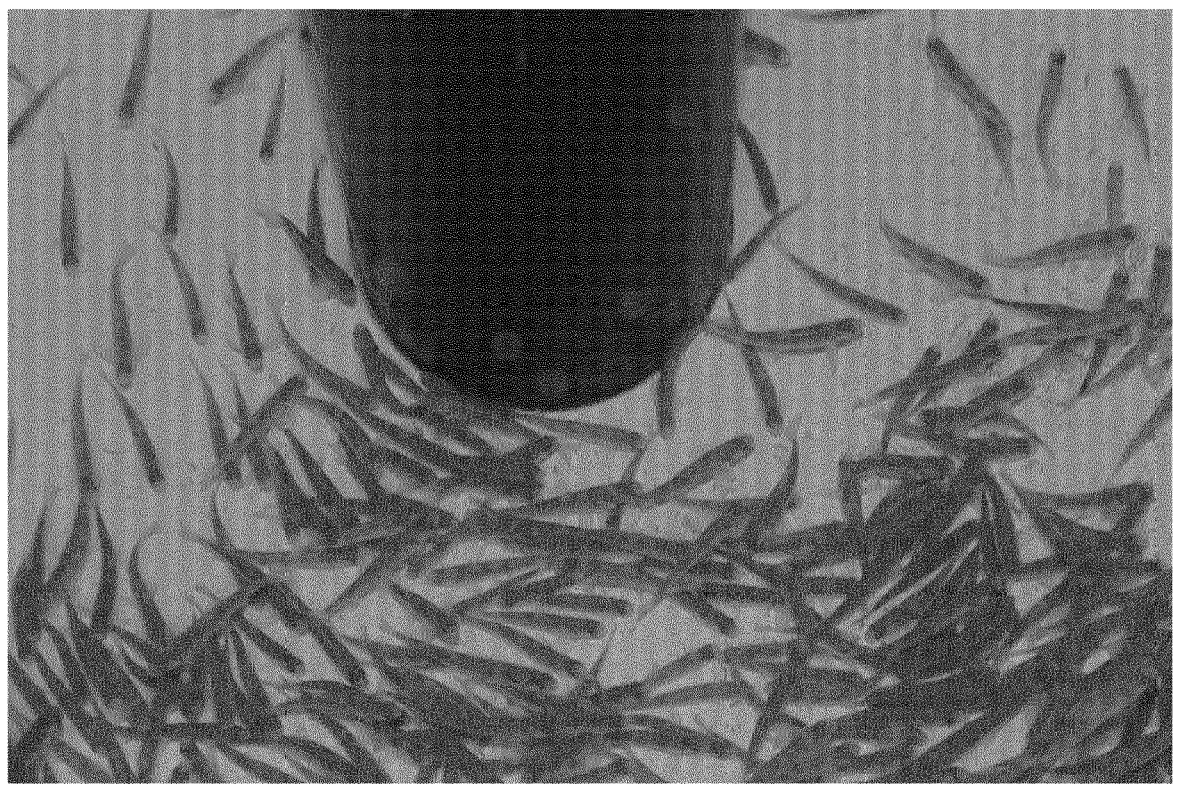

FIG. 25: Fry from Tank b of Example 10 in week 10 three weeks after transfer to the research RAS facility with *Saprolegnia* infestation.

Figure 26:
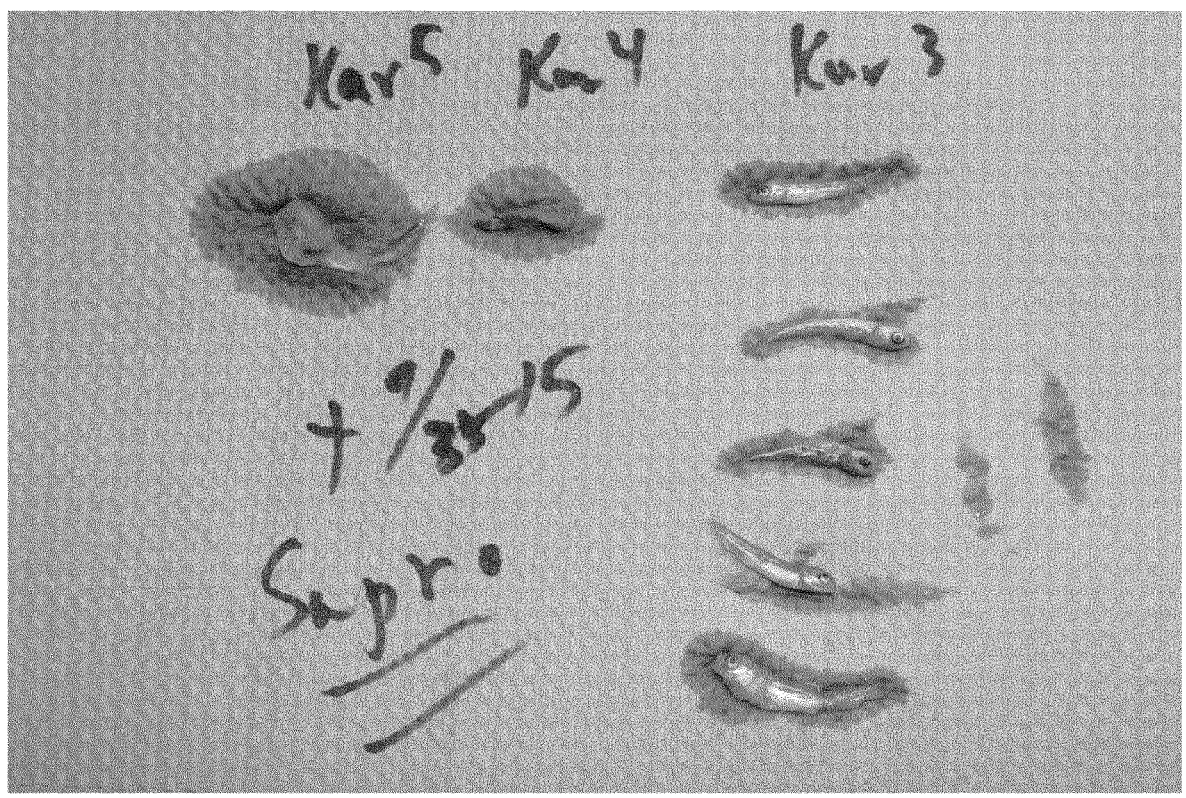

FIG. 26: Photo of dead fry from week 9 in the trial of Example 10. *Saprolegnia* is growing like "cotton wool" from the gills and other parts of the dead fish from Tank c (3), d (4) and e (5).

Figure 27:
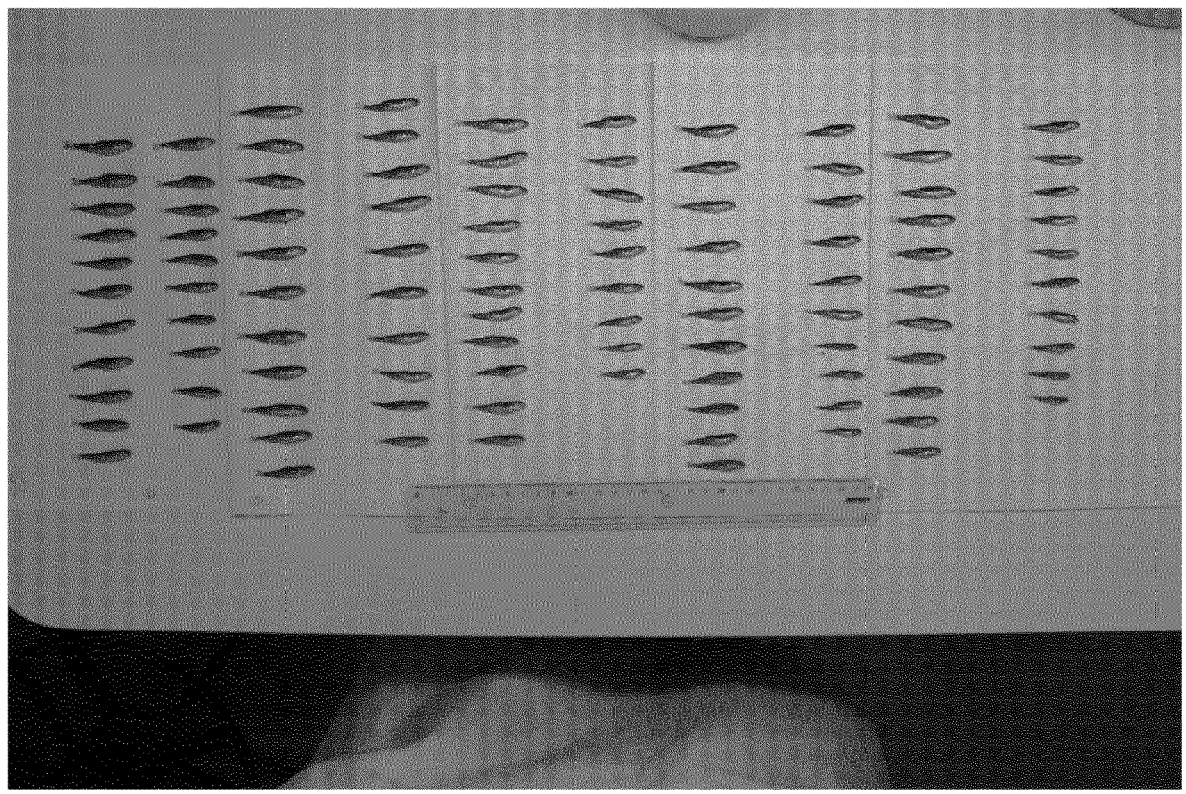

FIG. 27: Photo of the 20 fry that were euthanized and weighed at the end of the trial of Example 10 in week 14. From left the 20 fry in two rows marked with "1" is the fry from Tank A and so on towards the right where fry from Tank e is located in the two rows to the very right marked as "5".

Figure 28:

FIG. 28: Photo of fry in Tank b taken in week 2 of the trial of Example 10 at the first facility.

Figure 29:

FIG. 29: Aquarium design for the probiotic study PW025 showing the 12 experimental freshwater aquaria of 50 liter FIG. 30: Atlantic salmon fingerlings in 50 liter glass aquaria with flow-through freshwater supply FIG. 31: Atlantic salmon fry weights from 5. April 2018 in gram sorted with the heaviest fry to the left, Tank 1 to 12.

Figure 32:
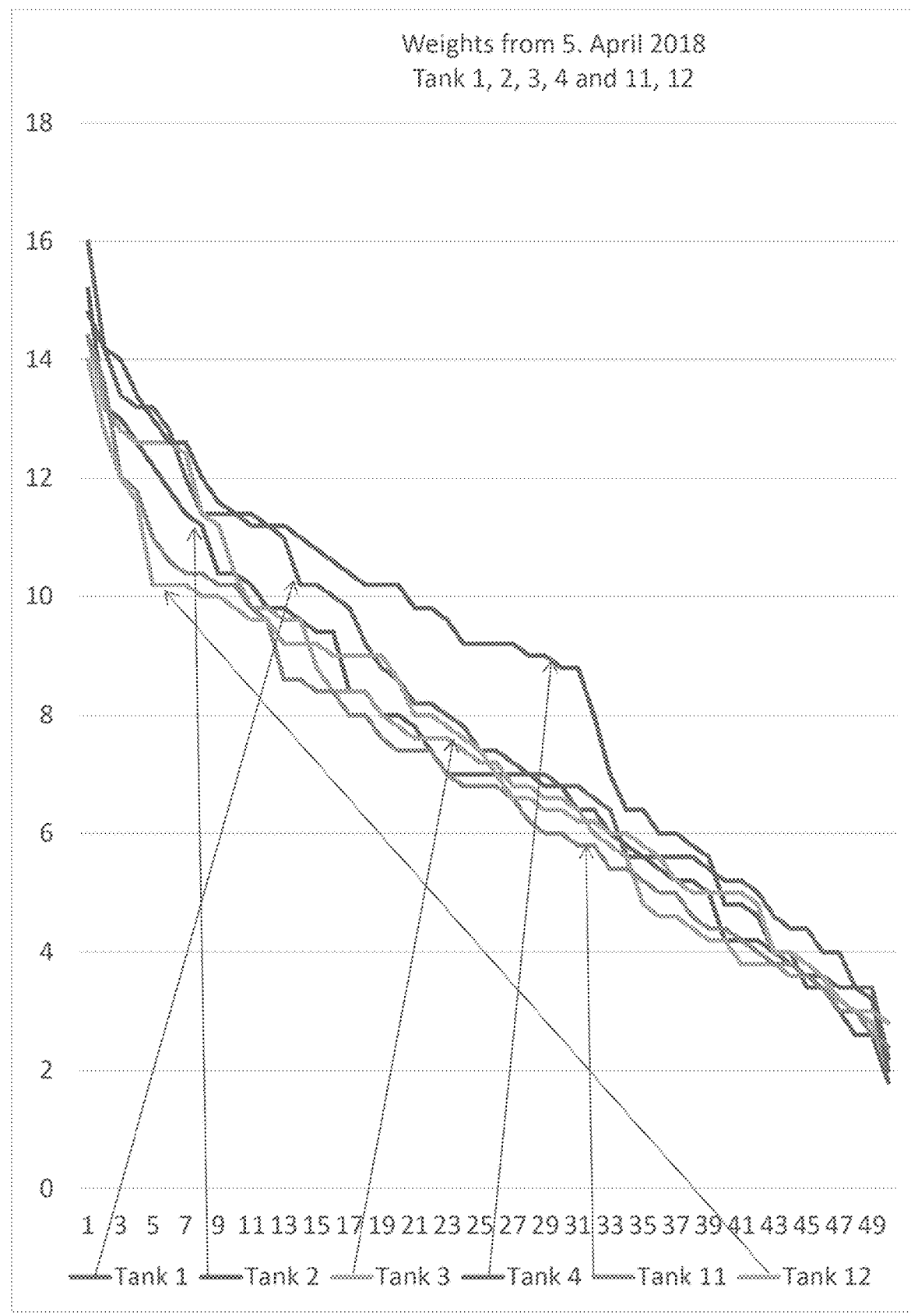

FIG. 32: Atlantic salmon fry weights from 5. April 2018 in gram sorted with the heaviest fry to the left, Tank 1, 2, 3, and 4 as probiotic tanks and 11 and 12 as control tanks.

Figure 33:
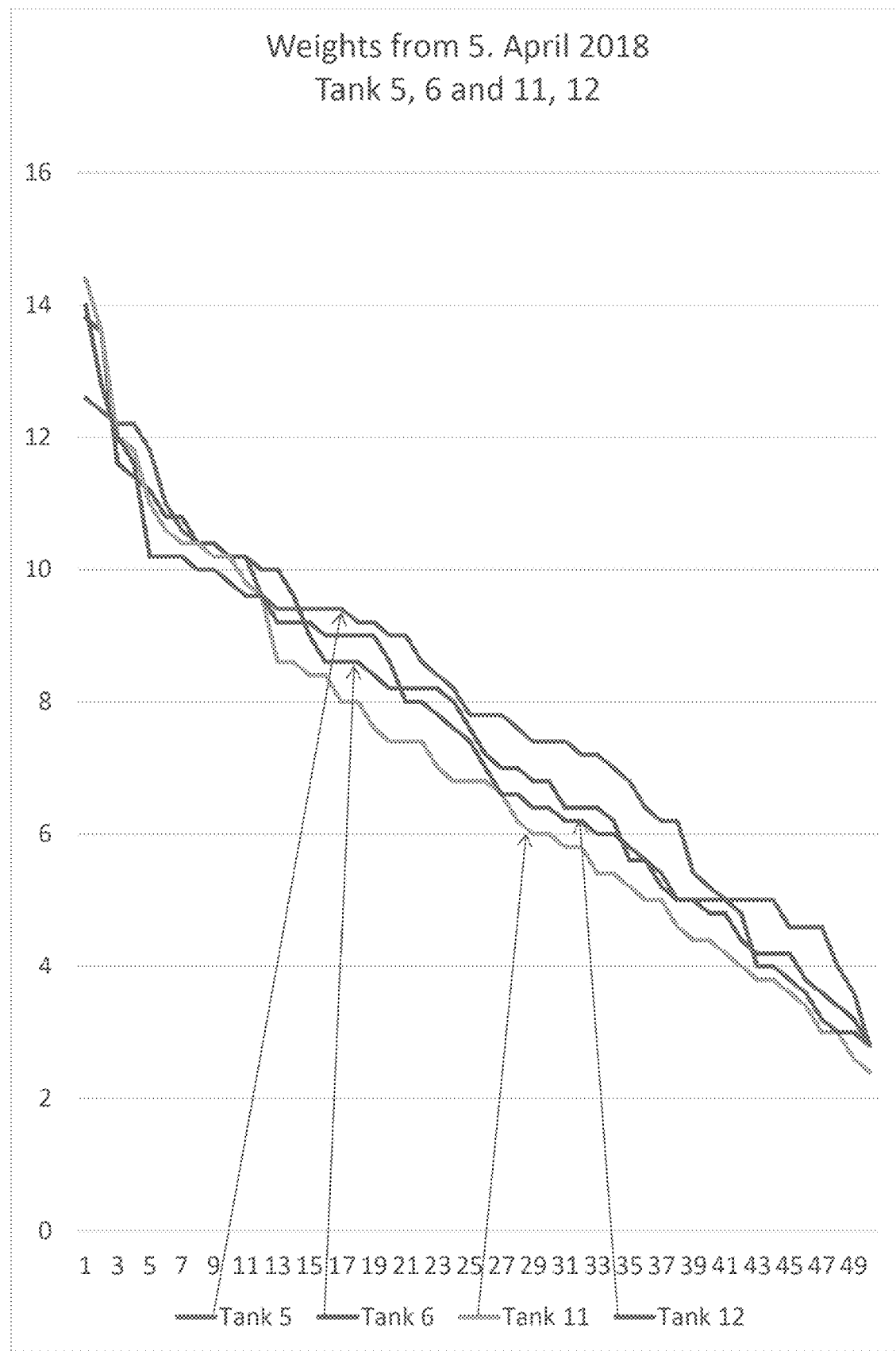

FIG. 33: Atlantic salmon fry weights from 5. April 2018 in gram sorted with the heaviest fry to the left, Tank 5 and 6 as probiotic tanks and 11 and 12 as control tanks.

Figure 34:
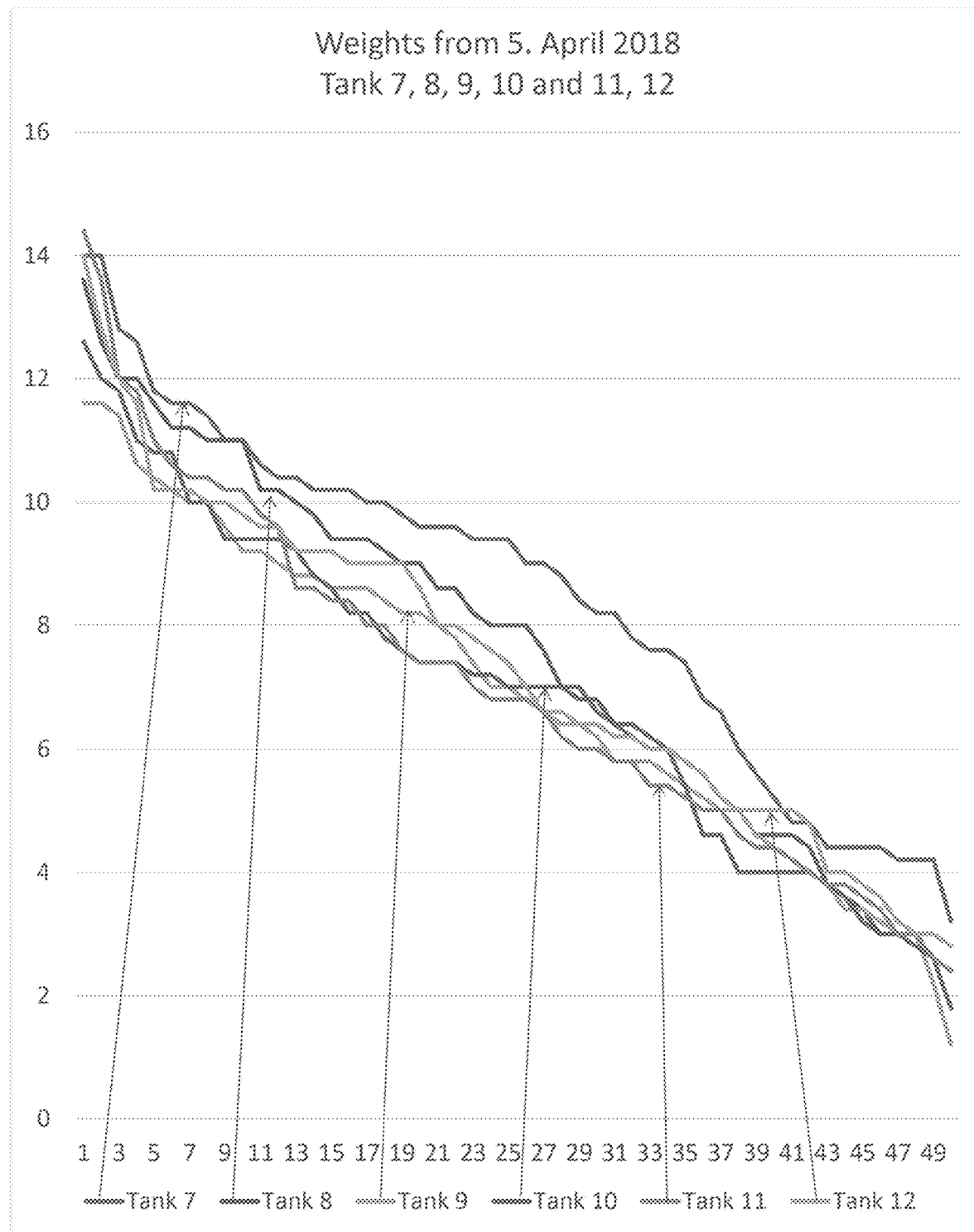

FIG. 34: Atlantic salmon fry weights from 5. April 2018 in gram sorted with the heaviest fry to the left, Tank 7, 8, 9 and 10 as probiotic tanks and 11 and 12 as control tanks.

Figure 35:
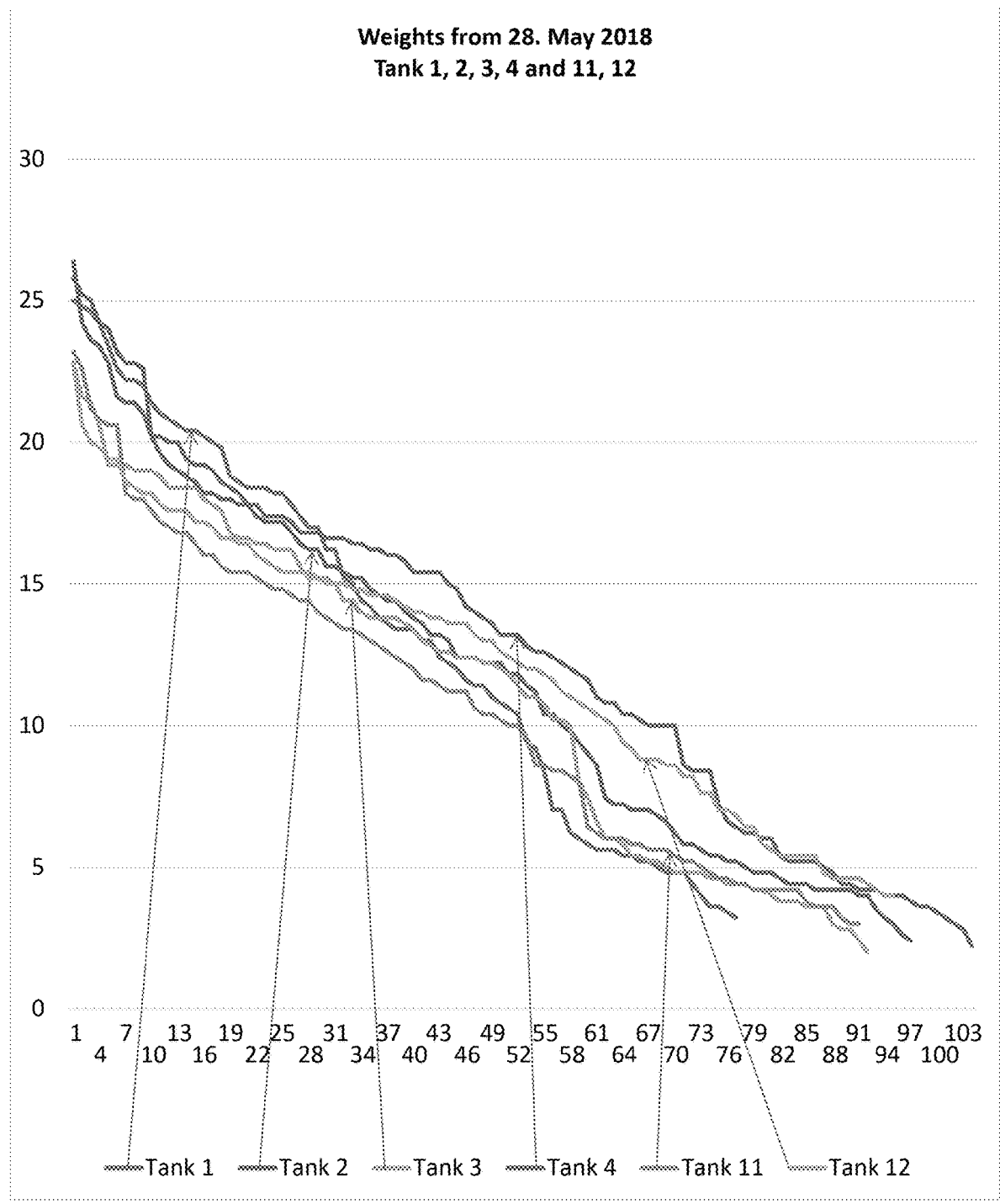

FIG. 35: Atlantic salmon fry weights from 28. May 2018 in gram sorted with the heaviest fry to the left, Tank 1, 2, 3 and 4 as probiotic tanks and 11 and 12 as control tanks.

Figure 36:
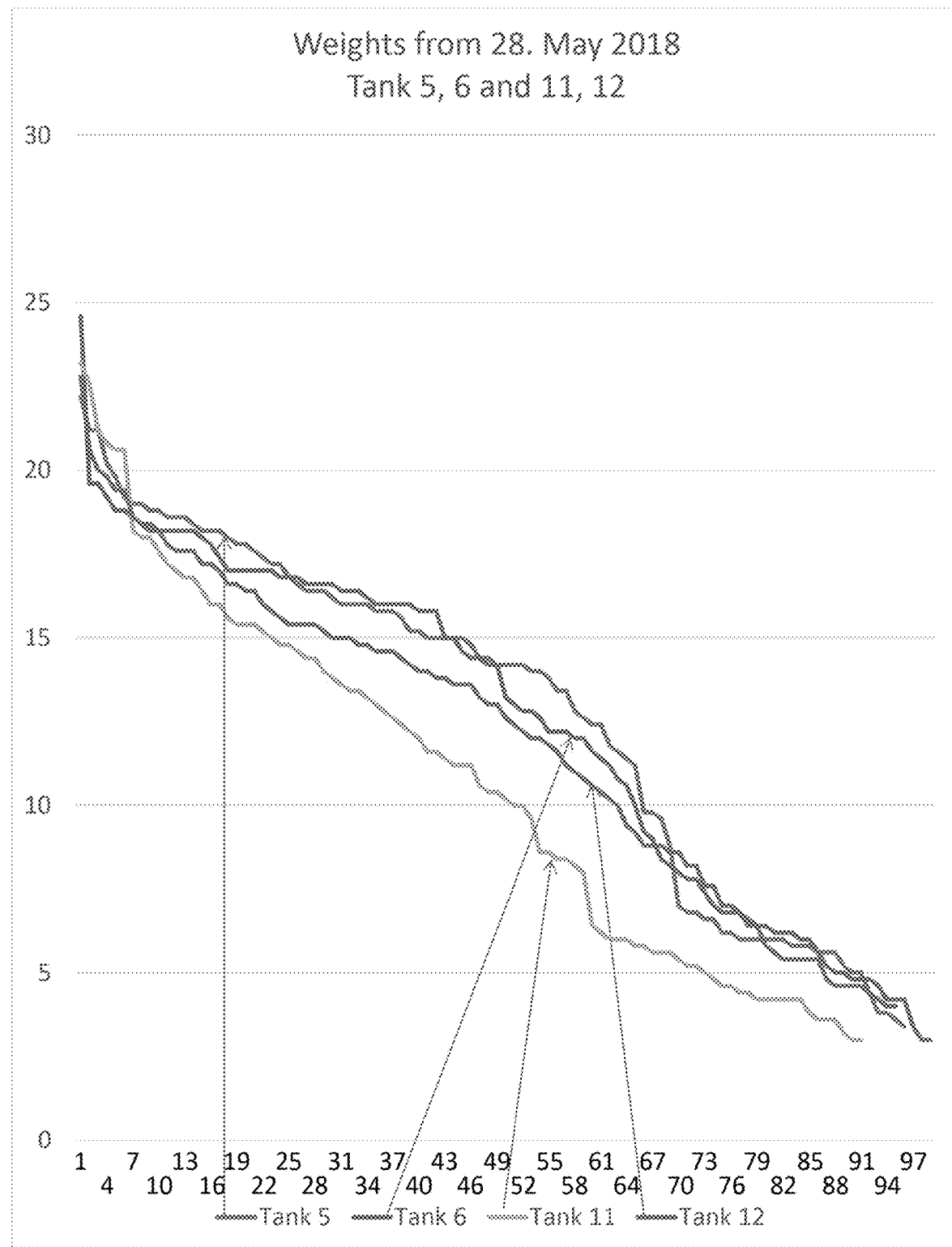

FIG. 36: Atlantic salmon fry weights from 28. May 2018 in gram sorted with the heaviest fry to the left, Tank 5 and 6 as probiotic tanks and 11 and 12 as control tanks.

Figure 37:
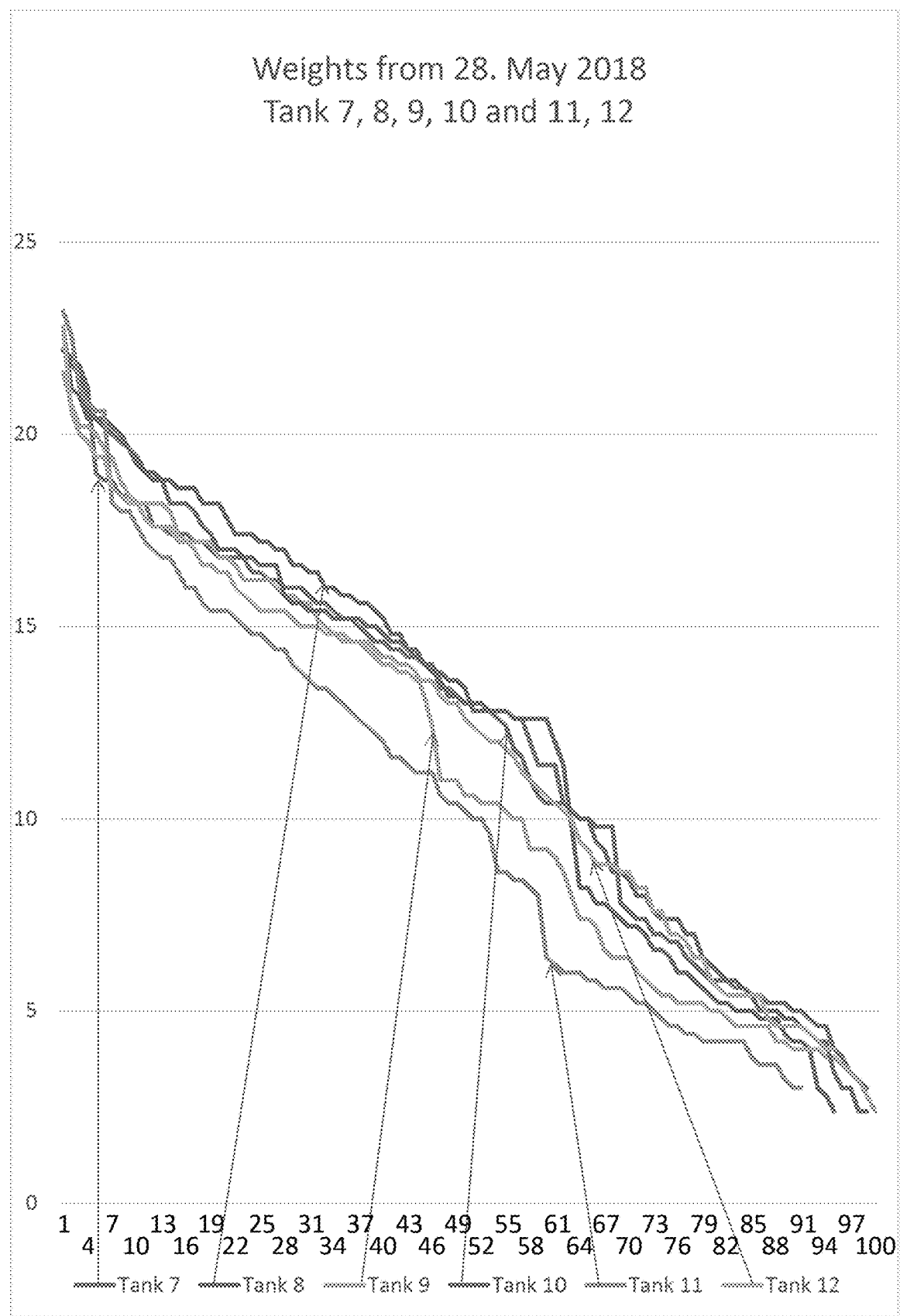

FIG. 37: Atlantic salmon fry weights from 28. May 2018 in gram sorted with the heaviest fry to the left, Tank 1, 2, 3 and 4 as probiotic tanks and 11 and 12 as control tanks.

Figure 38:
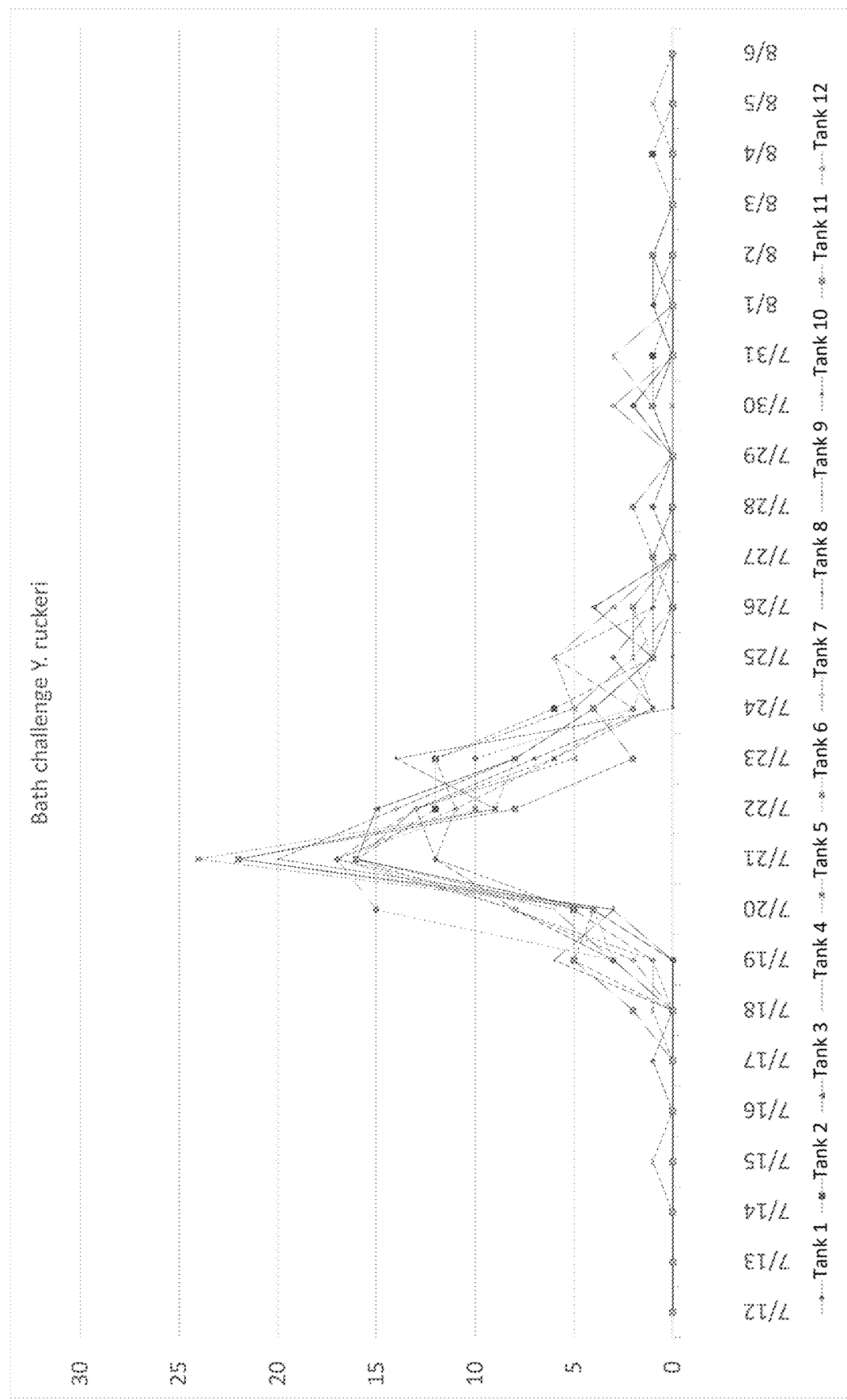
Figure 39:
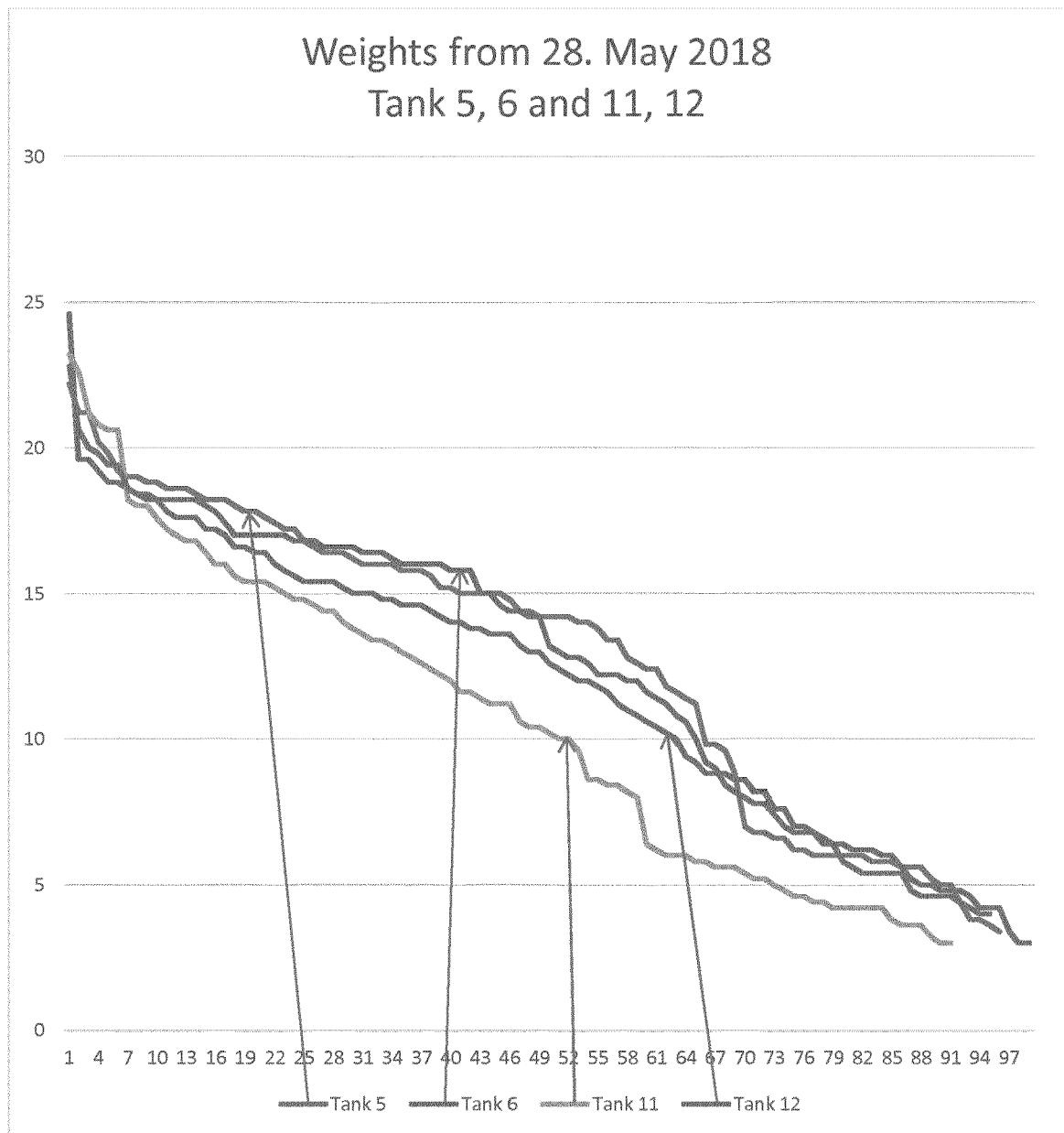
Figure 40:
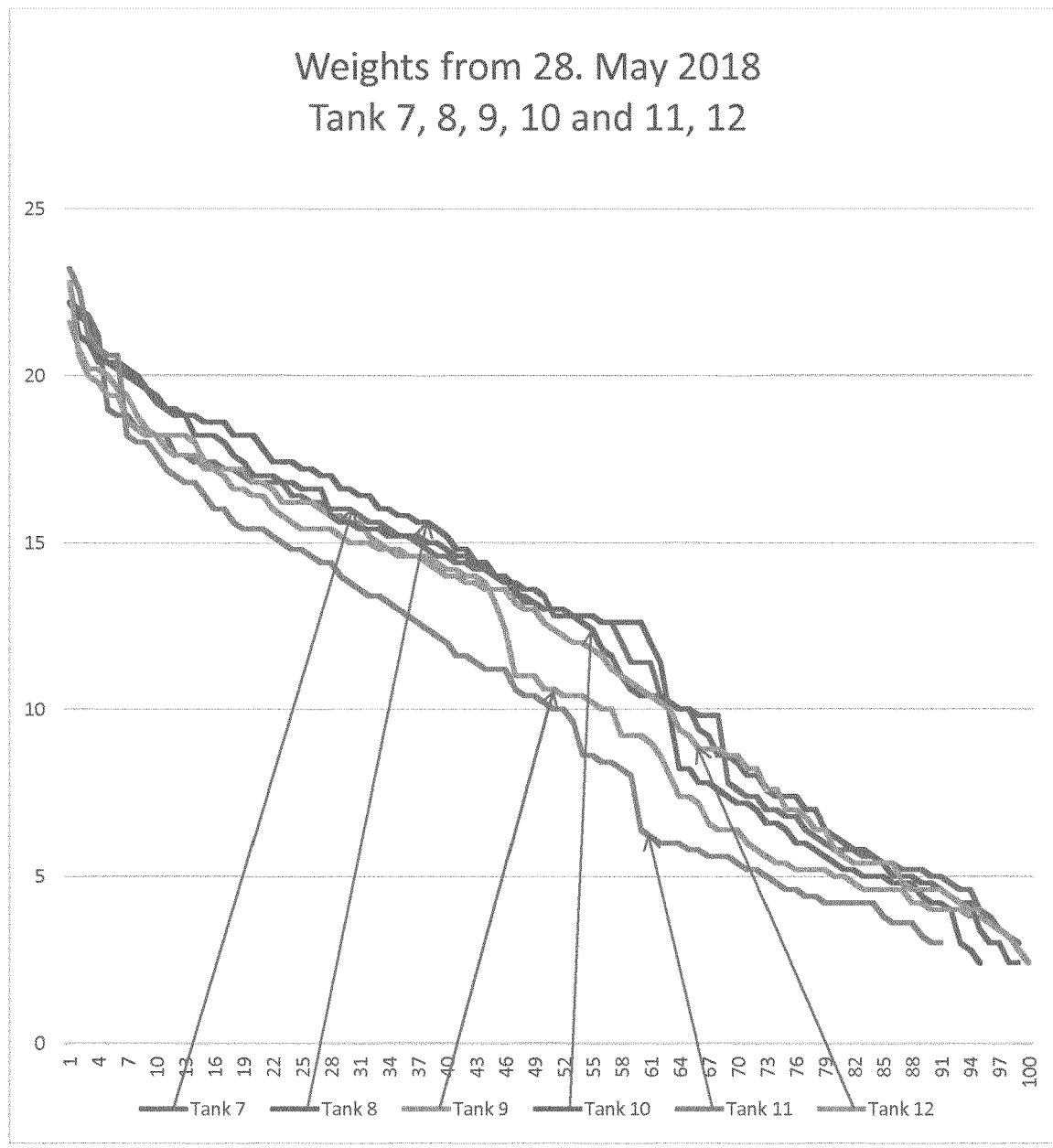
Figure 41:
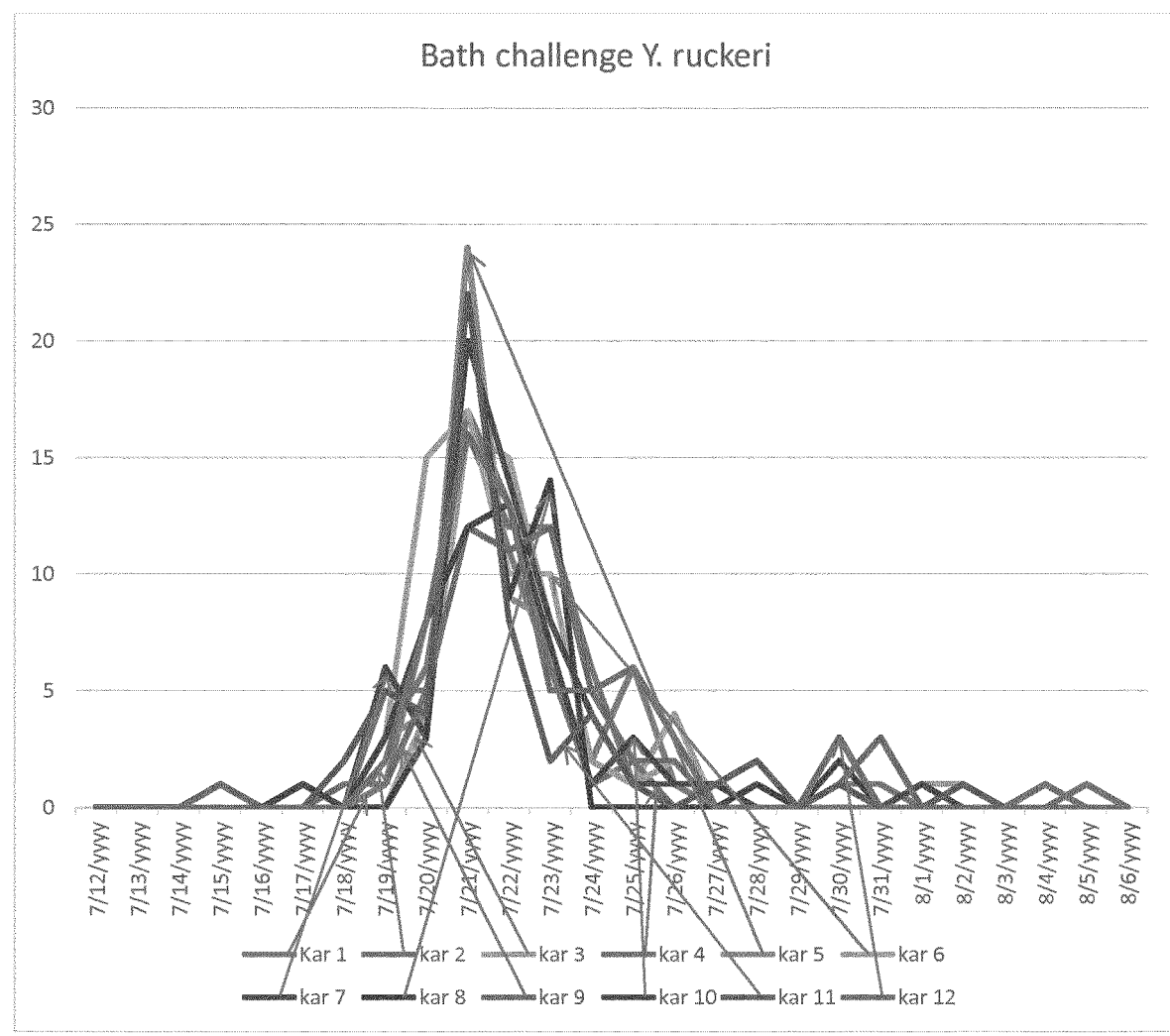

FIG. 38: Mortality curve after bath challenge with *Yersinia ruckeri* at Day 181 (12. July 2018).

DETAILED DESCRIPTION

The present document is directed to increasing the growth rate and/or weight and/or improving the health of farmed fish by the use of novel probiotic bacteria of the genera *Aliivibrio, Psychrobacter* and/or *Pseudomonas*. The bacteria are typically administered via exposure of the fish to water to which the probiotic bacteria have been added but other administration routes, such as via injection, are also possible to use. The probiotic bacteria disclosed herein are of the species *Aliivibrio njordis, Aliivibrio balderis, Aliivibrio nannie, Psychrobacter piscimesodermis, Psychrobacter piscimesenchymalis, Psychrobacter piscisubcutanea, Pseudomonas salmosubcutaneae, Pseudomonas salmosubpectoralis* and *Pseudomonas salmointermuscularis*.

Three exemplary novel species of *Aliivibrio* have been isolated in Norway and deposited according to the Budapest Treaty on Jun. 17, 2016, at the National Collection of Industrial and Marine Bacteria (Ferguson Building, Craibstone Estate, Bucksburn, Aberdeen, AB21 9YA, Scotland, United Kingdom). These exemplary strains are *A. njordis* (B1-25, 18-1/2013 mandib V11) which is given the accession number NCIMB 42593, *Aliivibrio balderis* (B1-24, 18-1/2013 kidn V12) which is given accession number NCIMB 42592, and *Aliivibrio nannie* (B8-24, 313/2013 kidn V13) which is given accession number NCIMB 42594.

Further, three exemplary novel species of *Psychrobacter* have been isolated in Norway and deposited according to the Budapest Treaty on Jan. 4, 2018, at the National Collection of Industrial and Marine Bacteria (Ferguson Building, Craibstone Estate, Bucksburn, Aberdeen, AB21 9YA, Scotland, United Kingdom). These exemplary strains are *Psychrobacter piscimesodermis* Fisk 1, 41, 6/3-2014 Atl. Salm, which is given the accession number NCIMB 42947, *Psychrobacter piscimesenchymalis* Fisk 2, 42, 6/3-2014 Atl. salm, which is given the accession number NCIMB 42948 and *Psychrobacter piscisubcutanea* Fisk 3, 43, 6/3-2014 Atl. Salm, which is given the accession number NCIMB 42949.

Also, three exemplary novel species of *Pseudomonas* have been isolated in Norway and deposited according to the Budapest Treaty on Dec. 20, 2018, at the National Collection of Industrial and Marine Bacteria (Ferguson Building, Craibstone Estate, Bucksburn, Aberdeen, AB21 15 9YA, Scotland, United Kingdom). These exemplary strains are *Pseudomonas salmosubcutaneae* Fisk 3, 13/5-2014, hb, Atl. salm. which is given the accession number NCIMB 43330,

*Pseudomonas salmosubpectoralis* Fisk 3, 13/5-2014, ba, Atl. salm. which is given accession number NCIMB 43331, and *Pseudomonas salmointermuscularis* Fisk 4, 13/5-2014, ha, Atl. salm. which is given accession number NCIMB 43332. The depositor of these three *Pseudomonas* strains is Henning Sørum on behalf of Previwo AS (company registration number 912 777 022), Sofie gate 88A, 0454 Oslo, Norway.

For all aspects of the present document, when it is referred to a species of *Aliivibrio njordis, Aliivibrio balderis, Aliivibrio nannie, Psychrobacter piscimesodermis, Psychrobacter piscimesenchymalis, Psychrobacter piscisubcutanea, Pseudomonas salmosubcutaneae, Pseudomonas salmosubpectoralis* or *Pseudomonas salmointermuscularis*, it is to be understood that the respective exemplary deposited strains of these species disclosed herein may be used for such an aspect even though this may not be explicitly mentioned.

Probiotics have previously been used in fish farming mainly as a food supplement for farmed fish like salmonids. Administration of probiotic bacteria through bathing procedures has mainly been applied for shrimp, shellfish and early feeding and even pre-feeding stages of fin-fish like halibut and Atlantic cod. However, it has now been found that it is possible to administer probiotic bacteria via the water the fish is contained in to get a beneficial effect on the fish, such as Atlantic salmon, even in the smolt stage.

Although it has previously been demonstrated that pathogenic bacteria, such as *Moritella viscosa* and *Aliivibrio salmonicida* enter fish via the skin as the main port of infection in addition to uptake through the intestine and gills, it has not previously been demonstrated that the growth of the fish (rate of weight increase) can be increased by topical administration (i.e. for instance as by immersion as dipping or bathing) of probiotic bacteria to the skin of the fish.

Further, it has not previously been demonstrated that wound formation on the skin of the fish can be treated and/or prevented by the topical administration of probiotic bacteria to the skin of the fish. In addition to the topical effect, the probiotic bacteria is passing through the skin of the fish as their close genetic relatives that are pathogens are doing, like *Aliivibrio salmonicida*. An effect from this entrance in the fish is that the probiotic bacteria also can prevent septicemic infections in the fish.

The present document for the first time demonstrates that it is possible to administer probiotic bacteria to fish, such as smolts of Atlantic salmon, by providing the bacteria to water and exposing the fish to the bacteria-containing water. By this administration, the main route of entry of the probiotic bacteria is via the skin of the fish (i.e. topically).

Two main effects have been observed to occur after the administration of the probiotic bacteria. One is the non-medical effect of an increased growth of the fish, as demonstrated by an increase in weight as compared to untreated fish. The other is the medical effect of prevention and/or treatment of skin wounds (ulcers, lesions), as demonstrated by a reduced number of wounds of the skin as compared to untreated fish.

Also, administering probiotic bacteria to the life cycle of Atlantic salmon is expected to reduce the melanization of the slaughtered filets. Varying from 10 to 70% of slaughtered Atlantic salmon have reduced quality of the meat because of increased number of spots of melanin depositions caused by melanomacrophages attracted to the muscle because of inflammation. Probiotic bacteria will normally reduce inflammation and therefore also increase the meat quality that is considered having a value of at least one hundred million euro annually only in Norway. There are also reasons to believe that probiotic bacteria can increase the product quality of salmon meat that is used for various smoking and fermentation techniques.

The present document discloses nine novel bacterial species, which all have been found to beneficially affect fish when administered via the fishes' surrounding water. These bacterial species are *Aliivibrio njordis, Aliivibrio balderis, Aliivibrio nannie, Psychrobacter piscimesodermis, Psychrobacter piscimesenchymalis, Psychrobacter piscisubcutanea, Pseudomonas salmosubcutaneae, Pseudomonas salmosubpectoralis* and *Pseudomonas salmointermuscularis*, which are further disclosed in the below. In the context of the present document, these bacteria may be referred to as the probiotic bacteria.

The probiotic bacteria may be administered to the fish by exposing the fish to water to which the probiotic bacteria have been added. Such administration results in a topical administration of the probiotic bacteria to the fish. However, as disclosed elsewhere herein, other means and routes for administration, such as by injection, anal intubation, via spawned eggs, orally or via RAS facilities, may also be used.

The probiotic bacteria disclosed herein may be administered separately or in any combination of two or more of the species and/or different strains of the different species. All nine species of probiotic bacteria disclosed herein have the beneficial effects on growth (weight increase) and prevention/treatment of microbial infections, independently on whether or not they are used separately or in any combination. Bacteria of the different genera and/or different strains may be used at any relative ratio. However, typically, the ratio is about 1:10 to about 10:1 between any two species/strains when the bacteria are used in combination. For example, the ratio between any two species/strains when the bacteria are used in combination may be 1:4 to 4:1, 1:3 to 3:1, 1:2 to 2:1 or 1:1. However, it may also be about 1:100 to 100:1.

Probiotic bacteria of the different species disclosed herein and/or different strains within the same species may be mixed before administration. The different species of probiotic bacteria and/or different strains within the same species may also be cultured together in the same culture. For example, all nine species or any mix of two or more of the species may be cultured together. It is also possible to culture two or more strains of the same species together or in combination with one or more strains of another species.

The present document is also directed to a probiotic composition comprising one or more of a probiotic bacterium selected from the group consisting of *Psychrobacter piscimesodermis, Psychrobacter piscimesenchymalis, Psychrobacter piscisubcutanea, Pseudomonas salmosubcutaneae, Pseudomonas salmosubpectoralis* and *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Ati. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. salm. Such a composition may further comprise one or more of a probiotic bacterium selected from the group consisting of *Aliivibrio njordis, Aliivibrio balderis* and *Aliivibrio nannie*, such as *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13).

Probiotic bacteria of the different species and/or different strains within the same species may also be added separately but to the same volume of water for the fish to be exposed to the different bacteria simultaneously. It is also possible to expose the fish to probiotic bacteria of the different species disclosed herein and/or strains of one or more of the species sequentially by adding one or more probiotic bacterial species/strains before the addition of one or more further probiotic bacterial species/strains. If such a sequential addition of the probiotic bacteria is to be used, it is possible to add the bacteria sequentially but without removing previously added bacteria or to effect removal of previously added bacteria before new bacteria are added, e.g. by exchanging the volume of bacteria containing water for new water before addition of further bacteria.

Exemplary strains of probiotic bacteria of the species A. njordis, A. balderis and A. nannie that may be used for the purposes of the present document are Aliivibrio njordis strain B1-25, 18-1/2013 mandib VI1, Aliivibrio balderis B1-24, 18-1/2013 kidn VI2, and Aliivibrio nannie B8-24, 31-3/2013 kidn VI3. Exemplary strains of probiotic bacteria of the genus Psychrobacter are Psychrobacter piscimesodermis Fisk 1, 41, 6/3-2014 Atl. Salm, (NCIMB 42947), Psychrobacter piscimesenchymalis Fisk 2, 42, 6/3-2014 Atl. Salm (NCIMB 42948) and Psychrobacter piscisubcutanea Fisk 3, 43, 6/3-2014 Atl. Salm (NCIMB 42949). Exemplary strains of probiotic bacteria of the genus Pseudomonas are Pseudomonas salmosubcutaneae Fisk 3, 13/5-2014, hb, Atl. salm. (NCIMB 43330), Pseudomonas salmosubpectoralis Fisk 3, 13/5-2014, ba, Atl. salm. (NCIMB 43331) and Pseudomonas salmointermuscularis Fisk 4, 13/5-2014, ha, Atl. Salm. (NCIMB 43332). The present document is however not limited to the use of these specific strains, but any strain of the nine bacterial species may be used provided it has a probiotic activity similar to the respective exemplary strain of each species.

The fish that are to be exposed to the probiotic bacteria disclosed herein are any kind of fish, in particular farmed fish and more particularly fish of the family Salmonidae, such as salmon, trout, chars, freshwater whitefishes or graylings. The fish may also be freshwater fish as northern pike (Esox lucius) perch (Perca fluviatilis), zander (Sander lucioperca) and carp (Cyprinus carpio). As mentioned above, the fish may be exposed to the probiotic bacteria one or more times, e.g. during different growth stages. In addition marine fish species like the various wrasse species and lump sucker fish used as cleaner fish in controlling sea lice infestations in the marine net pens may have beneficial effects of the nine probiotic bacteria since they are also infected by several of the same wound and ulcer pathogens as salmonid fish. The same will apply to many different marine species like for instance squid species.

Bacterial Strains

In the below the isolation and characterization of exemplary strains of the probiotic bacteria is disclosed. The present document is however not limited to the use of these specific strains, but any strain of the probiotic bacteria, which have a comparable effect in increasing the weight of fish and/or in treating/preventing microbial infection as these exemplary strains, may be used for the purposes of the present document.

Psychrobacter Strains

Sequencing of the 16S rDNA gene of the three Psychrobacter strains links all three of them to genus Psychrobacter by comparing to the total DNA sequence database in GenBank. All three strains are showing unique 16S rDNA sequences which supports that they are three independent species. There are no 16S rDNA sequence identity with characterized species within the genus for any of the three strains which supports that the three strains belong to three novel species of genus Psychrobacter.

Psychrobacter piscimesodermis

Psychrobacter piscimesodermis Fisk 1, 41, 6-3/2014 Atl. salm. was isolated from the abdominal wall behind the breast fin of an healthy Atlantic salmon presmolt that had been euthanized for blood sampling on 26. February 2014 in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 1.5-2 mm wide with a convex, shiny, even surface, grey-white and non-hemolytic. The bacterial cells are gram-negative with a typical length from 2 to 5 μm and a diameter of 1 μm. The form of the cells may be coccoid to straight. Psychrobacter piscimesodermis utilizes $NO_3$ degrade urea, assimilate malate and is oxidase positive. L-tryptophane, D-glucose, L-arginine, esculin, gelatin or PNPG are not utilized. D-glucose, L-arabinose, D-mannose, D-mannitol, N-acetyl-glucosamine, D-maltose, potassium gluconate, capric acid, adipic acid, trisodium citrate and phenylacetic acid are not assimilated.

Psychrobacter piscimesenchymalis

Psychrobacter piscimesenchymalis Fisk 2, 42, 6-3/2014 Atl. salm. was isolated from the connective tissue between the muscles of the back of an healthy Atlantic salmon presmolt that had been euthanized for blood sampling on 26. February 2014 in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 2 mm wide with a mucoid, even surface, grey-white and non-hemolytic. The bacterial cells are gram-negative with a typical length from 2 to 5 μm and a diameter of 1 μm. The form of the cells may be coccoid to straight. Psychrobacter piscimesenchymalis utilizes $NO_3$, assimilate malate and is oxidase positive. L-tryptophane, D-glucose, L-arginine, urea, esculin, gelatin or PNPG are not utilized. D-glucose, L-arabinose, D-mannose, D-mannitol, N-acetyl-glucosamine, D-maltose, potassium gluconate, capric acid, adipic acid, trisodium citrate and phenylacetic acid are not assimilated.

Psychrobacter piscisubcutanea

Psychrobacter piscisubcutanea Fisk 3, 43, 6-3/2014 Atl. salm. was isolated from the subcutaneous area on the side of the back fin of an Atlantic salmon presmolt that had been euthanized for blood sampling on 26. February 2014 in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 1.5-2 mm wide with a clear, even surface, transparent and non-hemolytic. The bacterial cells are gram-negative with a typical length from 2 to 5 μm and a diameter of 1 μm. The form of the cells may be coccoid to straight. Psychrobacter piscisubcutanea utilizes $NO_3$ degrade urea, assimilate caprate and malate and is oxidase positive. L-tryptophane, D-glucose, L-arginine, esculin, gelatin or PNPG are not utilized. D-glucose, L-arabinose, D-mannose, D-mannitol, N-acetyl-glucosamine, D-maltose, potassium gluconate, adipic acid, trisodium citrate and phenylacetic acid are not assimilated.

Aliivibrio Strains

Aliivibrio njordis

Aliivibrio njordis (B1-25, 18-1/2013 mandib VI1) was isolated from the mandibula (lower jaw) of an Atlantic salmon that had died on 18 Jan. 2013 in an experimental tank at Solbergstrand, NIVA, Norway, using natural seawater. The isolate was grown on blood agar with 2.5% NaCl added and incubated for four days at +10° C. The colonies are typically 2-3 mm wide with a moist, even surface, a yellowish colour and non-hemolytic. The bacterial cells are gram-negative with a typical length from 2 to 5 µm and a diameter of 1 µm. The form of the cells may be coccoid to straight or comma-shaped typical *vibrio* cells. *A. njordis* utilizes $NO_3$ but are not degrading L-tryptophane, D-glucose, L-arginine, urea, esculin, gelatin or PNPG.

Aliivibrio balderis

Aliivibrio balderis (B1-24, 18-1/2013 kidn VI2) was isolated from the head kidney of an Atlantic salmon that had died on 18 Jan. 2013 in an experimental tank at Solbergstrand, NIVA, Norway, using natural seawater. The isolate was grown on blood agar with 2.5% NaCl added and incubated for four days at +10° C. The colonies are typically 2-3 mm wide with a moist, even surface, a yellowish colour and non-hemolytic. The bacterial cells are gram-negative with a typical length from 2 to 5 µm and a diameter of 1 µm. The form of the cells may be coccoid to straight or comma-shaped typical *vibrio* cells. *A. balderis utilizes $NO_3$* and are fermenting D-glucose and are degrading esculin and PNPG but are not degrading L-tryptophane, L-arginine, urea, or gelatin.

Aliivibrio nannie

Aliivibrio nannie (B8-24, 313/2013 kidn VI3) was isolated from the head kidney of an Atlantic salmon that had died on 31. March 2013 in an experimental tank at Solbergstrand, NIVA, Norway, using natural seawater. The isolate was grown on blood agar with 2.5% NaCl added and incubated for four days at +10° C. The colonies are typically 2-3 mm wide with a moist, even surface, a yellowish colour and non-hemolytic. The bacterial cells are gram-negative with a typical length from 2 to 5 µm and a diameter of 1 µm. The form of the cells may be coccoid to straight or comma-shaped typical *vibrio* cells. *A. nannie* utilizes $NO_3$ and are degrading PNPG but are not degrading L-tryptophane, D-glucose, L-arginine, urea, esculin, or gelatin.

Pseudomonas Strains

Sequencing of the 16S rDNA gene of the three *Pseudomonas* strains links all three of them to genus *Pseudomonas* by comparing to the total DNA sequence database in GenBank. All three strains are showing unique 16S rDNA sequences which supports that they are three independent species. There is no 16S rDNA sequence identity with characterized species within the genus for any of the three strains, which supports that the three strains belong to three novel species of genus *Pseudomonas*.

Pseudomonas salmosubcutaneae

Pseudomonas salmosubcutaneae Fisk 3, 13/5-2014, hb, Atl. salm. was isolated from the subcutaneous tissue on the side of the peduncle close to the tail fin of an Atlantic salmon presmolt of 320 gram that had been euthanized for blood sampling on 13. May 2014 after being held in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 2-3 mm wide with a convex, shiny, even surface, grey-white and non-hemolytic. The bacterial cells are gram-negative with a typical length from 2 to 5 µm and a diameter of 1 µm. The form of the cells may be coccoid to straight. *P. salmosubcutaneae* produces arginine dihydrolase, hydrolyse gelatin, assimilates D-glucose, L-arabinose, D-mannitol, N-acetyl-glucosamine, potassium gluconate, capric acid, malic acid and trisodium citrate and is oxidase positive. NO3, L-tryptophane, D-glucose, urea, esculin, or PNPG are not utilized, degraded or fermented. D-mannose, D-maltose, adipic acid, and phenylacetic acid are not assimilated.

Pseudomonas salmosubpectoralis

Pseudomonas salmosubpectoralis Fisk 3, 13/5-2014, ba, Atl. salm. was isolated from the abdominal wall behind the breast fin of an healthy Atlantic salmon presmolt of 320 gram that had been euthanized for blood sampling on 13. May 2014 after being held in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 2-3 mm wide with a convex, shiny, even surface, grey-white and non-hemolytic. The bacterial cells are gram-negative with a typical length from 2 to 5 µm and a diameter of 1 µm. The form of the cells may be coccoid to straight. *P. salmosubpectoralis* utilizes NO3, produces arginine dihydrolase, degrade urea, hydrolyse gelatin, assimilates D-glucose, D-mannose, D-mannitol, N-acetyl-glucosamine, potassium gluconate, capric acid, malic acid and trisodium citrate and is oxidase positive. L-tryptophane, D-glucose, esculin or PNPG are not utilized. L-arabinose, D-maltose, adipic acid, and phenylacetic acid are not assimilated.

Pseudomonas salmointermuscularis

Pseudomonas salmointermuscularis Fisk 4, 13/5-2014, ha, Atl. salm. was isolated from the intermuscular tissues at the peduncle close to the tail fin of an Atlantic salmon presmolt of 350 gram that had been euthanized for blood sampling on 13. May 2014 after being held in an experimental tank at NMBU aquaculture research station, Ås, using freshwater. The isolation was made after storing the euthanized salmon for four days at +4° C. The isolate was grown on blood agar with 0.5% NaCl and incubated for four days at +10° C. The colonies are typically 2-3 mm wide with a convex, shiny, even surface, grey-white and non-hemolytic. The bacterial cells are gram-negative with a typical length from 2 to 5 µm and a diameter of 1 µm. The form of the cells may be coccoid to straight. *P. salmointermuscularis* utilizes NO3, produces arginine dihydrolase, hydrolyse gelatin, assimilates D-glucose, L-arabinose, D-mannose, D-mannitol, N-acetyl-glucosamine, potassium gluconate, capric acid, malic acid, trisodium citrate and phenylacetic acid and is oxidase positive. L-tryptophane, D-glucose, urea, esculin or PNPG are not utilized. D-maltose and adipic acid are not assimilated.

Growth of the Probiotic Bacteria

The conditions for growth of the bacteria are not critical as long as viable cells are obtained.

The medium used for growing the bacteria is not critical, but any nutrient medium containing all the elements that most bacteria need for growth and which is non-selective may be used, such as Luria Broth, Trypticase Soy Agar, or Nutrient Agar.

The temperature for growing the bacteria is not critical either. Typically, the bacteria are grown at a temperature between 2 and 25° C., such as about 4 to 18° C.

The conditions for growth of the bacteria are not critical as long as viable cells are obtained. The medium used for growing the bacteria is not critical, but any nutrient medium containing all the elements that most bacteria need for growth and which is non-selective may be used, such as Luria Broth, Trypticase Soy Agar, or Nutrient Agar.

The temperature for growing the bacteria is not critical either. Typically, the bacteria are grown at a temperature between 2 and 25° C., such as about 4 to 18° C.

The bacteria may be grown under aerobic, or microaerophilic or even anaerobic conditions. Aerobic conditions may be effected by e.g. vigorously shaking the bacterial cultures while microaerophilic conditions may be effected by e.g. carefully turning the bacterial culture flasks during growth. Growing the bacteria at both microaerophilic and aerobic conditions has been used in the experiments disclosed herein but other conditions may be preferred when the bacteria are going to be used for the purposes disclosed herein.

If bacteria of more than one species and/or strain is to be used, the bacteria may be grown separately (i.e. in single cultures) or in the same culture (i.e. in mixed cultures). If grown separately, bacteria of the different cultures may be mixed before addition to the water or the bacteria of the different cultures. The present document is thus also directed to a probiotic composition comprising one or more of a bacterium selected from the group consisting of *Psychrobacter piscimesodermis, Psychrobacter piscimesenchymalis* and *Psychrobacter piscisubcutanea*, which composition may further comprise one or more of a bacterium selected from the group consisting of *Aliivibrio njordis, Aliivibrio balderis* and *Aliivibrio nannie*. Probiotic bacteria obtained from different cultures (independently of whether single or mixed cultures) may also be added separately but to the same volume of water for the fish to be exposed to the different bacteria simultaneously.

Medical and Non-Medical Uses of the Probiotic Bacteria

Non-Medical Use of the Probiotic Bacteria

The present document discloses the use of the probiotic bacteria for increasing the growth rate (weight) as compared to fish not treated with the probiotic bacteria. This effect is caused by the administration of the probiotic bacteria e.g. by exposing the fish to water to which the probiotic bacteria have been added. Without wishing to be bound by theory, it is expected that the main effect is contributed by the topical administration of the bacteria to the skin of the fish. The bacteria then traverse effectively the skin of the fish and ends up in the subcutaneous tissues and the blood vessels of the body transporting the bacteria throughout the fish body.

The present document thus is directed to a method for increasing the rate of growth (weight) of fish, said method comprising the steps of a) adding one or more species of probiotic bacteria to water, wherein the species of probiotic bacteria comprises or consists of one or more of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. Salm, and optionally *Aliivibrio njordis, Aliivibrio balderis* and/or *Aliivibrio nannie*, such as *Aliivibrio njordis* (B1-25, 18-1/2013 mandib V11), *Aliivibrio balderis* (B1-24, 18-1/2013 kidn VI2), and/or *Aliivibrio nannie* (B8-24, 313/2013 kidn V13); and b) exposing the fish to the water containing the one or more species of probiotic bacteria.

However, other routes of administration may also be used, such as injection, anal intubation, via spawned eggs, orally or via RAS facilities.

The present document is therefore also direct to a method for increasing the rate of growth (weight) of fish, said method comprising administrating one or more species of probiotic bacteria, wherein the species of probiotic bacteria comprises or consists of one or more of *Psychrobacter piscimesodermis, Psychrobacter piscimesenchymalis, Psychrobacter piscisubcutanea, Pseudomonas salmosubcutaneae, Pseudomonas salmosubpectoralis, Pseudomonas salmointermuscularis, Aliivibrio njordis, Aliivibrio balderis* and/or *Aliivibrio nannie*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm., *Pseudomonas salmointermuscularis* Fisk 4, 13/5-2014, ha, Atl. Salm., *Aliivibrio njordis* (B1-25, 18-1/2013 mandib V11), *Aliivibrio balderis* (B1-24, 18-1/2013 kidn VI2), and/or *Aliivibrio nannie* (B8-24, 313/2013 kidn V13) and wherein said administration takes place via injection, anal intubation, spawned eggs, and/or orally.

As mentioned elsewhere herein, probiotic bacteria of the three different species and different strains within such species may be used in any combination. The bacterial species may thus be used alone or in different combinations of two or more species and/or strains of a species. Further details regarding the conditions during exposure of the fish to the probiotic bacteria etc. are given elsewhere herein.

The fish to which the probiotic bacteria are administered to obtain a growth increasing effect are typically healthy fish.

Medical Uses of the Probiotic Bacteria

The probiotic bacteria of the present document may also be used for treating and/or preventing microbial infections in fish. Microbial infections include e.g. viral, fungal and bacterial infections, in particular bacterial infections. For example, the probiotic bacteria may prevent and/or treat infection caused by bacteria causing wounds, ulcers and/or lesions on the fish, such as on the skin of the fish. Other examples of infections that may be treated and/or prevented are infections causing septicemia. Bacterial infections causing wounds, ulcers and lesions in the skin of the fish may also cause septicemia when the bacteria enter the fish via the skin. Examples of bacteria which have been associated with such wounds/ulcers/lesions and/or septicemia are *M. viscosa, Bizionia piscinecroseptica, Aliivibrio friggiae, Tenacibaculum maritimum*, and *Aliivibrio wodanis*.

Although the present document generally refers to "wounds" and the treatment/prevention of "wounds", the term wound (wounds) also encompasses ulcer(s), lesion(s) and the like which may equally well be treated and/or prevented by administration of the probiotic bacteria as disclosed herein. Wounds on the skin of fish may be caused e.g. by bacterial infection as further disclosed elsewhere herein. Also, wounds may be caused by injuries to the fish, for examples injuries caused by the close contact between individuals in cages, tanks etc. which may cause e.g. the fins of one fish harming nearby fish.

The creation of wounds/ulcers/lesions on the skin of the fish is also expected to present a route for entry for other pathogenic organisms. Acute bacterial infections in farmed fish that causes outbreaks with high loss in the population in a limited time creates a high concentration of bacterial pathogens that causes effective spread of the infection between the individuals in the population. Some of the fish pathogens causing epidemic outbreaks and infections of which may be treated and/or prevented by the priobiotic bacteria of the present document are *Aliivibrio salmonicida, Aeromonas salmonicida, Vibrio anguillarum, Edwardsiella piscicida*, and *Aeromonas hydrophila*. The ports of infection for bacterial pathogens are not well studied but both the gills, the intestine and the skin are considered important.

The present document is thus also directed to *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. Salm., optionally in combination with one or more strains selected from the group consisting of *Aliivibrio njordis, Aliivibrio balderis* and *Aliivibrio nannie*, such as *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13), for medical use. The bacterial species may be used alone or in different combinations of two or more species and/or strains of a species.

The present document is further directed to a bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. Salm., optionally in combination with one or more strains selected from the group consisting of *Aliivibrio njordis, Aliivibrio balderis* and *Aliivibrio nannie*, such as *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13), for use in the treatment and/or prevention of a microbial infection in fish. The bacterial species may be used alone or in different combinations of two or more species and/or strains of a species.

Also, the present document is directed to the use of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. Salm., optionally in combination with one or more strains selected from the group consisting of *Aliivibrio njordis, Aliivibrio balderis* and/or *Aliivibrio nannie*, such as *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13), for the manufacture of a medicament for the treatment and/or prevention of a microbial infection in fish. The bacterial species may be used alone or in different combinations of two or more species and/or strains of a species.

Further, the present document discloses a method for treating and/or preventing a microbial infection in fish, said method comprising the steps of a) adding one or more species of probiotic bacteria to water, wherein the species of probiotic bacteria comprises or consists of one or more of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm. and/or *Pseudomonas salmointermuscularis* Fisk 4, 13/5-2014, ha, Atl. Salm., optionally in combination with one or more strains selected from the group consisting of *Aliivibrio njordis, Aliivibrio balderis* and/or *Aliivibrio nannie*, such as *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13); and b) exposing the fish to the water containing the one or more species of probiotic bacteria.

However, other routes of administration may also be used, such as injection, anal intubation, via spawned eggs, and/or orally.

The present document is therefore also directed to a method for treating and/or preventing a microbial infection in fish, said method comprising administrating one or more species of probiotic bacteria, wherein the species of probiotic bacteria comprises or consists of one or more of *Psychrobacter piscimesodermis, Psychrobacter piscimesenchymalis, Psychrobacter piscisubcutanea, Pseudomonas salmosubcutaneae, Pseudomonas salmosubpectoralis, Pseudomonas salmointermuscularis, Aliivibrio njordis, Aliivibrio balderis* and/or *Aliivibrio nannie*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm., *Pseudomonas salmointermuscularis* Fisk 4, 13/5-2014, ha, Atl. Salm., *Aliivibrio njordis* (B1-25, 18-1/2013 mandib V11), *Aliivibrio balderis* (B1-24, 18-1/2013 kidn V12), and/or *Aliivibrio nannie* (B8-24, 313/2013 kidn V13) and wherein said administration takes place via injection, anal intubation, spawned eggs, and/or orally.

Bacterial infections which may be treated and/or prevented by the use of the probiotic bacteria disclosed herein include, but are not limited to, ulcers, fin rot, furunculosis, yersiniosis, winter ulcer, friggiosis, wodanosis, bizioniosis, rainbow trout fry syndrome, bacterial cold water disease, cold-water vibriosis, and flexibacteriosis. In particular ulcer, fin rot, furunculosis, yersiniosis, rainbow trout fry syndrome and bacterial cold water disease may be treated and/or prevented by the use of bacteria selected from the group consisting of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*, such as *Psychrobacter piscimesodermis* Fisk 1, 41, 6/3-2014 Atl. Salm, *Psychrobacter piscimesenchymalis* Fisk 2, 42, 6/3-2014 Atl. salm, *Psychrobacter piscisubcutanea* Fisk 3, 43, 6/3-2014 Atl. Salm, *Pseudomonas salmosubcutaneae* Fisk 3, 13/5-2014, hb, Atl. salm., *Pseudomonas salmosubpectoralis* Fisk 3, 13/5-2014, ba, Atl. salm., and/or *Pseudomonas salmointermuscularis* Fisk 4, 13/5-2014, ha, Atl. Salm.

The probiotic bacteria of the present document may therefore be administered to the skin of the fish, i.e. topically, or via the gills to treat and/or prevent the infection by other microorganisms. Such application may be effected by bathing the fish in water containing the probiotic bacteria as disclosed elsewhere herein. Without wishing to be bound by theory, the probiotic bacteria of the present document may treat and/or prevent infections by occupying niches on the skin, thus preventing pathogenic bacteria from infecting the fish. Without wishing to be bound by theory, it is expected that the main treating/preventing effect on the microbial infection is contributed by the topical administration of the probiotic bacteria to the skin of the fish. The bacteria then traverse effectively the skin of the fish and ends into the subcutaneous tissues and the blood vessels of the body transporting the bacteria throughout the fish body.

The probiotic bacteria are administered in a pharmaceutically effective amount.

Further details regarding the conditions during exposure of the fish to the probiotic bacteria, microbial infections etc. are given elsewhere herein.

Administration of the Probiotic Bacteria to Fish

In order to administer the probiotic bacteria to the fish, the probiotic bacteria are cultured in a suitable manner and then e.g. added to water whereafter the fish are exposed to the bacteria-containing water, i.e. bathing the fish in the water. The water to which the bacteria are added may be the water that the fish are already contained in or may be water in another tank, cage or the like to which the fish are transferred. The water is typically the same kind of water that the fish are contained in depending on their growth stage. For e.g. salmon at the post smolt stage, the water is typically natural sea water. However, it is also possible to transfer the fish to another kind of water during the treatment. For example, salmon at the pre smolt stage, which live in fresh water, may be transferred to salt water, such as natural seawater, during the exposure to the probiotic bacteria and then moved back to the fresh water. The water to which the bacteria are added typically has a salinity of about 0.5 to about 4 weight %, such as about 2 to about 4 weight %, although the water may also be fresh water which has a much lower salinity. It is thus possible to use already propagated live cells to bath fish at lower salt concentrations down to fresh water at typical shorter time intervals not killing the probiotic bacteria.

The fish are exposed to the bathing water containing the probiotic bacteria for a time sufficient for enough bacteria to be administered to the fish to obtain the desired effects. This time will depend on e.g. the concentration of bacteria used, the type and status of the fish that are to be exposed etc. Typically, an exposure time of a few seconds to a couple of hours may be used, such as 1 second to 5 hours, such as 1 second to 2 hours, such as 1 second to 1 hour, such as 30 seconds to 1 hour or 1 minute to 30 minutes. Increasing the concentration of bacteria in the water will generally decrease the exposure time needed.

The fish may be exposed to the probiotic bacteria a single time or the exposure may be repeated one or more times with different time intervals.

The total concentration of added probiotic bacteria in the bathing water is typically in the range of about $10^4$ to $10^8$ CFU/ml, such as $10^5$ to $10^7$, when applying a bath for a short single treatment interval, such as a bathing lasting for about 15 to 60 minutes. If the fish are rather to be dipped in a probiotic bath, the bacterial concentration may be increased such as to $10^7$ to $10^{12}$ CFU/ml. Bacterial cultures prepared in fermenters may have a concentration of ca $10^{13}$ CFU/ml. A dilution of ca 1:100 to 1:600 of the prepared bacterial culture may be suitable for application by bathing and a dilution of ca 1:10 for application by dipping. Adding probiotic bacteria at repeated intervals at lower concentrations down to the natural level in seawater may be beneficial to the bathed fish. A continuous infusion of probiotic bacteria at lower levels of concentration down to one cell/ml water may be beneficial to the fish.

The probiotic bacteria may be added to the water with or without their used growth medium. If the bacteria are to be added without their used growth medium, the bacterial cells may be separated from the growth medium e.g. by centrifugation or filtering and thereafter resuspended in fresh growth medium or a suitable buffer (such as phosphate buffered saline) or salt solution (such as a sodium salt solution).

Exposure of the fish to bacteria through the gills or through the oral route has been tested for both pathogens as *Moritella viscosa* and *Aliivibrio salmonicida* and the bacteria are taken up to the blood through both these routes but the degree of uptake is lower compared to the skin uptake. Typically the oral route of exposure of probiotic bacteria can be exploited by using higher concentrations of bacteria in smaller volumes typically in the feed. Even concentrated cultures of the probiotic bacteria can be administered through the feed and the efficiency in the uptake can then be increased.

Similarly the uptake of probiotic bacteria can be facilitated by injection of the bacteria, such as via injecting them through the abdominal wall exposing the serous linings of the peritoneal cavity for the probiotic bacteria. This route of administration has been tested for the probiotic bacteria disclosed herein (i.e. *Psychrobacter piscimesodermis, Psychrobacter piscimesenchymalis, Psychrobacter piscisubcutanea, Aliivibrio njordis, Aliivibrio balderis* and *Aliivibrio nannie* and there is no harm registered to the fish after intraperitoneal administration.

An additional way of administering probiotic bacteria is through anal intubation. It is considered that the immune cells in the distal part of the intestine is high in numbers and are able to transport bacteria across the intestinal wall. Similarly intubation of the fish through the mouth into the stomach is tested as an effective way of administering probiotic bacteria. In a few numbers of brood stock fish this way of administering probiotic bacteria is useful. Exposing brood stock fish repeatedly to probiotic bacteria is the most effective way of improving the microbiota of the fish population in general.

Administering probiotic bacteria to spawned eggs is an important and effective way of administering probiotic bacteria. Uptake of bacteria into the eggs and adhesion to the egg shells are mechanisms that are important in the protection of the eggs and early fry.

Egg yolk fry and start-feeding fry is a group of fish that also very effectively can be protected by exposing to probiotic bacteria by bathing or dipping.

It is also possible to administer the probiotic bacteria in freeze-dried form.

Further, it is possible to combine the medical or non-medical uses of the probiotic bacteria described herein with a vaccine treatment using inactivated (i.e. dead or attenuated bacteria), such as a standard vaccine treatment used in fish farming, independently on how the probiotic bacteria are administered to the fish. One advantage with such a combination treatment wherein the probiotic bacteria are administered at the same time and by the same administration route as the vaccine is that it decreases the strain of the fish as the two administrations take place at the same time instead of at two or more separate occasions.

Administration of Probiotic Bacteria to RAS Facilities

Recirculation of water in fish farming facilities (RAS facilities) has increased due to different pressing reasons. The consumption of intake water to a farming facility can be down to only 5% of a flow-through facility. This makes it easier to construct larger and more effective facilities independent of limitations of large water supplies. The low level of intake water also reduces the risk of attracting diseases through the external water sources. On the other side there is a large risk that "house strains" of bacteria may establish in the RAS facility through the bio-filter microbiota or through the biofilms established in the tanks and pipe systems.

RAS-facilities make it possible to keep a higher temperature in the RAS water which increases the speed of the growth of salmonids.

During and after the smoltification process marine water is commonly used to some extent to warm up the water or to increase the growth towards the sea transfer. If the level of marine water can be reduced in RAS the risk of getting marine pathogens into the facility can be reduced. Typically intake of marine water is made from depths that are below the salmon sea lice zone of the marine ecosystem both in RAS plants and in flow-through plants using marine water in particular in the post smolt period to reduce the time of farming in the open net cages in the sea. Even full-scale RAS systems for farming of Atlantic salmon from egg to slaughter in RAS facilities are now constructed.

The microbiotas of the various RAS facilities are studied so far to a low extent but it seems that ulcer and fin rot and depressed growth can be substantial problems in some facilities even to an extent that the whole system is stopped, sanitized and restarted. Direct use of probiotic bacteria in RAS systems can be effective ways of securing and increasing growth and reducing disease and mortality. The bio-filter is a complex organism with dominating groups of bacteria degrading organic material from the fish coming from feces and uneaten feed. The sedimentation unit will only sediment the larger particles. In addition to the microbiota in the bio-filter degrading organic compounds and binding nutrients there is a specific microbiota related to the health and welfare of the fish. This part of the microbiota in the bio-filter is only a minor part of the total microbiota in the bio-filter and also in the water of the fish tanks. Some RAS-facilites disinfect the water coming from the bio-filter before it enters the fish tanks. This may be an important factor controlling the risk of getting infectious diseases in the populations of fish. On the other hand such disinfection may also reduce the level of naturally probiotic bacteria in the plant.

Depending on the design of the various RAS-facilities, either they use fresh or marine water, the level of the normal probiotic bacteria in the water of the facility can be low or high. To be able to secure a stable high growth with healthy fish in RAS-systems it will be optimal to add probiotic bacteria either for fresh, brackish or salt water. If fish are bathed or supplied with probiotic bacteria they will shed bacteria into the water and in that way seed the water for uptake in fish later when the water return to the fish tanks. This means that using probiotic bacteria directly to the fish will also impact the bio-filter unit and then benefit the fish after the microbial processing of the water in the bio-filter.

Application of probiotic culture may be performed any place in the cycle of RAS-facilities in addition to be directed immediately to the fish, i.e. in the fish tank water, in the bio-filter unit, after the bio-filter unit and if a disinfection step is used after the bio-filter processing of the water after the disinfection but before the water reaches the fish tanks.

In summary probiotic bacteria can be administered in a large number of different ways depending on the design and management including stage of production of each facility.

The invention will be further described in the following examples, which do not limit the scope of the invention described in the claims.

EXPERIMENTAL SECTION

Example 1

Time Period:
  1 Oct. 2014-27 Jan. 2015 (117 days)
  Tjeldbergodden settefisk AS (Njord Salmon AS), Aure, Norway
Stembiont (Probiotic) Bath Used:
  Three different bacterial species of genus the *Aliivibrio* were used in a mix with equal amounts of each bacterial species. The novel bacterial species were 1. *Aliivibrio njordis* (B1-25, 18-1/2013 mandib VI1), 2. *Aliivibrio balderis* (B1-24, 18-1/2013 kidn VI2) and 3. *Aliivibrio nannie* (B8-24, 31-3/2013 kidn VI3).

The cultures of the three bacterial species were made in one liter flasks up to the point directly before a 9 hour transport from Oslo to Tjeldbergodden. Just before the transport (temperature kept between 8 and 15° C. during transport) all flasks were mixed in on plastic container with a volume of 25 liter, i.e. 24 liter in the 25 liter container. Just before the culture flasks were mixed they were fed with sterile fresh broth so the culture could be growing all the way to the site of application.

Atlantic salmon smolts in tank A4 were bathed for 1 hour in a 1/208 concentration of the equal mix ($5 \times 10^8$ cfu/ml in the 24 liter of mixed stock culture were mixed with 5 m$^3$ of 2.55% brackish salt water) of the three beneficial bacteria simultaneously at day 0. This gives a total calculated concentration of all three bacteria of $2.4 \times 10^6$ cfu/ml (i.e. total concentration of bacteria) and a cultivated concentration of $1 \times 10^7$ cfu/ml direct from the bathing water as estimated after growth on blood agar. Group A3 was control fish and not treated.

Post Smolts:
  Atlantic salmon post smolt from Marine Harvest vaccinated intraperitoneally with a commercial vaccine 8 weeks (450 day degrees Celsius) before transfer to sea water at the freshwater smolt production facility were used. The smolts had an average weight of 80 grams when transferred to sea from the smolt plant on 1 Oct. 2014.

N=9800 fish (*Salmo salar*) in two groups, A3 (control) and A4 (treated) (4900 each) in 150 m³ indoor tanks were used. The fish were kept in tanks during the entire 117 day study period.

A subset of 42 post smolts from A4 and 37 post smolts from A3 was weighed after transport to the aquarium research facility after 110 days.

The average weight of the 42 post smolts from A4 was 550.5 grams while the 37 post smolts from tank A3 had an average weight of 376.0 grams. This gives the 42 smolts sampled after 110 days from A4 an average weight gain of 46.4% more than the 37 post smolts sampled at the same time from the A3 control tank that was not bathed in a bacterial culture.

Figure 1:
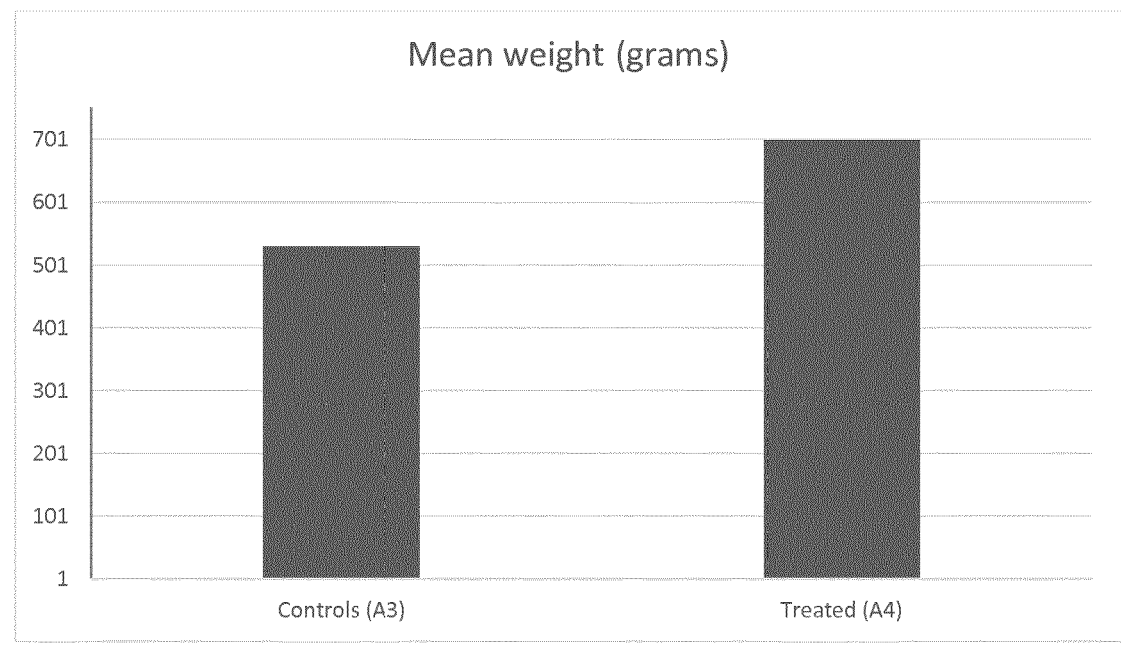
FIG. 1: mean weight of smolts bathed in equal amounts of *Aliivibrio njordis* (B1-25, 18-1/2013 mandib VI1), *Aliivibrio balderis* (B1-24, 18-1/2013 kidn VI2) and *Aliivibrio nannie* (B8-24, 31-3/2013 kidn VI3) according to Example 1.

A subset of 150 fish in each group were weighed, measured and scored for ulcers after 117 days (A3) and 116 (A4) days (see FIG. 1).

TABLE 1

| Parameter: | Controls | Treatment group |
|---|---|---|
| # of points: | 150 | 150 |
| Baseline weight (grams) | About 80 g | About 80 g |
| Mean weight (grams) | 530.97 | 699.79 |
| Weight gain (grams) | — | 168.82 |
| % weight gain | | 31.80% |
| p-value | — | <0.0001 |
| # ulcers | 87 | 46 |
| Chi square (two-tail) | — | <0.0002 |

Mortality of the fish measured by daily sampling of dead post smolts up to day 117 of the trial period was lower in A4; 140 dead post smolts (2.86%) than in the control tank A3; 188 dead post smolts (3.83%).

Results

The chosen concentrations of bacteria produced significant and measurable effect on weight gain and number of ulcers. Bathing time of 1 hour seems sufficient to achieve these effects with this concentration of bacteria.

The difference in weight and number of ulcers can be observed after 117 days given tank specific condition.

The sampling method was the same both at 110 days and one week/6 days later and given that the same representative post smolts were catched the control gained close to the same amount of weight during one week after 110 days. The explanation could be on available feed for the two tanks since the software at the facility estimating the amount of feed may have underestimated the growth in A4. The post smolts in both tanks gained more than 20 gram weight per day this week but limited feed could have restricted the growth in particular in A4 where the post smolts had had up to 46% better growth than in A3 in the period from approximately 60 days to 110 days of the trial.

Example 2

Time Period:
15 Mar. 2015-2 Jul. 2015 (105 days)
Tjeldbergodden settefisk AS, Aure, Norway
Stembiont (Probiotic) Bath:
Three different bacterial species of genus *Aliivibrio* were used in a mix with equal amounts of each bacterial species. The novel bacterial species were 1. *Aliivibrio njordis* (B1-25, 18-1/2013 mandib VI1), 2. *Aliivibrio balderis* (B1-24, 18-1/2013 kidn VI2) and 3. *Aliivibrio* nannie (B8-24, 31-3/2013 kidn VI3).

The cultures were mixed in a large 1000 liter liquid container making the total volume to 600 liter including freshly added broth just before the shipping in a truck for 9 hours (temperature kept between 8 and 15° C. during transport). Before pooling in the large 1 m³ container tank the various three cultures had been incubated in 25 liter plastic containers that were first standing when the volume was small and then laid on the side when the volume increased. In this way the surface of the cultures should more easily take up air. The idea of the culturing is not to shake or having a high level of air into the culture, rather to have a more microaerophilic condition in a standing culture without shaking, only turning of the plastic cans 3 times during the day.

Fish in the two treatment tanks (E2 and E3) were bathed for 1 hour in an approximately 1/666 (E3) and 1/1333 (E2) dilution of beneficial bacteria at day 0 which is 1/3 and 1/6 of the culture dilutions used in Study 1. Fish in the third tank (E1) was control fish and not treated.

Post Smolts:

Atlantic salmon post smolt from Belsvik smolt production plant (owned by Lerøy Midt) vaccinated intraperitoneally with a commercial vaccine 8 weeks (450 day degrees Celsius) before transfer to sea water at the freshwater smolt production facility were used.

Figure 2:
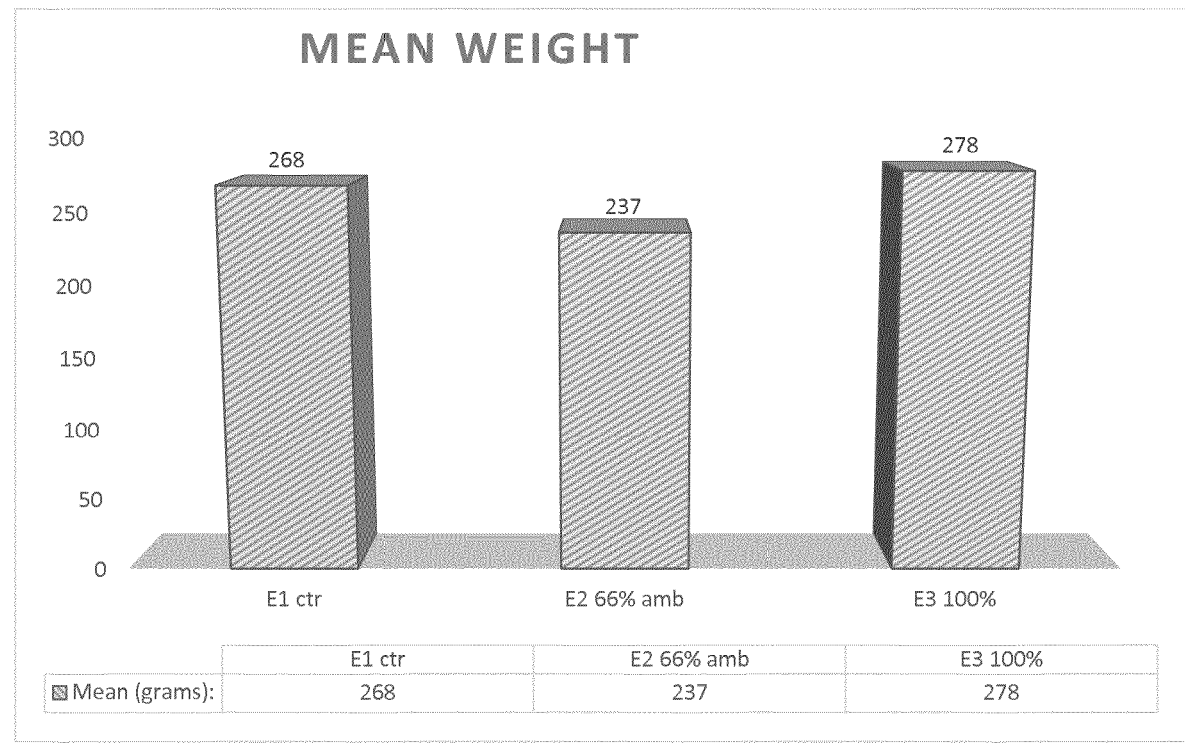
FIG. 2: mean weight of smolts bathed in equal amounts of *Aliivibrio njordis* (B1-25, 18-1/2013 mandib VI1), *Aliivibrio balderis* (B1-24, 18-1/2013 kidn VI2) and *Aliivibrio nannie* (B8-24, 31-3/2013 kidn VI3) according to Example 2.

N=99.622 fish (*Salmo salar*) in E1, N=109.300 in E2, N=98.754 in E3, i. e. the density of post smolts is 10% higher in E2 compared to E1 and E3. Fish were kept in the same tanks during the entire 105 day study period. A subset of 100 fish in each group were weighed, measured and scored for ulcers at day 73 and day 105 (see FIG. 2).

TABLE 2

| Parameter: | Controls E1 | Group E2 (17%) | Group E3 (33%) |
|---|---|---|---|
| # of points: | 100 | 100 | 100 |
| Baseline weight (grams) | About 80 g | About 80 g | About 80 g |
| Mean weight (grams) | 268 | 237 | 278 |
| Weight gain vs ctr (grams) | — | −31 | +10 |
| % weight gain | | −12% | +4% |
| p-value | — | worse | 0.08 |
| # ulcers | 52% | 46% | 36% |
| Mortality | 4.8% | 3.2% | 6.6% |
| Chi square (two-tail) | — | <0.0002 | |

Results

While reduced concentration of bacteria in the bacterial bath reduces efficacy of the treatment, at 33% of the concentration used in Example 1 a gain in weight (not statistically significant) and a reduction of ulcers (statistically significant) could still be observed as compared to untreated fish.

Example 3

Time Period:
Spring 2016 (126 days)
Tjeldbergodden, Njord Salmon, Norway
Stembiont (Probiotic) Bath:
Three different species of *Aliivibrio* sp. (Tank A2: *Aliivibrio nannie*, Tank A3: *Aliivibrio* njordis, *Aliivibrio balderis* and *Aliivibrio nannie* 33% v/v and Tank A4: *Aliivibrio njordis, Aliivibrio balderis,* 50% v/v) were used in the same concentrations as in Example 1.

The cultures were grown in separate 25 liter plastic cans until shipping (temperature kept between 8 and 15° C. during transport) when the cultures for each A2, A3 and A4 tanks were mixed in one 25 liter container and fresh broth.

Fish were bathed for 1 hour in a 1/210 dilution of the cultures of beneficial bacteria which gives a bathing concentration of $1\times10^7$ cfu/ml at day 0. Fish in the third tank (A1) was control fish and not treated.

Post Smolts:

Atlantic salmon post smolt from Belsvik smolt production plant (owned by Lerøy Midt) vaccinated intraperitoneally with a commercial vaccine 8 weeks (450 day degrees Celsius) before transfer to sea water at the freshwater smolt production facility were used.

Figure 3:
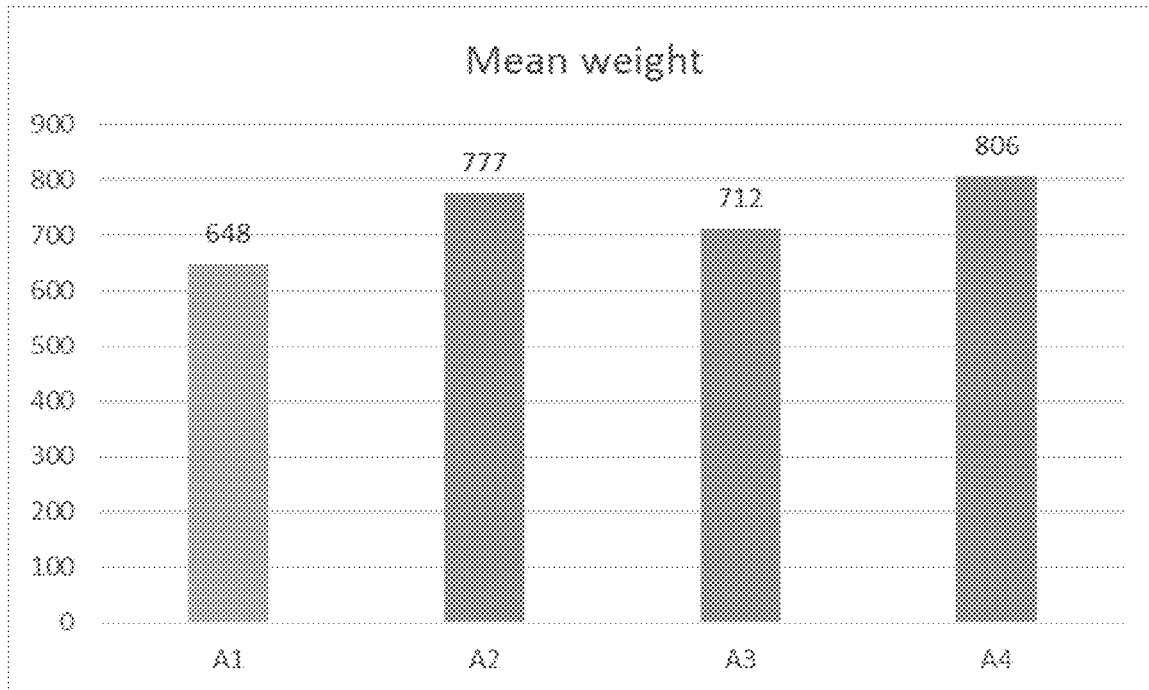
FIG. 3: mean weight of smolts bathed in different combinations of *Aliivibrio njordis* (B1-25, 18-1/2013 mandib VI1), *Aliivibrio balderis* (B1-24, 18-1/2013 kidn VI2) and *Aliivibrio nannie* (B8-24, 31-3/2013 kidn VI3) according to Example 3.
Figure 4:
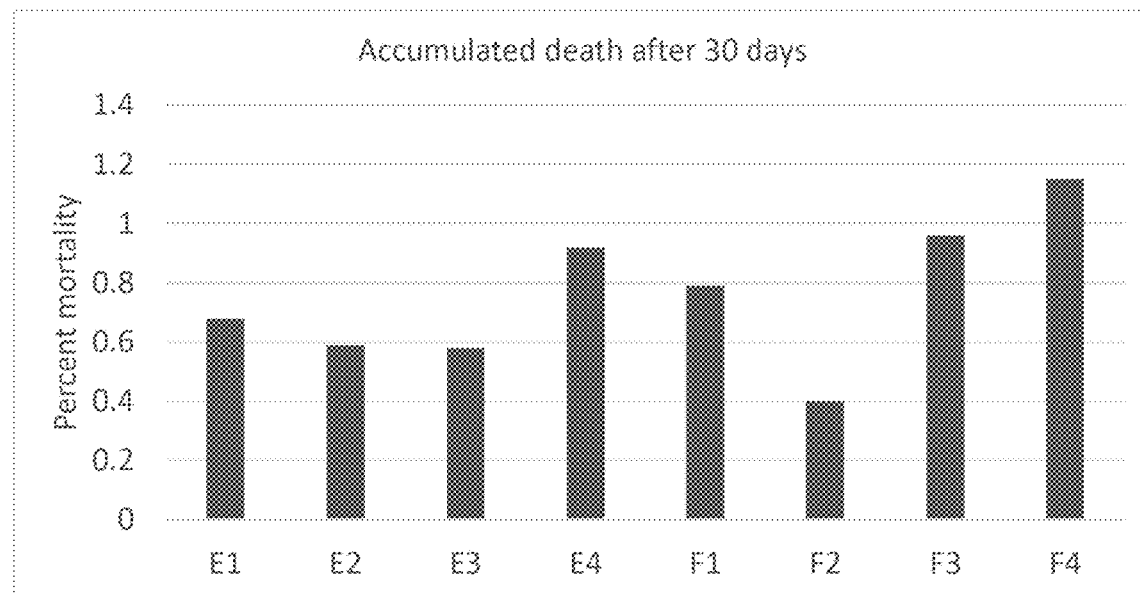
FIG. 4: Accumulated death of fish in Example 4.
Figure 5:
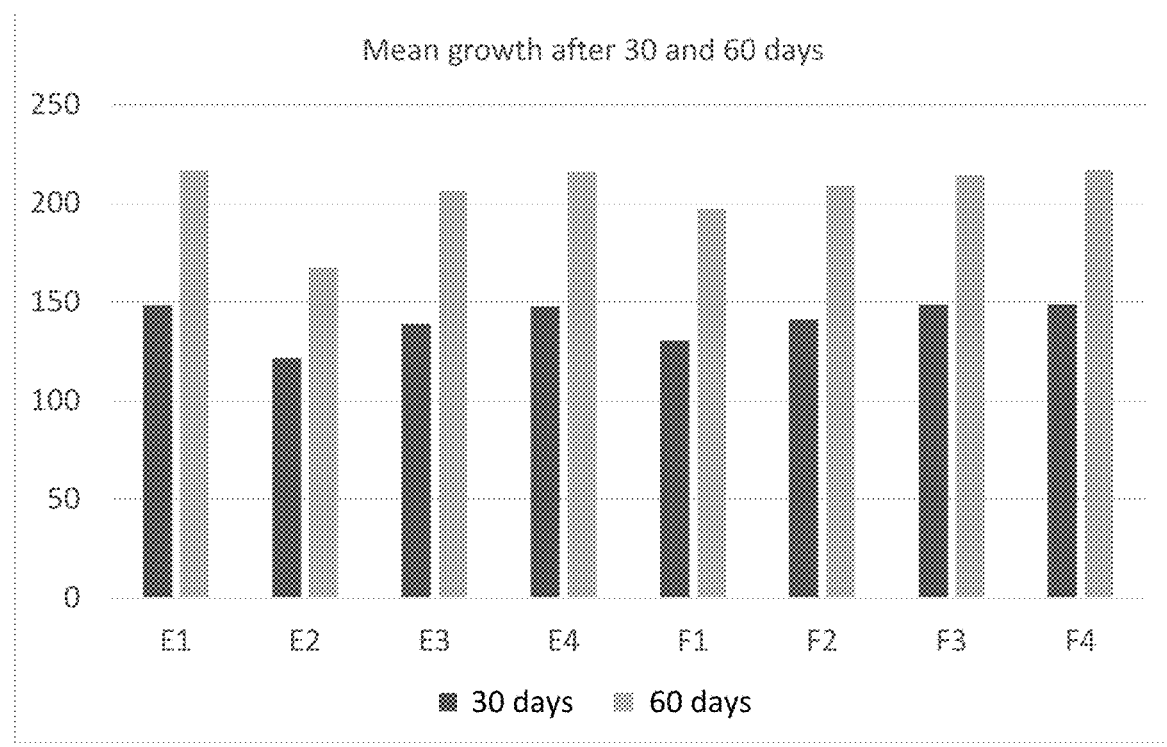
FIG. 5: Mean growth of fish in Example 4.
Figure 6:
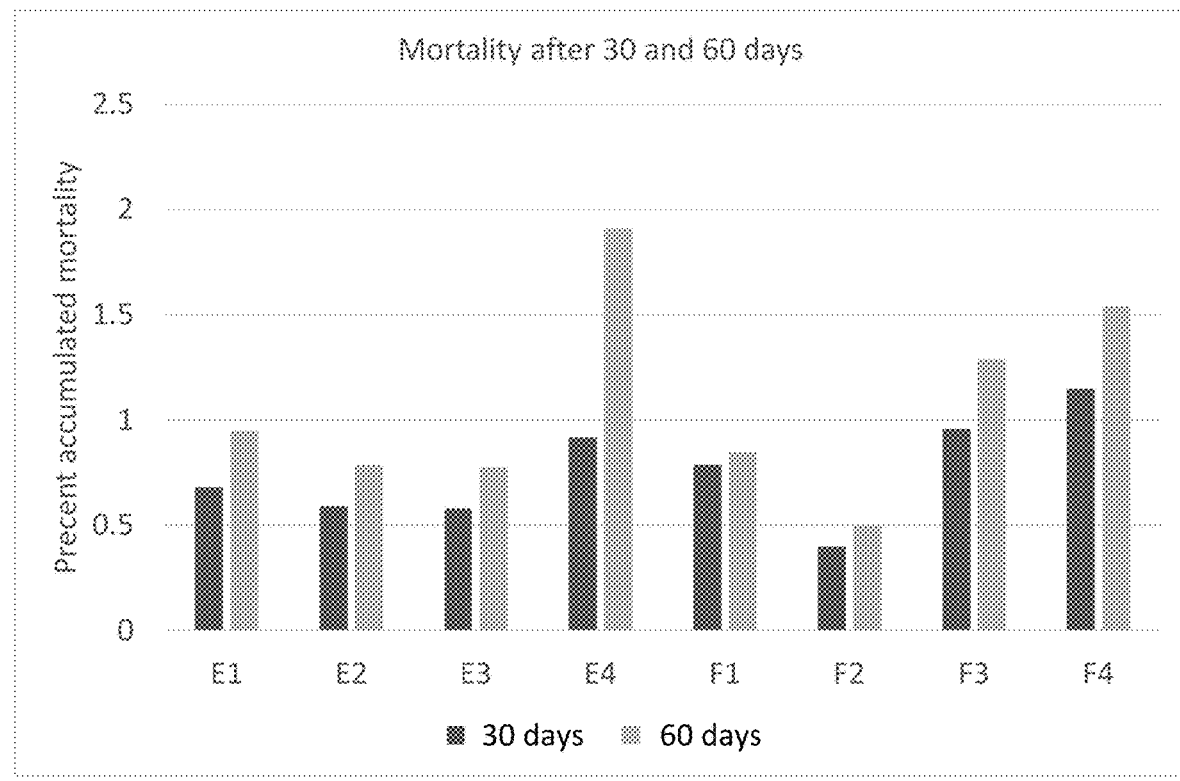
FIG. 6: Mortality of fish in Example 4.
Figure 7:
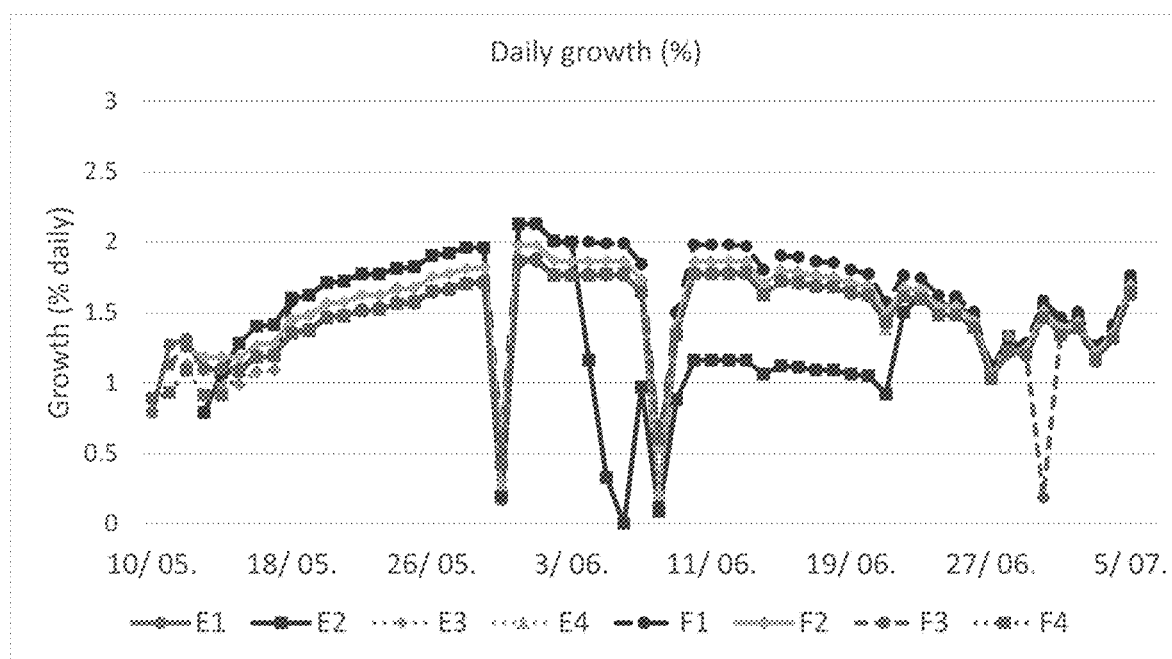
FIG. 7: Daily growth of fish in Example 4.
Figure 8:
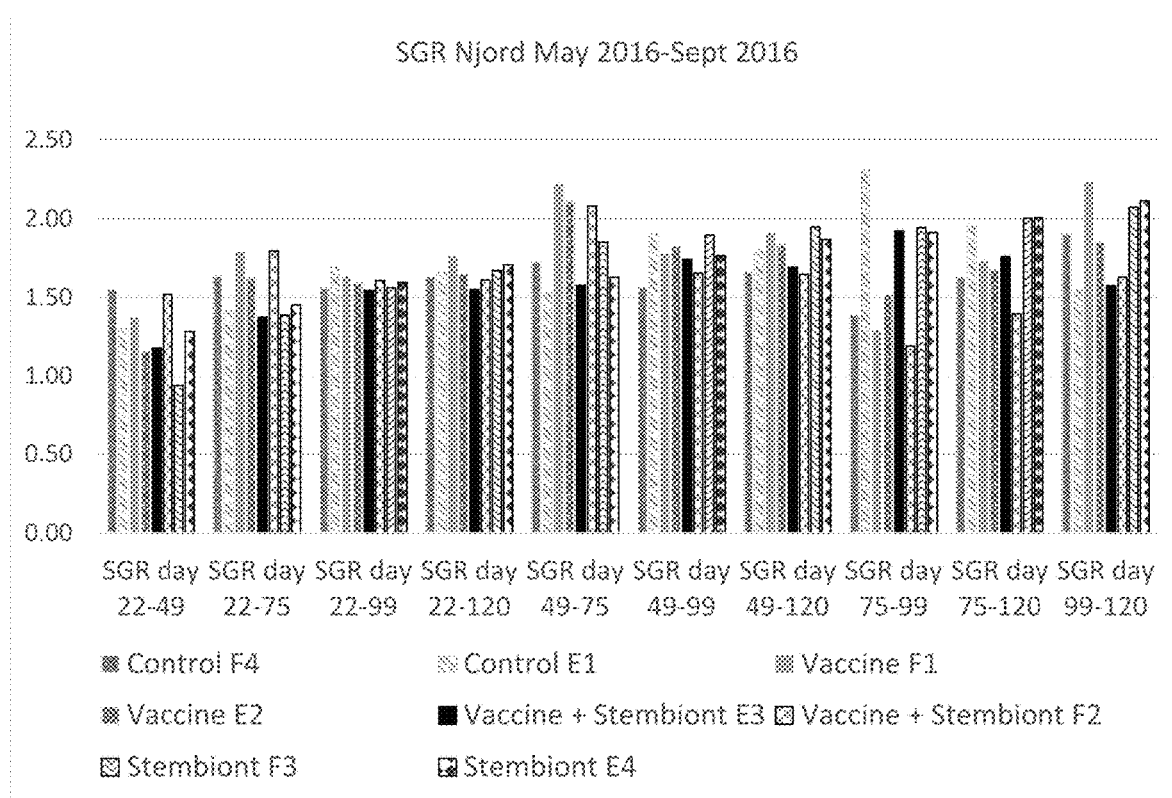
FIG. 8: Specific growth rate (SGR) in the various tanks and at the varying sampling time points in Example 4.

Fish were kept in tanks during the entire 126 day study period. At start it was 4000 fish in each of the 4 tanks. A subset of fish in each group were weighed, measured and scored for ulcers at day 72 and 126 during the study. Results in table from end of study (Day 126) (see also FIG. 3).

TABLE 3

| Parameter: | Controls A1 | Group A2 | Group A3 | Group A4 |
| --- | --- | --- | --- | --- |
| # of fish subset: | 60 | 61 | 62 | 59 |
| Baseline weight (grams) | about 80 g | about 80 g | about 80 g | about 80 g |
| Mean weight (grams) | 648 | 777 | 712 | 806 |
| Weight gain vs ctr (grams) | — | 129 | 64 | 158 |
| % weight gain vs controls | | 20% | 10% | 24% |
| p-value vs controls | — | <0.0001 | 0.0097 | <0.0001 |
| Dead fish of total 3820 | 174 | 112 | 178 | 110 |
| Mortality | 4.55% | 2.93% | 4.66% | 2.88% |
| Chi$^2$ (two-tail vs controls) | — | 0.0002 | 0.83 | <0.0002 |

Results

All tested combinations of strains showed a significant weight gain benefit over controls. *Aliivibrio nannie* used alone or *Aliivibrio njordis* and *Aliivibrio balderis* used in combination (1:1) showed a significant survival benefit over controls and when all three strains were used in combination (1:1:1).

Example 4

In this study 2×100 000 smolts were bathed in *A. njordis* and *A. balderis* in an equal mix (96.7%) and *A. nannie* (3.3%) for 1 hour in smaller indoor tanks and transferred to E4 and F3 on 10 May 2016, and 2×100 000 smolts were bathed in *A. njordis* and *A. balderis* in an equal mix (96.7%) and *A. nannie* (3.3%) for 1 hour in smaller indoor tanks and transferred to E3 and F2 after bath vaccination in the same tanks during the last 15 minutes.

To obtain the necessary 720 liters of cultures the cultures were grown in 39×25 liter plastic cans up to transport (temperature kept between 8 and 15° C. during transport) and added fresh broth just before shipping. The cans were not mixed but transported with 20 liters in each on the floor of the transport truck. The cans were opened once for letting in air during the transport on 1036 meter above sea level at the temperature of 12° C. for 30 minutes. The cultures were planned for two days of use with a time lag.

Bacterial cultivation from all volumes used in the small (150 m) indoor tanks used for bathing demonstrated a growth of the combination of *A. njordis* and *A. balderis* (96.7%) and *A. nannie* (3.3%) varying from $6\times10^5$ to $1.0\times10^6$ cfu/ml bathing water.

At day 0, (19. May), day 22 (10. June), day 49 (7. July), day 75 (2. August), day 99 (26. August) and day 120 (16. September) after treatment and transfer to seawater, 80 post smolts were sampled, euthanized with anesthetic bath before weighing, measuring of length and autopsy (10 individuals from each tank). There were a small level of fin rot in all tanks at day 22 reduced to mostly fin rot in the back fin at day 49. At day 22 the cause of the fin rot were two other *vibrio* bacteria *Vibrio splendidus/V. tasmaniensis*) than included in the vaccines (commercial intraperitoneal vaccine at day minus 65 in the smolt plant and bath autovaccination in four of the eight tanks at day 0 against *Aliivibrio wodanis* ans *Aliivibrio friggiae*).

Two tanks were control tanks, two tanks were given probiotic alone, two tanks were given probiotic bacteria plus autovaccination (adding killed bacteria the last 15 minutes of the full hour as an autovaccine) in bath simultaneously and finally two tanks given only autovaccination.

After the three first samplings the last at day 49 it is evident that the control post smolts are performing well on the growth but starts to get bleedings and small ulcers on the ventral part of the body. The autovaccinated groups are growing almost as good as the control tanks. The probiotic treated tanks are showing less growth, statistically significant compared to the control tanks. However, the feed intake is as high as the post smolts in the control tanks. This indicates that the probiotic bacteria inside the post smolts demands energy to the post smolt to a larger degree than for the control post smolts and the autovaccinated post smolts.

The samplings at day 75, day 99 and day 120 continue to show that the unexposed control tanks were growing good and are having the largest weights, however not significantly larger than the other groups. Towards the end of the post smolt period before the post smolts were transferred by well boat to open sea cages the bathed groups were performing better than earlier in the trial but are not passing the control groups in average weight.

The expected daily growth in % i. e. specific growth rate (SGR) estimated from the 6 samplings in the trial shows that the two probiotic treated post smolt tanks have an even and relatively high SGR in the four last samplings compared to the control tanks and the bath vaccinated tanks. The SGR in the bath vaccinated tanks is calculated to be particular high during an outbreak of ulcer disease between day 49 and 75 and opposite relatively low during a second period with ulcers around day 75 to 99 in the trial. From the autopsy and cultivations this variation in the bath vaccinated groups indicate that *A. wodanis* is important in the first ulcer outbreak while the *Vibrio splendidus/tasmaniensis* is more dominant during the second ulcer outbreak.

See FIGS. 4 to 8.

Results a. The control post smolts (E1 and F4) have more small ulcers and bleedings in the skin than all the treated 6 tanks at the second and third sampling times.

b. The probiotic bathed tanks (E4 and F3) have the lowest weight but the highest feed consumption in the early part of the trial but towards the end of the trial the weight starts to increase relative to the other groups. This indicates that the post smolts are using extra energy to handle the good bacteria transferred through the skin on day 0 (May 10.). This indicates that the bacteria actually were transferred to the fish. The feed conversion rate is high for the probiotic treated fish and combined with more ulcer and bleedings in the control at some parts of the trial fits with similar data from the previous trials at Tjeldbergodden.

The specific growth rate (SGR) is stable high in the probiotic bathed post smolts from before 50 days into the trial and to the end of the trial on day 120. The SGR in the other groups in the trial including the control groups varies typically related to the type of bacterial pathogens causing infection challenge in the flow-through tanks with post smolts.

Example 5

In a post smolt facility with intake of marine water at 50 meter depth and with a flow-through system with UV disinfection of the intake water. This facility is the same as in Example 2 and 4.

In this study 2×100.000 smolts (tank E4 and F1) were bathed in *A. njordis* and *A. balderis* in an equal mix (96.7%) for 1 hour in a concentration of 1:600 while the tank volume was reduced to half, the inlet water stopped and oxygen were provided. These two probiotic bathed tanks were added bath vaccine for the 20 last minutes of the one hour bathing period with probiotic bacteria. In addition two tanks with 100.000 smolts in each (E1 and F3) were bath vaccinated with the same vaccine as used in the combined exposure with the probiotic exposure. The bath vaccine was applied in addition to the commercial ip vaccine that was given to all the smolt at the Belsvika smolt plant. The bath vaccine was the same as used in Example 4 and contained antigens against *Aliivibrio wodanis* and *Aliivibrio friggiae* that has been isolated in post smolts with ulcer in the plant the previous season. *A. wodanis* has been the dominating pathogen in post smolt with ulcers in this post smolt facility for some years.

The probiotic cultures needed for this trial and for the trial in Example 6 was prepared for the last three days in a 750 liter fermentor as one single batch of 500 liter for each trial. These cultures were prepared with air blown into the culture medium. The cultures were drained into a food grade 1000 liter tank container and transported with a small truck in the first half of November when the outdoor temperature was between 5 and 10° C. on the route used.

At day 0, (2. Nov. 2016), day 15 (17. November), and day 128 (10. March) after exposure and transfer to seawater, 80 post smolts from each tank were sampled, euthanized with anesthetic bath before weighing, measuring of length and autopsy (10 individuals from each tank).

Four tanks were control tanks (E2, E3, F2 and F4).
Results

After 10 days from sea transfer an outbreak of fin rot and mortality caused by *Tenacibaculum dicentrarchi* occurred in the tanks, tank F1 (probiotic and bath vaccine) was loosing most post smolts but the outbreak was ending within one week after it started and the post smolt recovered fast. The fish had good appetite and growth rate in all tanks until the end of the trial when an outbreak of ulcer and mortality started the last week before the post smolt were planned to be transferred to open net pens in the sea. The outbreak was caused by the trout variant of *Moritella viscosa* that is not included in the commercial ip vaccine which probably explains why the outbreak occurred. All the tanks were treated with antibiotic in the feed and transferred to sea after an additional week. After being transferred to sea there was some increased mortality in particular in the vaccinated groups. This may be caused by the vaccination against *A. wodanis* that produces a bacteriocin that inhibits *M. viscosa* and other bacteria at physiological salt levels within the body of the fish. Vaccination against *A. wodanis* makes it necessary to control by vaccine or other means the pathogens that are inhibited by the bacteriocin produced by *A. wodanis*.

Figure 9:
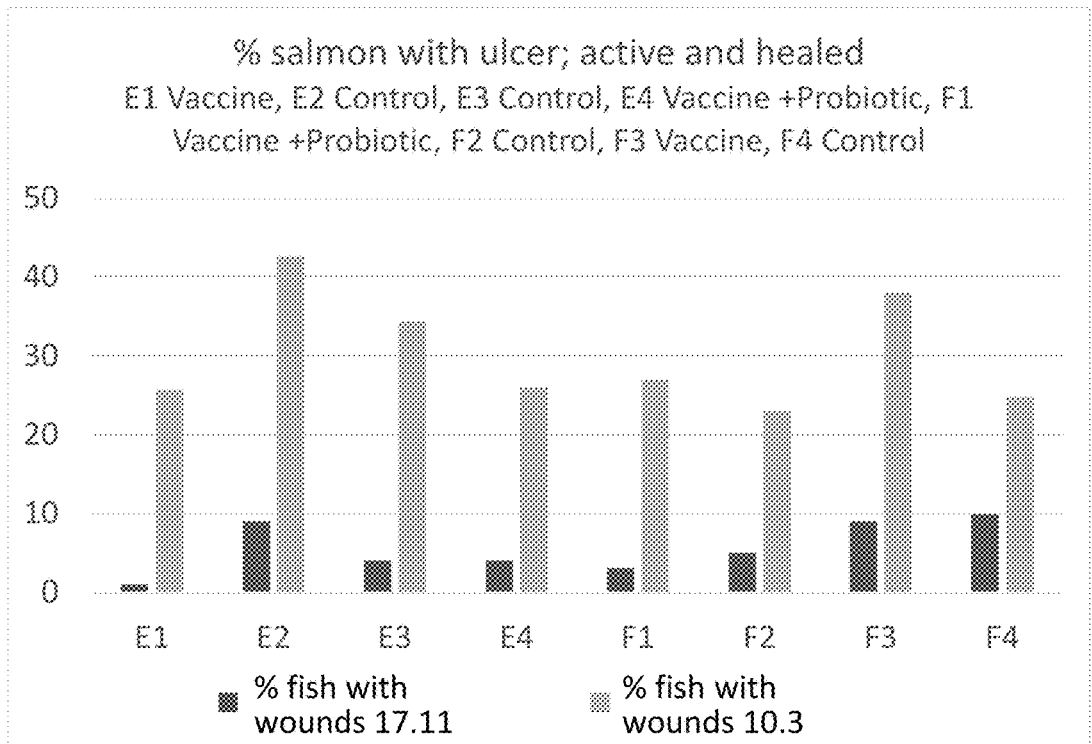
FIG. 9: Distribution of ulcers; active and healed in Example 4.
Figure 10:
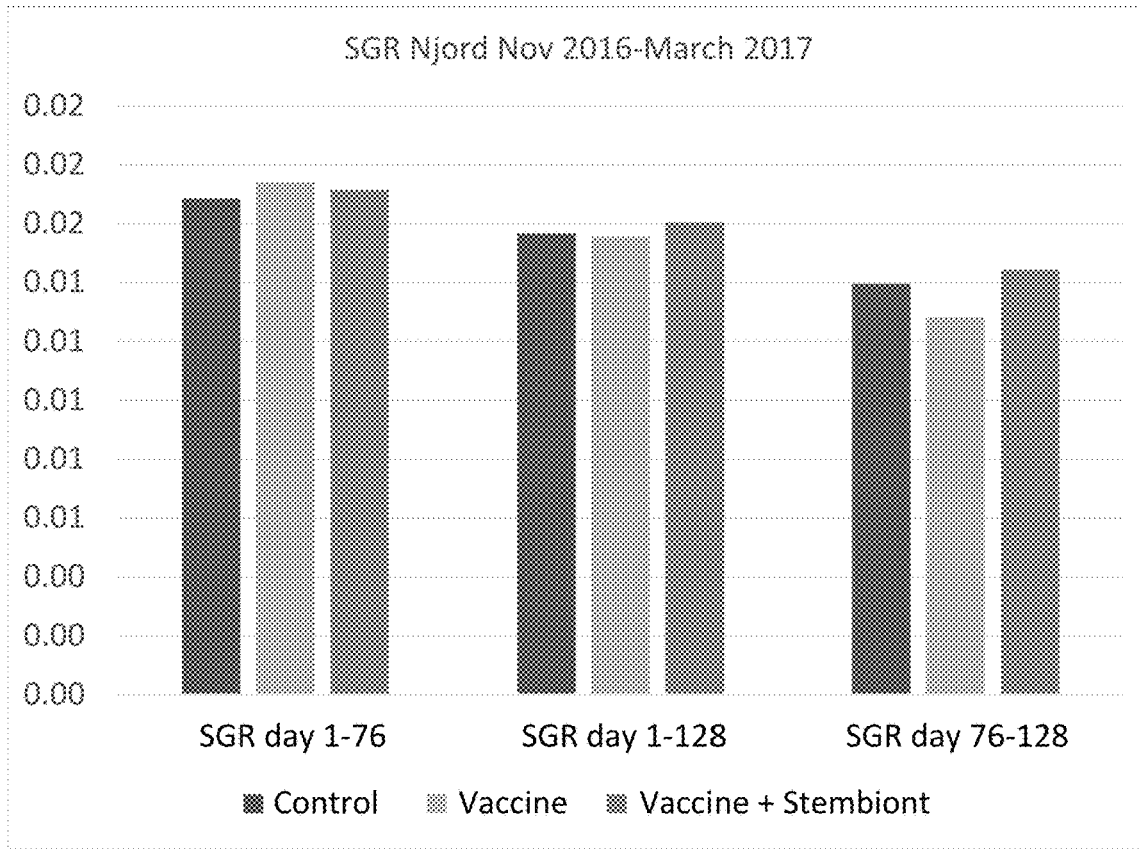
FIG. 10: Specific growth rate (SGR) in the compiled trial groups in Example 5.

The probiotic exposed tanks had fewer post smolts with ulcer than the control tanks and the vaccine tanks. On the last sampling (17. March-17) the tanks with probiotic exposure had 5% less ulcers than the other tanks (see FIGS. 9 and 10).

Example 6

Exposure to Probiotic Marine Bacteria at Sea Launch after Bath Vaccination Against *Allivibrio wodanis* Four Weeks Earlier This industrial trial was performed with vaccination and probiotic treatment in the smolt plant before the smolts were kept 5 months in 4 closed sea cages of 3000 m³ to avoid sea lice exposure. The seawater was pumped from 26 meter depth and used undesinfected.

Design Summary and Exposure

Salmon fry were vaccinated with a commercial intraperitoneal vaccine 8 weeks before sea launch. In addition they were bath vaccinated in freshwater tanks in the smolt plant when they were having the size of approximately 40 gram, 4 weeks before sea launch. When the smolts were above 80 grams and had developed the additional immunity from the bath vaccination where they immersed in probiotic bacteria in the concentration of 1:600 with an equal mixture of the bacterial species *Aliivibrio njordis* and *Aliivibrio balderis* for one hour before they were transported a short distance in a well boat to the closed net pens. Each of the four tanks contained 100 000 smolts and the combined probiotic exposed and bath vaccinated smolts were kept in two tanks (M1 and M2) while the control tanks were not bath vaccinated nor exposed to probiotic bacteria.

Results

The bath vaccinated groups had a significant higher growth rate the four weeks before sea launch. Theoretically this can be speculated to be caused by exposure to brackish water that contain the ulcer pathogen *Aliivibrio wodanis* 6 days before sea transfer.

After bathing the immersion vaccinated groups in probiotic bacteria the growth rate was higher in the exposed groups up to the last part of the trial. The last 2 months of the trial resulted in some low mortality of between 1 to 2 percent starting in control pen M3. A couple of weeks later ulcer and slightly increased mortality occurred in the three other closed pens. In the last month of the trial control group M3 recovered very well from ulcers and the growth rate became very high. M3 used to have the largest smolts from the start of the trial before the growth rate was the lowest during the major first part of the trial before it compensated the lost growth at the end of the trial. The other control group continued to have a lower growth rate compared to the bath vaccine and probiotic exposed groups.

Figure 11:
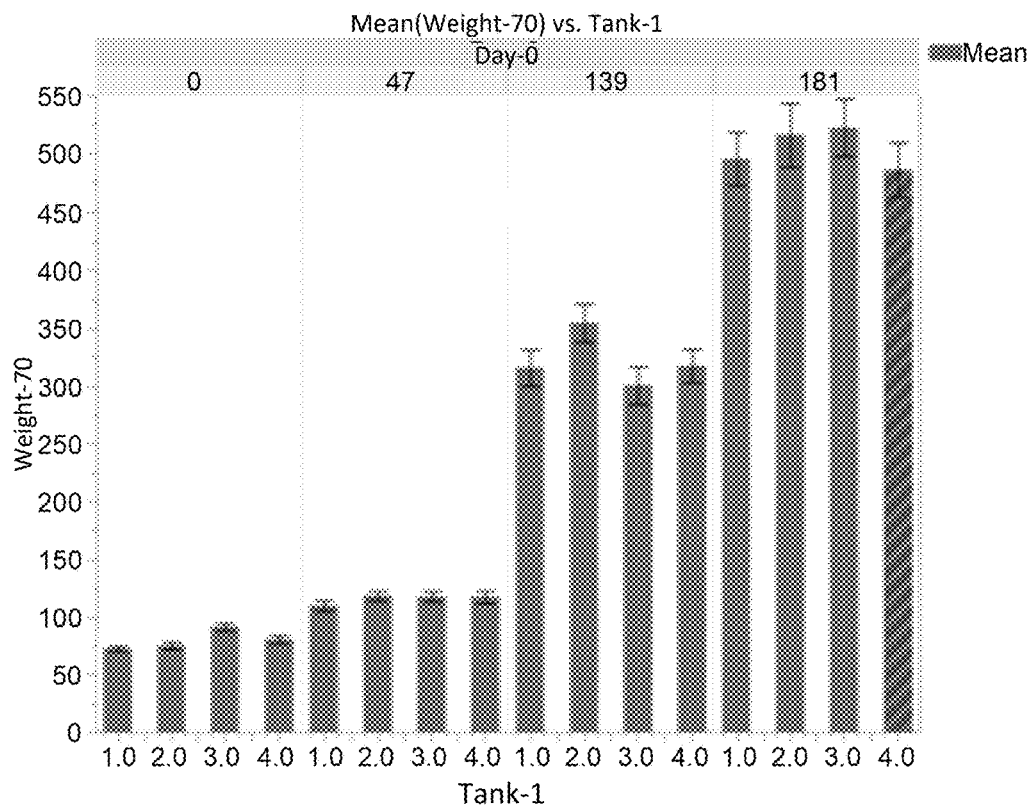
FIG. 11: The mean weight of the post smolts in the four closed pens at various sampling points in Example 6.
Figure 12:
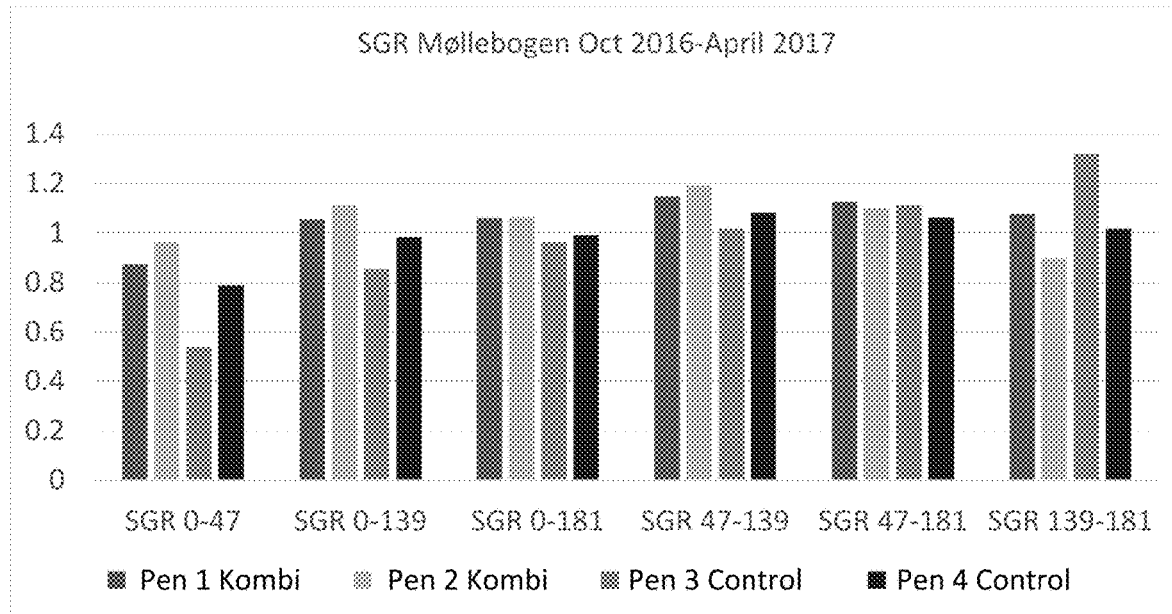
FIG. 12: Specific growth rate (SGR) in the various closed pens and at the varying sampling time points in Example 6.
Figure 13:
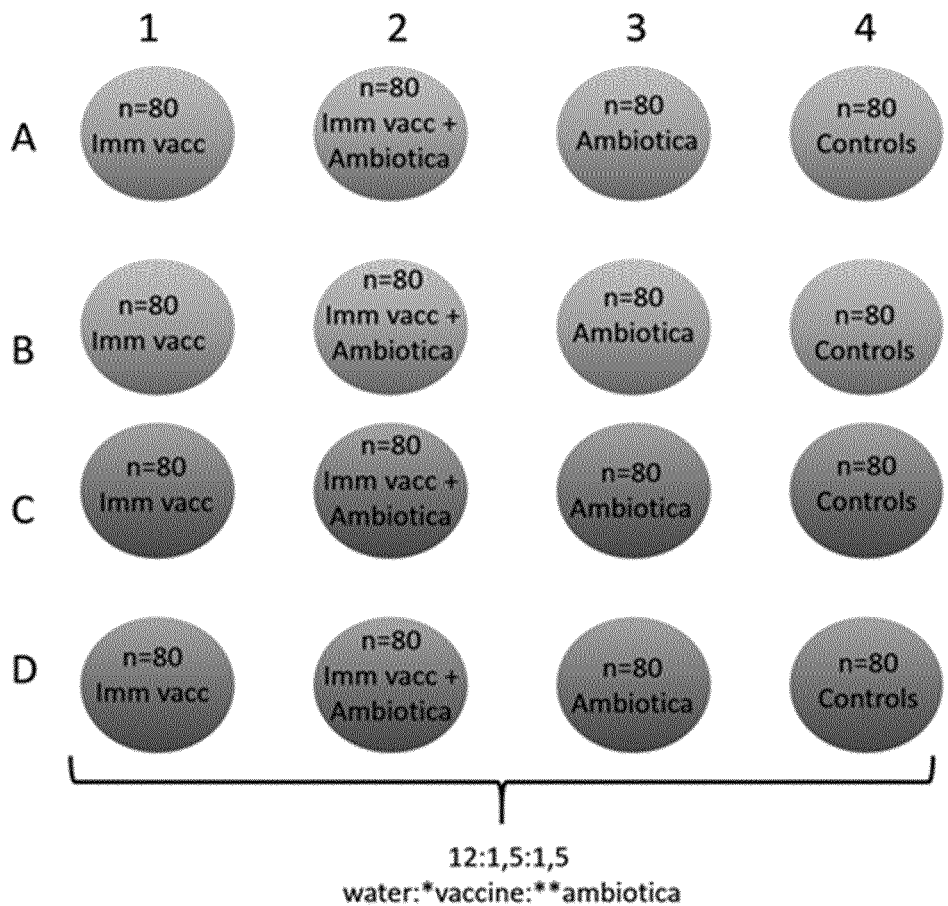
FIG. 13: Overview of the experimental design and tank set-up in Example 7. Example: fish in row 1 was the placebo group, fish in row 2 received a combined treatment with an immersion vaccine and beneficial bacteria, fish in row 3 received beneficial bacteria only and row 4 were controls. A and B (green) were duplicates and all have a 21-day immunization period before subjected to seawater. C and D (blue) were duplicates and were put on seawater immediately after exposure. All exposure were blinded according to blinding schedule below (table 3).

After transfer to open net pens in the sea the mortality in all four populations continued to increase to more than 4 percent being highest in the vaccinated and probiotic handeld post smolts. The reason for the increased mortality after transfer to sea pens could speculated to be caused by transport in a period with increasing infections. The cause of the increased mortality in the sea was *Alivibrio wodanis* against which the bath vaccine was prepared for protecting the post smolt from. It may also be the speculated that the duration of the vaccine was reduced after more than 7 months since bath vaccination. Normally the effect of a bath vaccine will be good for at least four months (see FIGS. 11 and 12).

Example 7

Onset Requirements and Efficacy of Treatment of Salmon by Use of Biotic Enhancement in Combination with Immersion Vaccine To determine if a period of onset for the immersion vaccine is needed for full treatment effect and whether an add-on effect of biotic treatment is present and if this differs between fish with an onset period and fish with no onset period. Safety and efficacy by survival, number of ulcers, weight gain and feed conversion ratio of Atlantic salmon bathed in a biotic preparation of a mixture of two live innocuous bacterial cultures of *Aliivibrio* spp. (*A. njordis* and *A. balderis*) in combination with an immersion vaccine will be compared between two treatments groups, and within subgroups receiving different treatments. Comparators were untreated controls and controls treated with immersion vaccine or biotic treatment as single agent. One group of fish was challenged by natural salt water immediately after treatment while a second group was given a period of 21 days in fresh water before exposure to sea water.

This study was a confirmation of the benefit of a 60 second static dip treatment with immersion vaccine, a combination of an immersion vaccine and biotic treatment or biotic treatment alone compared to untreated controls.

The immersion vaccine consisted of 11 different bacterial pathogens including the known pathogens causing epidemic infections like vibriosis, cold water vibriosis and furunculosis in addition to known and novel pathogenic bacteria causing ulcers and fin rot.

Objectives:
1. to investigate whether co-treatment with an immersion vaccine and a mix of probiotic bacteria is safe
2. to investigate whether a period of onset is needed to reach significantly better effect (mortality, morbidity and weight) of chosen treatment (see endpoints) compared to fish treated without an onset period
3. to investigate whether treatment with either an immersion vaccine, or a mix of beneficial bacteria or a combination of the two results in higher survival rates, and/or weight gain, and/or lower rates of any moribund signs, including darkening, lethargy, and presence of specific disease signs, such as ulcer formation, fin rot or mouth rot compared to untreated controls.

End Points:
End points for the first objective were survival (days), ulcer formation (scoring table 4) and weight (grams) during the first 21 days of treatment without exposure to sea water. End points for the second objective were survival, weight and ulcer formation (number and severity) during the period after sea water. End point for third objective was morbidity signs including but not restricted to ulcers, darkening of the skin, fin rot, anorexia and mouth rot. Ulcers were scored by size (largest diameter) and severity.

Test Product
Strains of bacteria to be used as augmenting were two non-pathogenic *Aliivibrio* spp. strains (*A. njordis* and *A. balderis*) produced in such a way that certain proprietary methods are used to manifest desirable culture characteristics.

The immersion vaccine contained a selection of inactivated bacteria produced in such a way that certain proprietary methods are used to manifest desirable culture characteristics.

TABLE 4

| Description of experimental fish | |
|---|---|
| Species | Atlantic salmon (*Salmo salar*) |
| Strain | Mowi |
| Origin | Eggs from Tveitevåg, Presmolt from Fister Smolt AS |
| Average weight | Average = ca. 60 grams (weight range 50-70 g) |
| Physiological status | Smolts L:D = 24:0 |
| Number of fish | 80 fish in each of sixteen treatment groups to a total of 1280 fish |

Populations entered in to the study were documented to be free from exposure to the disease confirmed at source/before entering the study. It was anticipated that the fish will have a stock density of about 20 g/liter and at the end of the study the density will be ca. 40 g/liter.

Husbandry Management

The fish and tanks were tended and monitored on a daily basis by an aqua medicine biologist.

Dead fish were collected daily. Environmental parameters were recorded daily. Abnormal or moribund behaviour, loss of appetite, increase in appetite or unexpected increase in mortality were reported.

The fish were hand fed. The amount was adjusted by biomass calculations once a week, and adjusted by weighing after 40 days.

TABLE 5

| Overview of management | |
|---|---|
| Temperature | 8 ± 1° C. |
| Water flow | Min. 0.8 l/kg/min |
| Water discharge | Tube overflow system |
| Cleaning | Once a day |
| Photoperiod regime | L:D = 24:0 before and during trial |
| Feeding | Hand fed 1% through the day, 5 days a week. |
| Oxygen | Normal 7, 8 mg/l, min. 5 |
| Salinity | 34 ± 1 |

Main Inclusion Criteria and Post Exclusion Removal

Clinically healthy Atlantic salmon (*Salmo salar*) in good health status and known vaccination status. Mean size was approximately 50 g.

Mean weight of 100 fish at entry was recorded. Mortality in the tanks was recorded daily. Dead fish were assessed for presumed cause of death and categorized for the presumed cause. As defined by the investigators, discreet periods of explained and unrelated loss such as physical damage, oxygen depletion, starvation or any other unrelated incidence were censored. Dead fish were kept to determine what further investigation was necessary. Mortality was confirmed by necropsy, and either by pathology and/or a positive bacteriological result were considered specific loss.

The study was conducted at Solbergstrand in Frogn in Akershus county and run from approximately mid-June 2016 and for 110 days.

Design Summary

The study should last for 111 days (21 days+90 days) or until the biomass reached 50 kg pr. tank—whatever came first. Eighty fish in each of sixteen treatment groups to a total of 1280 fish were included. The set-up consisted of two main groups with two sub groups receiving either an immunization period of 21 days after being exposed in fresh water before put in seawater at day 21 (Group 1—A and B), or no immunization period but subjected to sea water immediately after exposure (Group 2—C and D).

Each sub group A/B/C/D was divided in 4 groups whereof 3 received different treatment and a fourth was a control group (FIG. 1).

All fish received exposure when in fresh water. Group A and B stayed in fresh water for 21 days after exposure while group C and D were entered into SW immediately after exposure. Exposure of all groups took place for a short period in brackish water.

Tanks A and B, and Tanks C and D were duplicates in order to compensate for tank to tank variability.

Volume used: 500 ml probiotica/placebo and 500 ml vaccine/placebo and 4 liter of water per dip tank/bucket.

Five fish were dipped for 60 seconds each time. This was repeated 32 times so that all 160 fish from two tanks (e.g. A1 and B1) were treated in the same bath.

The study will last for approximately 111 days with an interim analysis after 40 days. Cumulative mortality rate is predicted to be 16% in the treatment groups and 40% in the control groups.

Day 0 and Day −21 Definition

Day 0 is the day which all fish is put on salt/sea water. For group A and B Day −21 is the start of treatment with the biotic and/or immersion bath. For group C and D treatment starts at Day 0.

All groups will be treated in SW, also groups treated with two probiotica, before fish are put back in rearing tanks with fresh water (A and B) or directly in salt/sea water (C and D).

Blinding and Marking

Fish in the treatment groups will be kept in separate tanks during the experiment. The study will be double blinded and fish will be randomly selected to each tank. Persons not involved in the daily treatment of fish or analysis of the data will perform blinding of the treatment. Two envelopes with the codes will be kept and not opened until end of data analysis.

TABLE 6

Added volumes of placebo/vaccine/ambiotica were 1500 ml each in 12 liters of water. The responsible person carrying out the exposure did not know what was in the flasks. The table is only an example of how the combination could look like.

| Treatment | Vaccine | Ambiotica | Random Tank |
|---|---|---|---|
| Placebo or vaccine and placebo or ambiotica | Aα | Bα | AB/CD |
| Placebo or vaccine and placebo or ambiotica (not same as α) | Aβ | Bβ | AB/CD |
| Placebo or vaccine and placebo or ambiotica (not same as α or β) | Aγ | Bγ | AB/CD |
| Placebo or vaccine and placebo or ambiotica (not same as α, β or γ) | Ao | Bo | AB/CD |

Example: Greek Letters for Exposure and Capital Letters for Tank. Combination a (which May Contain any of the Treatment) was Given to One Random Tank in Group a, B, C and D. the Same Went for the Other Treatments. The Person Blinding the Study Registered What Treatment Went in What Tank and Stored the Code in a Locket Envelope. The Blinder was Involved in Exposure During the Study or the Data Handling after the Study.

Probiotica/placebo were identified with corresponding numbers (Aα, Aβ, Aγ or Ao) whereof two were only containing medium without live bacteria. Flasks with vaccines were identified by a letter (Bα, Bβ, Bγ or Bo) whereof two were having placebo and two contained vaccine. All flasks were covered by tin foil. One tube vaccine went with one flask probiotica and blinded (table 3 above).

All fish were PIT tagged prior to study start.

Observations and Interim Analysis

During the observation period all mortalities were classified. The records of feeding were kept for each tank being studied. Concentration of beneficial bacteria were measured on fish at 4 time points for all groups by drawing blood from 5 fish. The first time was 5 minutes after first treatment for all groups receiving probiotic treatment before they were put into the tanks. The second time at Day 0 and the third time at the time of the interim analysis at Day 40. At least 5 fish were analysed at end of Day 90.

Weight

Fish were weighed and measured at start by average of 100 fish and every individual at the end of the study in all 16 tanks. At day 40 an interim analysis was performed where mean weight and survival were calculated for each tank based on diseased fish up to day 40.

Bacteriological Examination During and End of Study

Fish that died during the observation period and was classified as mortalities and diseased (MD), weight and length measured and kept refrigerated for bacteriological culture and examination. Quantification of bacterial load was performed on 5 fish from each of the 16 treatments tanks at day −21, day 0 day 40 and at all surviving fish at end of study. At end of study it was be drawn blood from all living fish and they were weighed, measured and bacteria cultivated.

Results

When the probiotic is applied in a 1:8 concentration as a 30 second dip in the freshwater 3 weeks before the smolt is launched into seawater there is an improved growth rate compared to the control group. The combination of dip in probiotic bacteria and dip vaccination is also increasing the growth rate compared to vaccination alone. The unexposed control group has smolts with the lowest growth rate among the trial groups. If the exposure to probiotic and dip vaccine is performed at the time of sea launch the differences in growth rate between the experimental groups have the same tendency but the differences are minimal which underlines that it is beneficial to dip salmon in probiotics and bath vaccine some weeks before sea launch (see FIGS. 13, 14, 15, 16, 17, and 18).

Example 8

Effects of Different Combinations of *A. njordis*, *A. Balderis* and *A. nannie* and Effects of Various Concentrations of the Probiotic Bacteria Study Objectives To determine what combination of three different strains of innocuous *Aliivibrio* sp. in combination 1 (*A. njordis*) and 2 (*A. balderis*), and 2 (*A. balderis*) and 3 (*A. nannie*), with a 30-minute static bath treatment immersion vaccine will result in the lowest mortality and largest weight gain versus untreated controls over a total of a 65-day period. All groups were given a period of 95 days (approx. 950 atu) in fresh water before exposure to sea water.

Sub-Objectives
1. to investigate if and what two strain combination and concentrations of probiotic bacteria will be most effective for weight gain compared to controls
2. to investigate what and if treatment with a mix of probiotic bacteria will result in higher survival rates, and/or weight gain, and/or lower rates of any moribund signs, including darkening, lethargy, and presence of specific disease signs, such as ulcer formation, fin rot or mouth rot compared to untreated controls.

Study End Points

End points for the objectives were survival, ulcer formation, weight, specific growth rate and feed conversion rate. Morbidity signs including but not restricted ulcers, darkening of the skin, fin rot, anorexia and mouth rot. Ulcers were scored by size and severity.

Test Product

Strains of bacteria used as augmenting are three non-pathogenic Aliivibrio sp. produced in such a way that certain proprietary methods are used to manifest desirable culture characteristics (Table 5 Listing of Substances) The strains will be a combination of strain 1 (*A. njordis*) and 2 (*A. balderis*) (treatment A), and strain 2 (*A. balderis*) and 3 (*A. nannie*) (treatment B).

Description of Experimental Fish

| Species | Atlantic salmon (*Salmo salar*) |
|---|---|
| Strain | Mowi |
| Origin | Eggs from Tveitevåg, Presmolt from Fister Smolt AS |
| Average weight | Average = ca. 50 grams (weight range 40-60 g) |
| Physiological status | Smolts L:D = 24:0 |
| Number of fish | 80 fish in each of ten treatment groups to a total of 640 fish |

Design Summary

The study lasted for 160 days (95 days+65 days). One hundred fish in each of 8 treatment groups to a total of 800 fish will be included. The set-up consisted of two main groups, A and B, receiving probiotic bacteria *Aliivibrio* spp. in brackish water in different concentrations, and an immunization period of 95 days (950 au) after treatment in fresh water. Around day 80 (when biomass reached maximum density which is about 40 g/liter) all fish were put together in a large tank with seawater for the remainder of the study (FIG. 1). Fish in the control group were treated with placebo (solution with no bacterins/bacteria).

Volumes of Stembiont™ for each dilution is described in table 3. Cumulative mortality rate was predicted to be 10% in the treatment groups and 20% in the control groups. Dead fish from any causes will not be replaced in the separate groups after study.

Day 0 was the day which all fish received salt/sea water. For group A and B Day –95 is the start of treatment with the biotic bath.

Fish in the treatment groups were PIT-tagged and kept in separate tanks during the experiment. The study was double blinded and fish were randomly selected to each tank. Persons not involved in the daily treatment of fish or analysis of the data performed blinding of the treatment. Two envelopes with the codes were kept and not opened until end of data analysis. All fish were weighed at the time they were PIT-tagged. When fish were treated the fresh water in the 200 liter tanks, with 180 liter water, was lowered to 90 liters. The tanks were immediately filled with salt water back to approximately 180 liters (see table 3 for exact volumes) to obtain ca 17 ppt salt concentration which is the preferred Stembiont™ salt concentration. Then the Stembiont™ was added. The fish stayed in the water treatment for 30 minutes before the brackish water was replaced with new fresh water. Salinity was measured during the 30 minutes' treatment and the water was oxygenated.

All fish were weighed and measured at start and at end of study. When the biomass reached ca 40 g/liter which was approximately day 40, all fish were transferred to one large tank.

Fish that died during the observation period were classified as mortalities and diseased (MD), weight and length measured and kept refrigerated for bacteriological culture and examination. At end of study all fish were weighed, measured and bacteria cultivated.

Mortality, mean weight, weight gain, size, relative percent survival, survival curves and number of ulcers on surviving fish were calculated and compared between all groups. All variables were calculated from start to transfer to the large tank, from start to end of study and from transfer to large holding tank to end of study.

Results

The average weight at the end of the trial was 169 (–3/+5) grams in the eight groups. Only 6 days after switching from freshwater to 2.5% salt water an outbreak caused by *Moritella viscosa* started in the common tank and the mortality increased increased for two weeks before it was going down gradually. After three weeks of mortality both *M. viscosa* and *Aliivibrio wodanis* was isolated from ulcers and the head kidney for the next 3 to 4 weeks. This disease outbreak was a classical winter ulcer outbreak occurring naturally even if the intake water was UV-desinfected. The mortality varied from 20 to more than 35% between the 8 groups in the same tank. Both the groups with probiotic diluted 1:100 had mortality close to 20% while one control group had 34% mortality, the other control group had 26% mortality. There was seen both a dose effect on the mortality and a probiotic strain combination effect on the mortality.

The numbers of salmon with weight higher than the average in the group was higher in the group immersed 30 minutes in the strain combination 1 and 2 compared to the combination of the strains 2 and 3 which is in agreement with the results for the growth rate in Example 3. This tendency to a larger number of fish with weight higher than the average weight in the group compared to the two control groups is similar in all the three dilutions of probiotic bacteria used for the bathing (see FIGS. 18, 19, 20, and 21).

Example 9

Testing Various Physical and Biological Parameters that Interacts with the Uptake of Probiotic Bacteria in the Blood of Atlantic Salmon Atlantic salmon (*Salmo salar*) 30-60 grams non-smoltified parr and 80-100 grams smolts, in total 426 fish.

Inclusion/Exclusion Criteria

Inclusion criteria morphology: Only healthy, intact and sexually immature fish without apparent visual deformities or behavioural abnormalities was used in the trial.

Husbandry Management Prior to Study Start

The fish were acclimatized according to local protocol requirements (NIVA). The fish and tanks were tended and monitored on a daily basis. Dead fish was collected daily and environmental parameters were recorded daily. Abnormal or unexpected behaviour, loss of appetite or any unexpected increase in mortality were reported immediately.

TABLE 7

| Overview of management | |
|---|---|
| Salinity | Freshwater |
| Stocking density | Max 20 kg/m³ - at day 0 |
| Temperature | 12° C. ± 1° C. |
| Water discharge | Tube overflow system |
| Cleaning | Once a day |
| Photoperiod regime | L:D = 24:0 before and throughout trial period |
| Feeding | By hand |

The protocol is designed to comply with European Pharmacopoeia monographs:

Design Summary

Atlantic salmon smolt (or fry) are kept in freshwater. Bacteria was diluted in seawater where salt water bacteria was used. Smolt or fry left for a certain time in bacteria (se set up below). Fish were normalized in a seawater mixture before being put back to freshwater where Stembiont™ are dying in freshwater. Blood sampling after 5 min in freshwater. Benzokain used as anaesthesia for blood sampling. Salmon euthanized by overdose.

For tests A to D 165 fish was used.

Culturing from the blood 3 smolts and 6 parr as negative controls gave growth of an average of 36 cfu/ml blood of with 9 of the 18 controls with 0, 10 or 20 cfu/ml (i. e. 0, 1 or 2 colonies per plate).

A. Time of bathing; use log 7 (dilution 1:10 will be used, approx. log 7) as the total concentration and *A. njordis, A. balderis* and *A. nannie* as the bacterial combination (Test 2). Six fish at each time point were used. 3 controls are included for baseline.

| | |
|---|---|
| 60 min | 8836 cfu/ml blood |
| 45 min | 9020 cfu/ml blood |
| 30 min | 9723 cfu/ml blood |
| 15 min | 4123 cfu/ml blood |
| 10 min | 4283 cfu/ml blood |
| 5 min | 893 cfu/ml blood |
| 3 min | 2858 cfu/ml blood |
| 1 min | 4383 cfu/ml blood |
| 30 sec | 607 cfu/ml blood |

The results indicate that the minimal length of bathing salmon in probiotic bacteria to gain maximal concentration of probiotic bacteria in blood is approximately 30 minutes. Half of that concentration is achieved after 10 to 15 minutes. At shorter time intervals of 30 seconds to 5 minutes the uptake of bacteria seem to vary more but uptake about one third of the uptake occurring after 30 minutes is occurring B. Concentration of Stembiont™; 5 min was used and 1, 2, and 3 combination (Test 3). Six fish at each time point were used.

| | |
|---|---|
| log 4 | 130 cfu/ml blood |
| log 5 | 122 cfu/ml blood |
| log 6 | 1890 cfu/ml blood (615 cfu/ml blood from bath 2, 3166 cfu/ml blood from bath 1) |
| log 7 | 893 cfu/ml blood (from A) |
| (log 8) | (undiluted culture approx log 7) |

The results a clear dose dependence for the bathing water in uptake of probiotic bacteria in blood, the higher concentration the higher uptake rate.

C. Salt concentration in the bathing water; 10 min was used and 1, 2, and 3 combination (dilution of 1, 2, 3 combination from Test 1 in 1:10 in salt and fresh mixtures made first) (Test 4). Six fish at each time point were used.

| Growth | |
|---|---|
| 0 ppt | 3+ |
| 5 ppt | 4+ |
| 10 ppt | 3+ |
| 15 ppt | 4+ |
| 20 ppt | 5+ |
| 25 ppt | 4+ |
| 30 ppt | 4+ |

Grading of growth from blood after bathing of salmon in bacterial cultures of varying salinity: 5+ means regular number in most fish and high density, 4+ high density of bacteria in blood but varying density between various fish, 3+ lower density and varying number in various fish individuals The results indicate that a wide interval of salinity can be used in the immersion solution from freshwater to marine water but with some more optimal results when bathing the fish in 20 ppt compared to lower and higher salt concentrations.

D. Stembiont™ combination; 5 min was used and log 7 (non-diluted culture was used) as the total concentration (Test 1), Six fish at each time point were used. Strain 1 is *Aliivibrio njordis*, Strain 2 is *Aliivibrio balderis* and strain 3 is *Aliivibrio nannie*.

| Probio strain | Cfu/ml blood |
|---|---|
| 1, 2, 3 | 3000 and 2500 |
| 1, 2 | 3000 and 2000 |
| 3 | 400 and 1500 |
| 1, 3 | 60 and 1000 |
| 2, 3 | 200 and 2500 |
| 1 | 2500 and 200 |
| 2 | 3500 and 1000 |

The results of the strain combinations on the concentration of bacteria in blood indicates that use of all three strains or strain 1 and 2 gives the highest and most regular concentrations of probiotic bacteria in the blood of salmon. Strain 1 seems to dominate in the mixed culture above strain 2 and 3. Strain 2 seems to dominate in the mixed culture with strain 3.

For test E, F, G and H 3 smolts or fry per parameter 29×3=87 will be used. Blood sampling with vacutainer and plating on 2 blood plates with 2.5% NaCl from each blood sample i.e. 87 blood samples plates×2=174 blood plates, incubated at 10° C. for 3-7 days.

A full set of parameters for all three categories E, F and G 87×3=261 fish were used E. Different status of smolt related to seawater (Test 5)
  I. Smolt directly from freshwater; result: Approx. 3000 cfu/ml blood but more irregular distribution.
  II. Smolt from same batch but kept for 7 days in full seawater; result: Approx. 2000 cfu/ml blood
  III. Post smolt kept in full seawater from July 2016; Approx. 1000 cfu/ml blood The results indicate that pre-smolt stage may be absorbing high numbers of probiotic bacteria but at a more uneven distribution. The ready smoltified salmon seems to absorb a high and even concentration of bacteria in blood. The smolt that has been 7 days in full seawater seems to be somewhat "saturated" with probiotic or similar bacteria but will still absorb about half of the bacteria that is absorbed at sea launch.

F. Different temperatures of the bathing water; use 5 min bath, non-diluted culture (log 7) of 1, 2 and 3, full sea-water (Test 6). Two types of salmon were used, one smolt of 120 gram staying in freshwater ready for seawater and one parr (35 g) staying in freshwater. Six of each type were used for each temperature a total of 12 fish and 12 plates seeded with 0.1 ml blood on the surface.

| Smolt | Parr |
|---|---|
| 4° C. 1430 | 3824 |
| 6° C. 1620 | 1630 |
| 8° C. 1318 | 6325 |
| 10° C. 1993 | 413 |
| 12° C. 782 | 1023 |
| 14° C. 633 | 382 |
| 16° C. 627 | 6923 |
| 18° C. 913 | 417 |
| 20° C. 1540 | 12600 |

The results indicate that large smoltified salmon is taking bacteria over the skin best at temperatures below 10° C., above 10° C. the number of bacteria taken up in the blood seems to reduced to half the number. The parr may take up higher concentrations of bacteria pr. ml blood possibly because of the smaller size of the fish body. However, the variation in uptake seems to be more large than with the smolt.

G. Old culture (VI1 og VI2 from Bindalssmolt produced at Glycanova, Øra, Fredrikstad, transported to Bindal 20-21/11-16, used 22/11-16 and returned 22/11-16 to Oslo via Tjeldbergodden and then stored in empty container outdoor with freezing etc. until 20/12-16 then diluted 1:2 in tank with sterile freshwater and tapped and stored at 6° C.) (Test 7)

Need 3×2 Fister salmon in salt water=6 Fister salmon
Need 6×2 blood agar plates with NaCl=12 blood agar plates w/NaCl
Results (6 Salmon, 2 Agar Plates from Each Fish)
 a. Glycanova (fermentor) 9 week culture, dilution 1:100: 182 cfu/ml blood
 b. Glycanova (fermentor) 9 week culture, dilution 1:600: 508 cfu/ml blood
 c. Glycanova, 1 week old culture (18° C.) of *A. njordis* and *A. balderis:* 55 cfu/ml blood
 d. Glycanova, fresh culture of *A. njordis* and *A. balderis:* 469 cfu/ml blood
 e. Lab culture, *A. njordis*, fresh culture: 77.5 cfu/ml
 f. Lab culture, *A. balderis*, fresh culture: 182 cfu/ml
 g. Lab culture, *A. njordis*, one week old: 57.5 cfu/ml
 h. Lab culture, *A. balderis*, one week old: 57.5 cfu/ml Cultures a and b are possibly contaminated with different bacteria growing in the old 9 week culture.

There is a clear increase in probiotic bacteria in blood when the culture is fresh compared to one week, somewhat more than the double amount in the blood when culture is fresh compared to one week old.

H. Various bacterial cultures; use 5 min bath, non-diluted culture (log 7)

Bacteriological examination from blood samples was performed on 100% of the fish.

No other samples were taken.

Blood samples (0.1 ml) from each fish is plated on two agar plates. The mean number of CFUs will be the unit used for calculation of differences in uptake of bacteria between treated fish.

Results

The various factors to be set to an optimized use of the probiotic bacteria *A. njordis*, *A. balderis* and *A. nannie* seems to be mapped. The robustness of the biological system related to these bacteria and the intimate contact with fish seems to be high. Good results from the probiotic use may be expected in a wide specter of many parameters tested in Example 9. Possibly one of the most important parameters is the concentration of the probiotic culture. I. e. the higher concentrations of bacteria the higher number of bacteria is taken up within typical minutes to half an hour as the optimal time period. However dilutions of cultures down to 1:1000 can produce measureable positive effects. Salinity, temperature strain combination do not have very strong impact making it necessary to be strict on these parameters in the protocols used.

Conclusions

The probiotic bacteria called *Aliivibrio njordis*, *Aliivibrio balderis* and *Aliivibrio nannie* are involved separately or in different combinations in the 9 studies (Examples 1 to 9) of this application. The application of these probiotic bacteria has so far been tested in research aquaria with group sizes of +/−100 fish and in intermediate sized industrial setups with typical 4.500 individuals in the groups and finally in industrial post smolt farming involving groups of typically 100.000 fish in each tank.

In the research aquaria important intervals for various parameters necessary for practical protocols for use of the three probiotic bacterial species in the fish farming industry has been established.

From Example 9 it is evident that the probiotic bacteria can be beneficial at all time interval tested for bath application from 30 seconds to one hour. Shorter exposures than 3 minutes seem to be enough to obtain one third of the transfer of the probiotic bacteria to the blood of the salmon compared to 30 minutes that seems to be the shortest and most optimal time period to obtain high uptake of the probiotic bacteria to the blood of Atlantic salmon.

The experiments with bathing salmon point clearly that there is an increasing uptake of probiotic bacteria to the blood of salmon when the concentration of the probiotic bacteria in the immersion water is higher. There seem to be beneficial to bath fish in all concentrations of the probiotic bacteria and dipping fish in dense concentrations of bacteria as 1:10 dilution has been shown to be efficient when the dipping is occurring for only 30 seconds. Designing good and practical bathing strategies based on varying the concentration of the probiotic bacteria and the time period of immersion makes the protocols that can be developed applicable to many different industrial operational procedures of fish farming.

Various salt concentrations of the immersion for bath or dip with the probiotic bacteria seem to be of no major impact since effective bathing can be made in various concentrations of salt from marine salt water to freshwater. It may seemingly be a small optimum to use 2% salt in the bathing solution compared to higher or lower salt concentrations.

Both from the aquarium experiments with bathing fish and from the industrial studies in the application it seems that the combination of *A. njordis* and *A. balderis* is more effective than including *A. nannie* in the probiotic exposures.

Atlantic salmon can be effectively bathed in all kind of life stages with good effect on growth and disease prevention. However, it seems that smolts ready for the see\awater bathed before or at sea transfer is more evenly absorbing the probiotic bacteria than earlier in the freshwater phase on the smolt plant. In addition it seems to be some reduced uptake of these probiotic bacteria after some days in seawater. It is potentially competition between bacteria in the sea to approach and connect to the microbiota of Atlantic salmon.

The temperature of the immersion with probiotic bacteria does not have a major impact on the uptake of bacteria to the blood. Temperatures between +4 and 20° C. have been tested and there may be a slightly higher uptake in the lower temperature range than from 10° C. and up to 20° C. However, these differences seem to be minor and maybe related to variations for fish to fish individual when the temperature is in the higher range.

The age of the probiotic culture does not seem to have a major impact for the uptake of probiotic bacteria within the range of one week when the culture is stored at +18° C. However, when the culture is made dense in an aerobic atmosphere like in a fermentor a reduced uptake may be of importance by storage. This difference is not seen so clearly when lab cultures with lower density are used From all the trials and examples. It seems that the probiotic protocols are solid but that the bathing concentrations of 1:600 is in the lower range to get results that are economically strong enough for the fish farming industry to be able to use probiotic exposures. However, when the dilution is 1:200 or 1:100 or dip concentrations of 1:10 it seems to be valuable to the industry for both disease prevention and for an increased growth rate.

It is clearly an indication that it may be more beneficial to apply the probiotics in the freshwater phase in the smolt plant a few weeks before sea launch, but the beneficial results are also clearly evident when applied at sea launch.

The probiotic bacteria seem to assist the fish in stabilizing the situation related to challenges from pathogenic bacteria and seem to support defence mechanisms like the various parts of the immune system. Among the factors that reveal this are the SGR estimations in the larger industrial trials.

One of the more surprising and strong examples in this application is the trial where a 30 min bath in the freshwater phase as parr reduces the mortality caused by classical winter ulcer 4 to 5 months later in brackish and salt water. There is in addition a clear growth rate stimulation 4 to 5 months later in the seawater. To be able to secure such strong results in the fish farming industry with probiotic applications it seems to be optimal to try to design protocols that employ and combine the most optimal combinations of parameters with impact on the effect of the probiotic bacteria on the salmon. This application demonstrates some of the most important factors that need to be adjusted for the various industrial adaptions needed for the exposure protocols.

*Psychrobacter*

The three bacterial strains *Psychrobacter piscimesodermis*, Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. were used.

The bacterial cells were cultivated at a temperature of between 8 and 16° C. in Luria broth if nothing else is stated. The building of cultures took approximately 14 days and the cultures were semi-continuous since fresh sterile broth were added when the cultures reached the end of the exponential growth. The growth was relatively slow due to the lack of shaking and other motion of the cultures.

Example 10

Experimental Design of the Fish Holding Tanks

The study was performed at a semi-closed RAS facility. The RAS system was used for growing and keeping salmonids and freshwater fish for research purposes in freshwater. The RAS system consisted of fish holding tanks and a bio-filter after a sedimentation tank and pumps creating water flow through the system. The freshwater for the system was supplied from the municipal drinking water network. Five experimental holding tanks were linked to the water inlet and outlet circuits of the RAS system. Three tanks (a, b and c) were connected using new pipes and two tanks (d and e) were connected with the existing pipe network. The inlet water for the tanks a and b was treated with UV treatment units. The tanks c-e were supplied with water from the main RAS circuit without any desinfection. All five tanks were supplied with equal water flow rates of five liter per minute. The outlet water from the experimental tanks was circulated the bio-filter of the RAS-system.

After 7 weeks of the trial the fry was moved to another facility with a RAS system that where highly contaminated with *Saprolegnia* species. The water supplied to all 5 tanks after moving the trial to the second facility was identical and there was no disinfection of the water in the RAS circulation consisting of sedimentation tank and bio-filter supplying water to tanks with salmonids of various size from fry to 150 gram smolt of rainbow trout and Atlantic salmon.

The Fish and Experimental Procedures

The Atlantic salmon was hatched from fertilized eggs purchased from a commercial producer. The eggs were incubated only in the water supplied from the municipal water to avoid exposure to the microbiota of the RAS. Eggs and larva were incubated in the municipal water until they started to feed before they were transferred to the experimental tanks supplied with water from the RAS system. Close to 600 fry were transferred to each of the 5 tanks of 500 liter and fed daily with a commercial feed at a level of 2% of the biomass. Within minutes after transfer into the experimental tanks the water flow in all tanks was stopped before air was blown into the water and liquid cultures of *Psychrobacter piscimesodermis* Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. were added into tank a, c and d. The total concentration of added bacteria in the water with the fry was $6 \times 10^7$ cfu/ml measured by cultivation on blood agar plates. The fry were incubated in the bacterial suspension for 1 hour before the water flow was again turned on simultaneously in all experimental tanks to the same level as originally established. The fry were fed and managed routinely daily and dead individuals were collected and their weight was individually measured to assess the potential growth rates and differences in mortalities.

Bacterial Strains, Culturing Conditions

The probiotic bacterial species *Psychrobacter piscimesodermis* Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. used were previously isolated from the RAS system and stored at −80° C. Colonies isolated from blood agar plates incubated with material from tissues of healthy Atlantic salmon from the facility were identified by AP120NE (BioMerieux) and by 16s rDNA sequencing using universal bacterial 16s rDNA primers. The cultures used for the bath were grown in Luria broth at 12° C. to obtain late exponential culture.

Results, Mortality

The growth of bacteria from the inlet water of the five holding tanks (a to e) demonstrated three logs higher growth in the water coming directly from the bio-filter unit without passing the UV disinfection unit. There had been cultivated *Aeromonas hydrophila* from diseased salmonids (Atlantic salmon and rainbow trout) with ulcers mainly on the sides behind the breast fins in periods for a couple of years. *Aeromonas hydrophila* was isolated from the non-disinfected RAS water during the trial but not from the disinfected water used for tank a and b.

The lowest cumulative mortality was observed in tank b supplied with UV disinfected RAS water and bathed with the three probiotic bacteria. The highest fry mortality rate was registered in tank c supplied with water from new pipes without biofilms. The fry bathed in the probiotic bacteria and supplied with water from the old pipe with an established biofilm, tank d, and therefore receiving fewer organic particles from the bio-filter had lower mortality rates than fry in tank c. The control tank e had a lower mortality than tank d that had the same water from the old pipe with biofilm but bathed in probiotic bacteria.

TABLE 8

Cumulative mortality

| Week | Tank a | Tank b | Tank c | Tank d | Tank e |
|------|--------|--------|--------|--------|--------|
| 1    | 9      | 3      | 9      | 18     | 13     |
| 2    | 12     | 5      | 27     | 31     | 15     |
| 3    | 28     | 9      | 49     | 43     | 23     |
| 4    | 45     | 18     | 69     | 53     | 25     |
| 5    | 48     | 22     | 95     | 61     | 29     |
| 6    | 49     | 22     | 113    | 67     | 31     |
| 7    | 51     | 23     | 130    | 70     | 36     |
| 8    | 54     | 26     | 164    | 88     | 43     |
| 9    | 61     | 30     | 212    | 121    | 72     |
| 10   | 64     | 38     | 238    | 144    | 110    |
| 11   | 67     | 40     | 254    | 162    | 126    |
| 12   | 84     | 62     | 349    | 197    |        |
| 13   | 109    | 82     | 408    | 215    |        |
| 14   | 115    | 87     | 417    |        |        |

After transfer of the fry to the second facility after 7 weeks the level of mortality changed and the dead fish were clearly infected with *Saprolegnia* that macroscopically grew outside the fry when they got diseased. The disease started to develop after only one week and increased in severity in all groups but most severely in Tank c, d and e. The mortality in Tank e (control) was not recorded the last 3 weeks because of the high number of dead fry and the same the last week in Tank d.

The main hypothetical factors impacting the fry negatively in the first 7 weeks of the trial is *Aeromonas hydrophila* that maybe responsible for the high mortality in Tank c that gets water from the bio-filter in clean, new pipes without a biofilm of various bacteria that can reduce the level of the *A. hydrophila* pathogen. It was rich growth of *A. hydrophila* from the dead fry.

The mortality in Tank d is higher than in the control Tank e that got the same water without disinfection from the old pipe the first 7 weeks. This may indicate that the probiotic bacteria has some cost to the fish that may supply the control with higher protection against the *A. hydrophila* infection.

The disinfection of the inlet water in Tank a and b probably reduces the level of *A. hydrophila* but still there may be some pathogenic cells coming into the tanks at a level that make the probiotic bacteria able to control the infection better than the fry without probiotic bath treatment.

The disinfection of the inlet water probably reduces the load of *A. hydrophila* taken up by the fry so they are able to withstand the heavy *Saprolegnia* infection from week 7 through week 14. The probiotic bacteria in fry from Tank d seem to protect against the *Saprolegnia* infection to some extent when compared to fry in the control tank e which has a high level of mortality caused by *Saprolegnia* infection possibly stimulated by the high level of *A. hydrophila* challenge the first 7 weeks in the first facility. Tank c also has a very high mortality from saprolegniosis possibly explained by a high challenge of *A. hydrophila* during the first 7 weeks of the trial.

Results, Growth

A number of 20 live individuals from each tank was weighed at the termination of the trial after euthanasia at week 14.

The fry in tank a and b supplied with UV disinfected water was growing faster (30%) than fish in the other tanks. Tank b with the probiotic bathed fry had a 6.5% higher weight in average compared to Tank a. Fry in Tank d had 3.5% higher weight than the fry in Tank e. It seems that the probiotic effect on the growth may be reduced but not eliminated caused by the impact of one or both of the pathogenic agents, *A. hydrophila* and *Saprolegnia* spp.

Summary

Broth cultures of *Psychrobacter piscimesodermis* Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. applied as probiotic bath at the start feeding stage in Atlantic salmon fry have an impact on both mortality and growth in particular with minimal or low level of the pathogenic bacterium *Aeromonas hydrophila* in the water. The probiotic bacteria seem to have a weak reducing effect on the mortality from *Saprolegnia* infection.

In the experimental section the three bacterial strains *Aliivibrio njordis* (B1-25, 18-1/2013 mandib VI1), *Aliivibrio balderis* (B1-24, 18-1/2013 kidn VI2) and *Aliivibrio nannie* (B8-24, 31-3/2013 kidn VI3) were used.

The bacterial cells were cultivated at a temperature of between 8 and 16° C. in Luria broth with 2.5% NaCl if nothing else is stated. The building of cultures took approximately 14 days and the cultures were semi-continuous since fresh sterile broth was added when the cultures reached the end of the exponential growth. The growth was relatively slow due to the lack of shaking and other motion of the cultures.

For the bathing, 2.55% natural marine salt was used during the bathing in Examples 1, 3 and 4, while full seawater (3.4%) was used in Example 2.

Example 11

Application of Probiotic Bacteria to Fish During their Life Cycle

Fish have intimate contact with water and bacteria can be taken up from the water through several routes or portals of transfer. Traditionally the oral and gill route of uptake has been considered important in fish as in mammals and birds. However, fish have the ability to transport bacteria across the skin to a large degree, a feature that is not of importance to mammals and birds. In a test of the uptake of different bacteria from water across the skin in Atlantic salmon of more than 80 different fish pathogenic bacteria, commensal bacteria, water bacteria and probiotic bacteria the uptake through the skin by bathing presmolt of 50 to 100 g in a solution of typically $1 \times 10^7$ bacteria per ml bathing water in five minutes before blood sampling and culture of bacteria from the blood immediately after blood sampling with the vacutainer system from the caudal vein was monitored.

Bacteria may typically have an uptake of between $1\times10^3$ and $1\times10^4$ cfu/ml blood after five minutes exposure.

For the probiotic bacteria *Aliivibrio njordis*, *Aliivibrio balderis* and *Aliivibrio nannie*, the uptake is more than $1\times10^4$ cfu/ml blood after 5 min when a concentration of $1\times10^7$ cfu/ml of the probiotic bacterium is used. When the concentration of probiotic bacteria drops to $1\times10^6$ cfu/ml, the uptake is between $2\times10^3$ cfu/ml and $4\times10^3$ cfu/ml blood after 5 minutes in the bath and when the concentration of the probiotic bacteria is $1\times10^5$ cfu/ml the uptake is varying from 10 cfu/ml to $4\times10^2$ cfu/ml blood after 5 minutes. Finally when the concentration of the probiotic bacteria is $1\times10^4$ cfu/ml the uptake is varying from 10 cfu/ml to $3\times10^2$ cfu/ml blood after 5 minutes.

The freshwater probiotic strains *Psychrobacter piscimesodermis* Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. is taken up into the blood of Atlantic salmon presmolts and smolts at the same level as for the strains of the bacteria *Aliivibrio njordis*, *Aliivibrio balderis* and *Aliivibrio nannie*.

The uptake increases with time of the bath in the water enriched with bacteria up to approximately 35 minutes before the uptake is reduced or the further transport mechanisms of bacteria inside the fish is maturated.

The salt concentration is not impacting the uptake to a major degree for the bacteria *Aliivibrio njordis*, *Aliivibrio balderis* and *Aliivibrio nannie* at the short bath times tested and the temperature interval is wide for uptake of bacteria. The uptake is almost the same in the temperature range from +4° C. to 16° C. for Atlantic salmon for most bacteria tested. At temperatures of 18 and 20° C. the uptake of bacteria is reduced when Atlantic salmon is used in the tests.

The physiological state of Atlantic salmon related to uptake was tested with fry, presmolts and smolts before transfer to seawater and shortly after transfer to seawater and finally post smolts that had been in seawater for a few weeks. The size of the smolt was also included in the testing. For uptake of bacteria *Aliivibrio njordis*, *Aliivibrio balderis* and *Aliivibrio nannie* there was no clear difference in uptake of bacteria related to the various physiological stages of the Atlantic salmon including the different sizes of smolt.

For uptake of bacteria across the skin it has been tested bath in presmolts for uptake of bacteria *Aliivibrio njordis*, *Aliivibrio balderis* and *Aliivibrio nannie* when bacteria where diluted in brackish water and the presmolts were returned to freshwater for 8 more weeks before they were transferred to seawater. When the growth stimulation was compared in the early bathing 8 weeks before sea transfer with bathing on the day of sea transfer both increased growth and protection against ulcer and fin rot where more pronounced in the group bathed 8 weeks before sea transfer compared to the group bathed at sea transfer.

In another experiment the fry was bathed 3 months before sea transfer and the effect was still measurable between 4 and 5 months after sea transfer.

Bathing in water with typically $1\times10^7$ cfu/ml of *Aliivibrio njordis*, *Aliivibrio balderis* and *Aliivibrio nannie* in 35 minutes or dipping fry in 30 seconds in 10 times dilution of the bacterial culture i.e. $1\times10^9$ cfu/ml gives similar effect on growth and reduction in ulcer and fin rot.

Repeated bathings and/or dippings of fish is producing no harm to the fish except sometimes it can be a reduced growth compared to the control fish the first weeks after exposure indicating that the fish needs some energy to organize the relation to the probiotic bacteria.

Application of probiotic bacteria through various key management steps in the production cycle of salmon is possible to avoid increased handling of the fish and increased costs to the farmer. Typically application of probiotic bacteria into the tank used for anaesthetization of the fish before vaccination intraperitoneally has been tested and seems to be very efficient. Similarly, application of probiotic bacteria during transport of smolts in well boats or lorries on roads seem to be efficient and time reducing ways of administering probiotic bacteria. There will be different novel ways of administering probiotic bacteria when the farming industry develops into new ways of management and production.

A very interesting feature is constantly observed when bathing Atlantic salmon and lump sucker fry in the probiotic bacteria *Aliivibrio njordis*, *Aliivibrio balderis* and *Aliivibrio nannie* including *Psychrobacter piscimesodermis* Fisk 1, 41, 6-3/2014 Atl. salm., *Psychrobacter piscimesenchymalis* Fisk 2, 42, 6-3/2014 Atl. salm. and *Psychrobacter piscisubcutanea* Fisk 3, 43, 6-3/2014 Atl. salm. is that the fish seem to be unusually calm during the exposure process. The fish spread evenly in the tank and typically swim high in the water exposing the upper part of the back fin and uses all the parts of the water body in an organized way swimming parallel in the same direction. Experienced fish farmers comment immediately on this phenomenon that occurs from the very first minutes of exposure and lasts to the bacteria are titrated down in numbers. It is commonly observed that the situation is opposite when fish is identically exposed to fish pathogenic bacteria in experimental challenges typically with the winter ulcer bacterium *Moritella viscosa*. Typically the fish are then immediately panicking and are trying to escape through the water outlet part of the tank and seem stressed and stays in a concentrated group as to protect themselves. This lasts as long as the exposure continues for instance one hour.

Example 12

Probiotic Study in Atlantic Salmon Fry with Three *Psychrobacter* and Three *Pseudomonas* Species Background Atlantic salmon smolt production is a freshwater based operation from hatching to the presmolt stage. In the presmolt stage brackish water may be used as part of the smoltification procedure. Mortality, fin rot and ulcer development may occur in all the freshwater stages of the life cycle and different infectious causes may be found. The most common bacterial pathogens in the commercial smolt facility are often found in the environment and one common bacterium to be found as a potential pathogen is *Pseudomonas fluorescens*.

Related to studies of ulcer and fin rot in the presmolt stage of Atlantic salmon production a set of three *Pseudomonas* species and three *Psychrobacter* species were isolated and tested to be non-pathogenic by intraperitoneal injection of relatively high numbers of bacteria.

Objectives of the Study

The study was designed to test the effect of bathing Atlantic salmon fry in potential probiotic bacteria on growth, health and ability to withstand challenge with *Yersinia ruckeri*.

Methods

Fish Population:

Clinically healthy Atlantic salmon fry (*Salmo salar*) in good health status and negative vaccination status. Size; 4 g at day 0, 12 Jan. 2018. Populations entered in to the study were documented to be free from any known disease. Stocking density should not go above 20 kg/m³ during the trial.

Research Facility:
  NIVA marine research station, Solbergstrand, Frogn, Akershus, Norway
  Time period: Start date: 12. Jan. 2018 (day 0)
  End date: 30. Aug. 2018 (day 230)
  Fish: Atlantic salmon fry. 100 fry per group in a total of 12 groups.

TABLE 9

Probiotic bacterial species used in the experiment

| Combination of bacteria | No. | Name of the different strains |
|---|---|---|
| a | 12 | *Pseudomonas salmosubcutaneae* NCIMB 43330$^T$ |
|   | 13 | *Pseudomonas salmosubpectoralis* NCIMB 43331$^T$ |
|   | 14 | *Pseudomonas salmointermuscularis* NCIMB 43332$^T$ |
| b | 41 | *Psychrobacter mesodermis* NCIMB 42947$^T$ |
|   | 42 | *Psychrobacter mesenchymalis* NCIMB 42948$^T$ |
|   | 43 | *Psychrobacter subcutaneae* NCIMB 42949$^T$ |

TABLE 10

Amount (mL) of the different probiotic bacteria used for bathing of Atlantic salmon fry in each group

| Group | Combination of bacteria | Strain 12 | 13 | 14 | 41 | 42 | 43 |
|---|---|---|---|---|---|---|---|
| 1 | a | 200 | 200 | 200 | 0 | 0 | 0 |
| 2 | b | 0 | 0 | 0 | 200 | 200 | 200 |
| 3 | a + b | 100 | 100 | 100 | 100 | 100 | 100 |
| 4 | a | 200 | 200 | 200 | 0 | 0 | 0 |
| 5 | b | 0 | 0 | 0 | 200 | 200 | 200 |
| 6 | neg. ctr | 0 | 0 | 0 | 0 | 0 | 0 |

TABLE 11

Layout in the trial:

| Tank | Group | Start: | Turned water on again: | Time of bath | Dilution factor (bacteria/water) |
|---|---|---|---|---|---|
| 1 | 1 | 11.16 | 11.51 | 35 min | 1:50 |
| 2 | 1 | 11.16 | 11.51 | 35 min | 1:50 |
| 3 | 4 | 11.21 | 11.56 | 35 min | 1:50 |
| 4 | 4 | 11.21 | 11.56 | 35 min | 1:50 |
| 5 | 3 | 11.27 | 12.02 | 35 min | 1:50 |
| 6 | 3 | 11.27 | 12.02 | 35 min | 1:50 |
| 7 | 2 | 11.32 | 12.07 | 35 min | 1:50 |
| 8 | 2 | 11.32 | 12.07 | 35 min | 1:50 |
| 9 | 5 | 11.34 | 12.09 | 35 min | 1:50 |
| 10 | 5 | 11.34 | 12.09 | 35 min | 1:50 |
| 11 | 6 | 11.16 | 11.51 | 35 min | 1:50 |
| 12 | 6 | 11.16 | 11.51 | 35 min | 1:50 |

Time from the water was turned on again until the tank was refilled and the water started recirculate: Approx. 30 min.

The feeding was performed manually 3 times per day with a commercial feed of increasing pellet size up to 1.5 mm at the end of trial. Each tank got the same amount of feed adjusted to the biomass in the tank to avoid spill of feed and clogging of the water filters.

Figure 30:
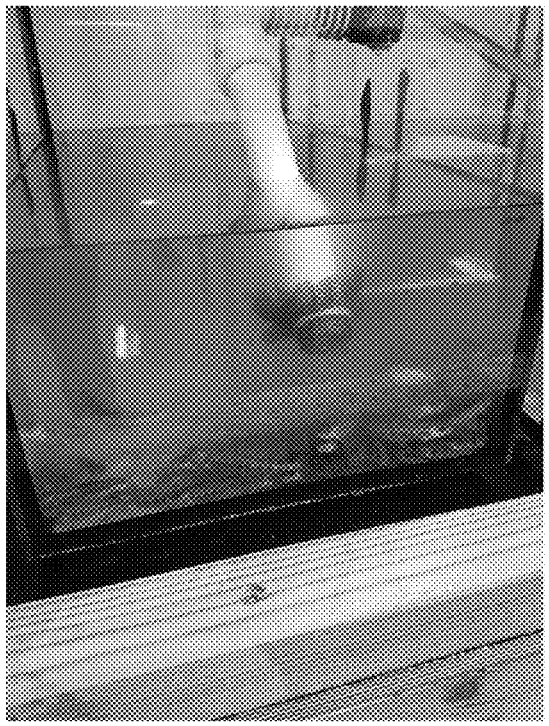
Figure 30:

See FIGS. 29 and 30 for photos of the aquaria tanks.

TABLE 12

Bacterial growth from the bathing water in each tank after 5 min of treatment:

| Tank | CFU/ml |
|---|---|
| 1 | $10.4 \times 10^8$ |
| 2 | $1.8 \times 10^8$ |
| 3 | $3.0 \times 10^8$ |
| 4 | $2.7 \times 10^8$ |
| 5 | $2.5 \times 10^8$ |
| 6 | $2.1 \times 10^8$ |
| 7 | $2.8 \times 10^8$ |
| 8 | $14.4 \times 10^8$ |
| 9 | $14.0 \times 10^8$ |
| 10 | $13.2 \times 10^8$ |
| 11 | (neg. ctr) |
| 12 | (neg. ctr) |

Comments:

The different probiotic strains were cultured separately and mixed on site right before use (less than 5 minutes before use). They were cultured in 12° C. with 140 rpm, with refill of fresh media (LB with 0.5% NaCl) every day (24 h). Used a dilution of 1:10 per culturing step.

The fry in all aquaria tanks were anesthetized and weighed Feb. 15 2018 (Day 34), Apr. 5 2018 (Day 83), May 28 2018 (Day 136) and Jul. 12 2018 (Day 181).

There was some mortality at anesthesia in particular at Day 136 caused by a combination of oxygen drop and stress.

At 12. July 2018 (Day 181) the groups were reduced to 80 fingerlings in each group to obtain the same number of fingerlings in each tank before challenge with a bath of *Yersinia ruckeri* for 20 minutes.

Results

The growth of the salmon from Day 0 (12. Jan. 2018) to Day 34 was not monitored individually. The average weight at Day 0 was 4 gram.

The weighing at Day 83 was restricted to 50 individuals (50%) in each Tank and the weight differences are presented in curves in FIGS. 34-37.

The weighing at Day 181 (Jul. 12 2018) gives the highest average weight to the groups with the lowest number of individuals. Many fish was lost during the moving of tanks to a challenge room at Day 136 preparing for the *Y. ruckeri* challenge due to overdose of benzokain as anesthetic and stress during weighing. Up to Day 136 (May 28 2018) few fish had been lost except for in Group 1 that had lost 20 more fish compared to the other groups due to overdosing anesthetic (benzokain). The average weight of the fish is giving a relatively good indication on the growth at Day 34, 83 and 136. However it is more informative to compare the weights of the individual fish by stacking the weight of the heaviest fish by falling order from one side of a graph and then compare the individual weights of the different groups presented as curves.

Figure 31:
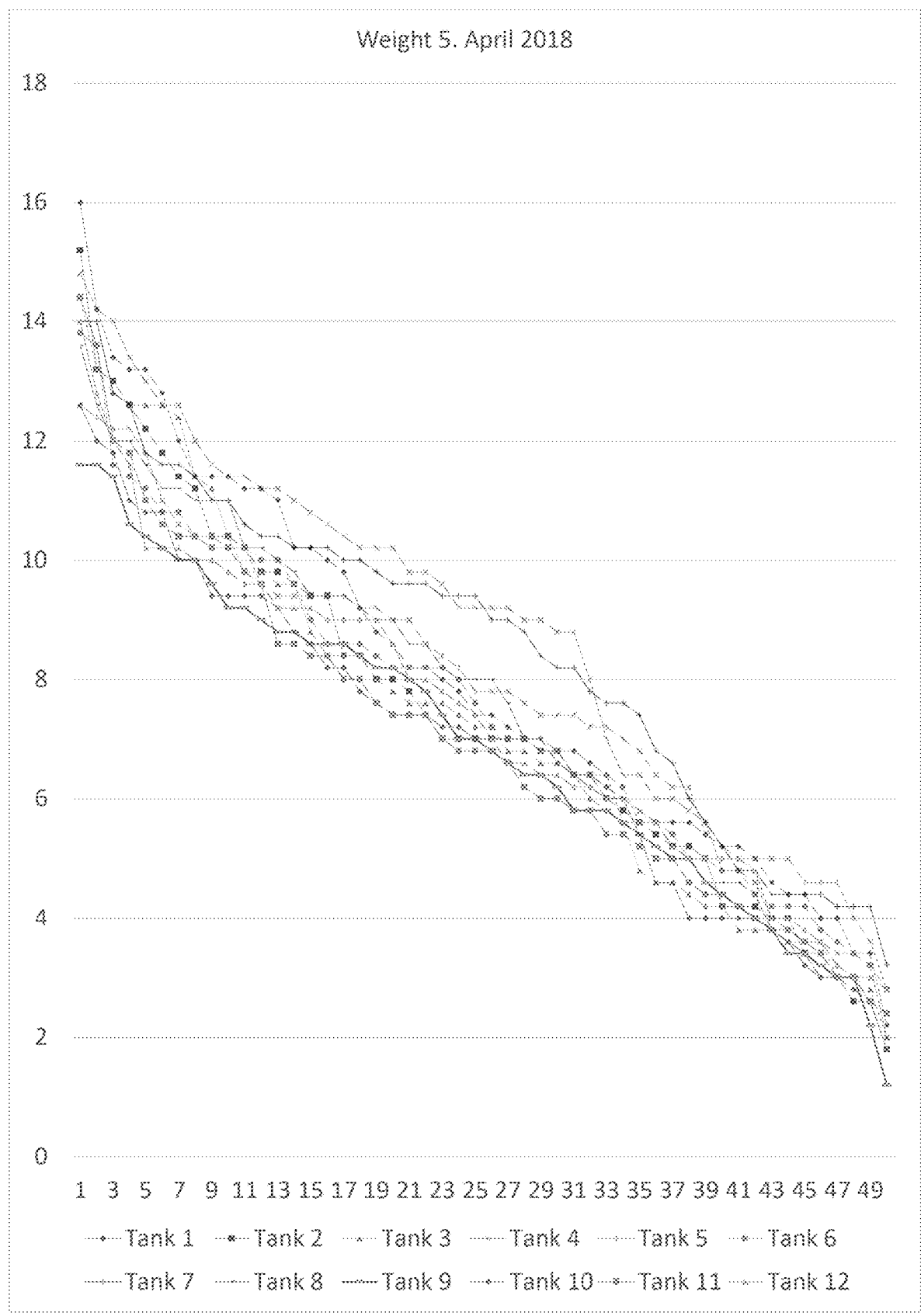

In FIG. 31 all the weights at Day 83 (Apr. 5 2018) are compared to each other. In FIG. 32 each of the curves from the three *Pseudomonas* bathed groups, Tank 1, 2, 3 and 4 are compared to the control tanks 11 and 12.

Similar comparisons are presented in FIG. 33 for the combined probiotic bath with *Pseudomonas* and *Psychrobacter* bacteria, Tank 5 and 6, and the controls and in FIG. 34 the four *Psychrobacter* groups, Tank 5 and 6, are compared to the control groups.

The weighing at Day 136 are presented similar as the weighing at Day 83 in FIGS. 35, 36, and 37.

TABLE 13

Average weight of the fry and fingerlings including the number of individuals alive in the groups on Day 136 and 181:

| Group (Tank) | Weight (g) Day 34 | Day 83 | Day 136 | No of fish Day 136 | Day 181 | No of fish Day 181 |
|---|---|---|---|---|---|---|
| 1 | 4.75 | 8.06 | 13.39 | 77 | 36.58 | 16 |
| 2 | 4.42 | 7.43 | 11.95 | 97 | 33.02 | 18 |
| 3 | 4.88 | 7.34 | 11.37 | 92 | 31.29 | 23 |
| 4 | 5.59 | 8.62 | 12.48 | 104 | 31.86 | 31 |
| 5 | 4.67 | 7.94 | 12.87 | 96 | 35.82 | 23 |
| 6 | 5.03 | 7.52 | 12.42 | 99 | 37.49 | 18 |
| 7 | 5.23 | 8.52 | 12.17 | 99 | 40.76 | 17 |
| 8 | 5.23 | 7.59 | 12.66 | 95 | 31.43 | 25 |
| 9 | 4.5 | 6.89 | 11.14 | 100 | 36.81 | 22 |
| 10 | 4.92 | 6.93 | 12.26 | 99 | 32.41 | 29 |
| 11 | 4.67 | 7.02 | 10.76 | 91 | 34.30 | 25 |
| 12 | 4.43 | 7.34 | 12.15 | 95 | 35.70 | 18 |

The mortality in the tanks were low throughout the experiment indicating that the health was optimal up to Day 181 and the focus was to monitor the growth.

The bath challenge with *Y. ruckeri* with 80 fingerlings in each tank resulted in acute disease and high mortality (FIG. 38).

TABLE 14

*Yersinia ruckeri* challenge:

| Group | 1 | 2 | 3 | 4 | 5 | 6 | 7 | 8 | 9 | 10 | 11 | 12 |
|---|---|---|---|---|---|---|---|---|---|---|---|---|
| Tot no of dead | 54 | 60 | 56 | 49 | 57 | 62 | 60 | 51 | 57 | 51 | 53 | 61 |
| No at start | 70 | 78 | 80 | 80 | 80 | 80 | 77 | 76 | 80 | 80 | 78 | 79 |
| Survivors | 16 | 18 | 24 | 31 | 23 | 18 | 17 | 25 | 23 | 29 | 25 | 18 |
| % mortality | 77 | 77 | 70 | 61 | 71 | 78 | 78 | 67 | 71 | 64 | 68 | 77 |

The *Y. ruckeri* challenge resulted in a mortality of between 60 and 80% within a period of 10-12 days. In Tank 4 there was 61% mortality as the lowest mortality. The challenge should have been weaker to demonstrate more subtle differences in protection against the bath infection with *Y. ruckeri* between the groups.

Discussion

The growth of salmon in aquaria tanks may be impacted by many different factors that can change over the study period. One such factor is the size of the individual animals. Large individuals will fight better for the feed pellets when the feed is restricted. This situation may increase the variation in fish size in the tank relatively rapidly and marked reduction in the feed will be available for the small individuals. Given that the feeding in all tanks are equal such a development indicate a stronger growth in tanks with some large individuals when the feeding is restricted. This scenario must be taken into consideration in the evaluation of the results.

In Tank 1, 2, and 4 there was a clear observation of some large individuals at the weighing 28. May (Day 136) that probably dominated in the tank and were able to get a larger portion of the feed. This indicates that the three *Pseudomonas* bacteria used as probiotic in bathing salmon fry stimulates the growth more than the *Psychrobacter* bacteria in this trial.

The control tanks 11 and 12 have fry that are growing slower than the probiotic treated groups in most of the trial period. However, there is an increasing difference between the fry in the two control tanks during the experimental period.

There seems to be a reduced value of the results after Day 136 of the study when it comes to the comparison of growth.

The challenge with *Yersinia ruckeri* at day 181 was giving an acute mortality that had a maximum 10 days after bath challenge with the acute mortality starting already 5 days after challenge. There was no significant difference in mortality between the different groups. To be able to separate the groups better a more weak challenge should have been started.

All results evaluated together indicate that the three probiotic *Pseudomonas salmosubcutaneae* NCIMB 43330, *Pseudomonas salmosubpectoralis* NCIMB 43331 and *Pseudomonas salmointermuscularis* NCIMB 43332 support the growth compared to the controls when the weight distribution in the figures are studied. The three species of *Psychrobacter; Psychrobacter mesodermis* NCIMB 42947, *Psychrobacter mesenchymalis* NCIMB 42948 and *Psychrobacter subcutaneae* NCIMB 42949 support growth of the Atlantic salmon fry better than the control groups with no probiotic. However, there are only two of the probiotic tanks, Tank 7 and Tank 8 that are clearly better in growth compared to the two control tanks, Tank 11 and Tank 12, at Day 83. However, at Day 136 three of the four tanks with *Psychrobacter* bacteria are having larger fingerlings than the control tanks.

The two groups where the three *Pseudomonas* species are combined in the bathing with the three *Psychrobacter* species there is a clear larger weight of the fry both at Day 83 and Day 136.

Conclusions

*Pseudomonas salmosubcutaneae* NCIMB 43330, *Pseudomonas salmosubpectoralis* NCIMB 43331 and *Pseudomonas salmointermuscularis* NCIMB 43332 support the growth compared to the controls when the weight distribution in the figures are studied. The three species of *Psychrobacter; Psychrobacter mesodermis* NCIMB 42947, *Psychrobacter mesenchymalis* NCIMB 42948 and *Psychrobacter subcutaneae* NCIMB 42949 also support the growth of the Atlantic salmon fry better than the fry in the negative control tanks. The combination of the six *Psychrobacter* and *Pseudomonas* species in the probiotic bath with the same total concentration of bacterial cells as when the two groups of species are bathed separately also gives growth of the salmon fry that is better than the negative control.

The bath challenge with the pathogenic *Yersinia ruckeri* gave an acute disease with high mortality and it was not possible to make a conclusion that the probiotic bath 181 days earlier protected against a hard challenge with *Y. ruckeri*.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Unless expressly described to the contrary, each of the preferred features described herein can be used in combination with any and all of the other herein described preferred features.

Aspects of the Present Document

Aspect 1: A method for increasing the growth rate and/or weight of fish, said method comprising the steps of
 a) adding one or more species of probiotic bacteria to water, wherein the species of probiotic bacteria comprises or consists of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*; and b) exposing the fish to the water containing the one or more species of probiotic bacteria.

Aspect 2: A method for treating and/or preventing a microbial infection in fish, said method comprising the steps of a) adding one or more species of probiotic bacteria to water, wherein the species of probiotic bacteria comprises or consists of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*; and b) exposing the fish to the water containing the one or more species of probiotic bacteria.

Aspect 3: The method according to aspect 2, wherein the microbial infection is a bacterial infection.

Aspect 4: The method according to aspect 3, wherein the bacterial infection is an infection causing wounds, ulcers and/or lesions on the skin of the fish, and/or septicaemia.

Aspect 5: The method according to any one of aspects 3 and 4, wherein the bacterial infection is caused by one of more of a bacterium selected from the group comprising *M. viscosa, Bizionia piscinecroseptica, Aliivibrio friggiae, Tenacibaculum dicentrarchi, Aliivibrio wodanis, Aliivibrio salmonicida, Aeromonas salmonicida, Vibio anguillarum, Edwardsiella piscicida, Aeromonas hydrophila, Flavobacterum psychrophilum,* and *Aliivibrio salmonicida*.

Aspect 6: The method according to any one of the preceding aspects, wherein the water has a salt concentration of about 0 to about 4% by weight, such as about 2 to about 4.

Aspect 7: The method according to any one of the preceding aspects, wherein said water is natural sea water.

Aspect 8: The method of any one of the preceding aspects, wherein the fish are exposed to the species of probiotic bacteria for a time period of 1 second to 5 hours, such as 1 second to 2 hours, such as 1 second to 1 hour, such as 30 seconds to 1 hour or 1 minute to 30 minutes.

Aspect 9: The method according to any one of the preceding aspects, wherein the method is repeated one or more times, such as 1-20 times.

Aspect 10: The method of any one of the preceding aspects wherein said fish are fish of the family Salmonidae, such as salmon, trout, chars, freshwater whitefishes or graylings, such as northern pike, perch, zander and carp.

Aspect 11: The method according to any one of the preceding aspects, wherein said fish are farmed fish.

Aspect 12: A probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for medical use.

Aspect 13: A probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use in the treatment and/or prevention of a microbial infection in fish.

Aspect 14: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to aspect 13, wherein the microbial infection is a bacterial infection.

Aspect 15: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to aspect 14, wherein the bacterial infection is an infection causing wounds, ulcers and/or lesions on the skin of the fish, and/or septicaemia.

Aspect 16: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-15, wherein the bacterial infection is caused by one of more of a bacterium selected from the group comprising *M. viscosa, Bizionia piscinecroseptica, Aliivibrio friggiae, Tenacibaculum dicentrarchi, Aliivibrio wodanis, Aliivibrio salmonicida, Aeromonas salmonicida, Vibio anguillarum, Edwardsiella piscicida, Aeromonas hydrophila, Flavobacterium psychrophilum,* and *Aliivibrio salmonicida*.

Aspect 17: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-16, wherein the probiotic bacterium is administered to the fish by a) adding one or more species of the probiotic bacterium to water; and b) exposing the fish to the water containing the one or more species of the probiotic bacterium.

Aspect 18: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-17, wherein the water has a salt concentration of about 0 to about 4% by weight, such as about 2 to about 4.

Aspect 19: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-18, wherein said water is natural sea water.

Aspect 20: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-19, wherein the fish are exposed to the species of probiotic bacteria for a time period of 1 second to 5 hours, such as 1 second to 2 hours, such as 1 second to 1 hour, such as 30 seconds to 1 hour or 1 minute to 30 minutes.

Aspect 21: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-20, wherein the fish are exposed to the species of probiotic bacteria one or more times, such as 1-20 times.

Aspect 22: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-20, wherein said fish are fish of the family Salmonidae, such as salmon, trout, chars, freshwater whitefishes or graylings.

Aspect 23: The probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use according to any one of aspects 13-22, wherein said fish are farmed fish.

Aspect 24: A probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for use in the treatment and/or prevention of a microbial infection in fish and for the simultaneous use in increasing the weight of said fish.

Aspect 25: A probiotic composition comprising one or more of a probiotic bacterium selected from the group consisting of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*.

Aspect 26: An isolated and biologically pure strain of *Psychrobacter piscimesodermis* Fisk 1, 41, 6/3-2014 Atl. Salm, which has been deposited at National Collection of Industrial and Marine Bacteria and has been assigned accession number NCIMB 42947.

Aspect 27: An isolated and biologically pure strain of *Psychrobacter piscimesenchymalis* Fisk 2, 42, 6/3-2014 Atl. salm, which has been deposited at National Collection of Industrial and Marine Bacteria and has been assigned accession number NCIMB 42948.

Aspect 28: An isolated and biologically pure strain of *Psychrobacter piscisubcutanea* Fisk 3, 43, 6/3-2014 Atl. Salm, which has been deposited at National Collection of Industrial and Marine Bacteria and has been assigned accession number NCIMB 42949.

Aspect 29: An isolated and biologically pure strain of *Pseudomonas salmosubcutaneae* Fisk 3, 13/5-2014, hb, Atl. Salm, which has been deposited at National Collection of Industrial and Marine Bacteria and has been assigned accession number 43330.

Aspect 30: An isolated and biologically pure strain of *Pseudomonas salmosubpectoralis* Fisk 3, 13/5-2014, ba, Atl. salm., which has been deposited at National Collection of Industrial and Marine Bacteria and has been assigned accession number 43331.

Aspect 31: An isolated and biologically pure strain of *Pseudomonas salmointermuscularis* Fisk 4, 13/5-2014, ha, Atl. salm., which has been deposited at National Collection of Industrial and Marine Bacteria and has been assigned accession number 43332.

Aspect 32: Use of a probiotic bacterium of the species *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis* for the manufacture of a medicament for the treatment and/or prevention of a microbial infection in fish, such as a bacterial infection causing wounds, ulcers and/or lesions on the skin of the fish, and/or septicaemia, and simultaneously increasing the growth rate and/or weight of said fish.

Aspect 33: A method for the treatment and/or prevention of a microbial infection in fish and simultaneously increasing the growth rate and/or weight of fish, said method comprising the steps of
a) adding one or more species of probiotic bacteria to water, wherein the species of bacteria comprises or consists of *Psychrobacter piscimesodermis, Psychrobacter piscimesenchymalis, Psychrobacter piscisubcutanea, Pseudomonas salmosubcutaneae, Pseudomonas salmosubpectoralis* and/or *Pseudomonas salmointermuscularis*; and
b) exposing the fish to the water containing the one or more species of probiotic bacteria.

REFERENCES

1. Toranzo, A. E., Magariños, B., Romalde, J. L. 2005. A review of the main bacterial fish diseases in mariculture systems. Aquaculture 246 (2005) 37-61.
2. Karlsen, C., Sørum, H., Willassen, N. P., Åsbakk, K. 2012. *Moritella viscosa* bypasses Atlantic salmon epidermal keratocyte clearing activity and might use skin surfaces as a port of infection. Vet Microbiol, 154(3-4):353-62. Epub 2011 Jul. 30.
3. Lunder, T., Evensen, Ø., Holstad, G., and Håstein, T. 1995. "Winter ulcer" in the Atlantic salmon *Salmo salar*. Pathological and bacteriological investigations and transmission experiments. Dis. Aquat. Org. 23: 39-49.
4. Løvoll, M., Wiik-Nielsen, C. R., Tunsjø, H. S., Colquhoun, D., Lunder, T., Sørum, H., Grove, S. 2009. Atlantic salmon bath challenged with *Moritella viscosa*—Pathogen invasion and host response. Fish Shellfish Immunol, 26: 877-884.
5. Cipriano, R. C. and R. A. Holt. 2005. *Flavobacterum psychrophilum*, cause of Bacterial Cold-Water Disease and Rainbow Trout Fry Syndrome. Fish Disease Leaflet No. 86. United States Dept. of the Interior. U.S. Geological Service, National Fish Health Research Laboratory, Kearneysville, WV
6. Nematollahi A, Decostere A, Pasmans F, Haesebrouck F. 2003. *Flavobacterium psychrophilum* infections in salmonid fish. J Fish Dis.; 26(10):563-74.
7. Verschuere, L, Rombaut, G, Sorgeloos, P., Verstraete, W. 2000. Probiotic bacteria as biological control agents in aquaculture. Microbiol. Mol. Biol. Rev. 64: 655-671.
8. Kashulin A. & Sørum H. 2014. A novel in vivo model for rapid evaluation of *Aliivibrio salmonicida* infectivity in Atlantic salmon. Aquaculture 420, 112-118.

The invention claimed is:
1. A method for treating fish, said method comprising the steps of:
a) adding species of a probiotic bacteria to water, wherein the species of probiotic bacteria comprises a *Psychrobacter piscimesodermis*, a *Psychrobacter piscimesenchymalis*, a *Psychrobacter piscisubcutanea*, a *Pseudomonas salmosubcutaneae*, a *Pseudomonas salmosubpectoralis*, and a *Pseudomonas salmointermuscularis*; and
b) exposing the fish to the species of probiotic bacteria for a time period of 30 seconds to 5 hours,
wherein exposure results in an increase in the weight of the fish and/or an increase in the rate of growth of the fish;
wherein the probiotic bacteria are administered to the fish topically;

wherein a total concentration of the one or more species of probiotic bacteria in the water is from $10^4$ CFU/ml to $10^{12}$ CFU/ml; and
wherein the fish is salmon.

2. The method of claim 1, wherein the species of bacteria includes an isolated and biologically pure strain of *Psychrobacter piscimesodermis* Fisk 1, 41, 6/3-2014 Atl. Salm, which was deposited at National Collection of Industrial and Marine Bacteria and has been assigned accession number NCIMB 42947.

3. The method of claim 1, wherein the species of bacteria includes an isolated and biologically pure strain of *Psychrobacter piscimesenchymalis* Fisk 2, 42, 6/3-2014 Atl. salm, which was deposited at National Collection of Industrial and Marine Bacteria and has been assigned accession number NCIMB 42948.

4. The method of claim 1, wherein the species of bacteria includes an isolated and biologically pure strain of *Psychrobacter piscisubcutanea* Fisk 3, 43, 6/3-2014 Atl. Salm, which was deposited at National Collection of Industrial and Marine Bacteria and has been assigned accession number NCIMB 42949.

5. The method of claim 1, wherein the species of bacteria includes an isolated and biologically pure strain of *Pseudomonas salmosubcutaneae* Fisk 3, 13/5-2014, hb, Atl. Salm, which was deposited at National Collection of Industrial and Marine Bacteria and has been assigned accession number 43330.

6. The method of claim 1, wherein the species of bacteria includes an isolated and biologically pure strain of *Pseudomonas salmosubpectoralis* Fisk 3, 13/5-2014, ba, Atl. salm., which was deposited at National Collection of Industrial and Marine Bacteria and has been assigned accession number 43331.

7. The method of claim 1, wherein the species of bacteria includes an isolated and biologically pure strain of *Pseudomonas salmointermuscularis* Fisk 4, 13/5-2014, ha, Atl. salm., which was deposited at National Collection of Industrial and Marine Bacteria and has been assigned accession number 43332.

8. The method of claim 1, wherein the species of probiotic bacteria includes at least one of
an isolated and biologically pure strain of *Psychrobacter piscimesodermis* Fisk 1, 41, 6/3-2014 Atl. Salm, which was deposited at National Collection of Industrial and Marine Bacteria and has been assigned accession number NCIMB 42947;
an isolated and biologically pure strain of *Psychrobacter piscimesenchymalis* Fisk 2, 42, 6/3-2014 Atl. salm, which was deposited at National Collection of Industrial and Marine Bacteria and has been assigned accession number NCIMB 42948;
an isolated and biologically pure strain of *Psychrobacter piscisubcutanea* Fisk 3, 43, 6/3-2014 Atl. Salm, which was deposited at National Collection of Industrial and Marine Bacteria and has been assigned accession number NCIMB 42949;
an isolated and biologically pure strain of *Pseudomonas salmosubcutaneae* Fisk 3, 13/5-2014, hb, Atl. Salm, which was deposited at National Collection of Industrial and Marine Bacteria and has been assigned accession number 43330;
an isolated and biologically pure strain of *Pseudomonas salmosubpectoralis* Fisk 3, 13/5-2014, ba, Atl. salm., which was deposited at National Collection of Industrial and Marine Bacteria and has been assigned accession number 43331; and
an isolated and biologically pure strain of *Pseudomonas salmointermuscularis* Fisk 4, 13/5-2014, ha, Atl. salm., which was deposited at National Collection of Industrial and Marine Bacteria and has been assigned accession number 43332.

9. The method of claim 8, wherein the species of probiotic bacteria further comprises at least one or more of an *Aliivibrio njordis*, an *Aliivibrio balderis* and an *Aliivibrio nannie*.

10. The method of claim 1, wherein the species of probiotic bacteria further comprises at least one or more of an *Aliivibrio njordis*, an *Aliivibrio balderis* and an *Aliivibrio nannie*.

\* \* \* \* \*